W. S. GUBELMANN.
ADDING AND RECORDING MACHINE.
APPLICATION FILED APR. 10, 1922.

1,429,202.

Patented Sept. 12, 1922.
12 SHEETS—SHEET 1.

William S. Gubelmann
Inventor

W. S. GUBELMANN.
ADDING AND RECORDING MACHINE.
APPLICATION FILED APR. 10, 1922.
1,429,202.
Patented Sept. 12, 1922.
12 SHEETS—SHEET 2.
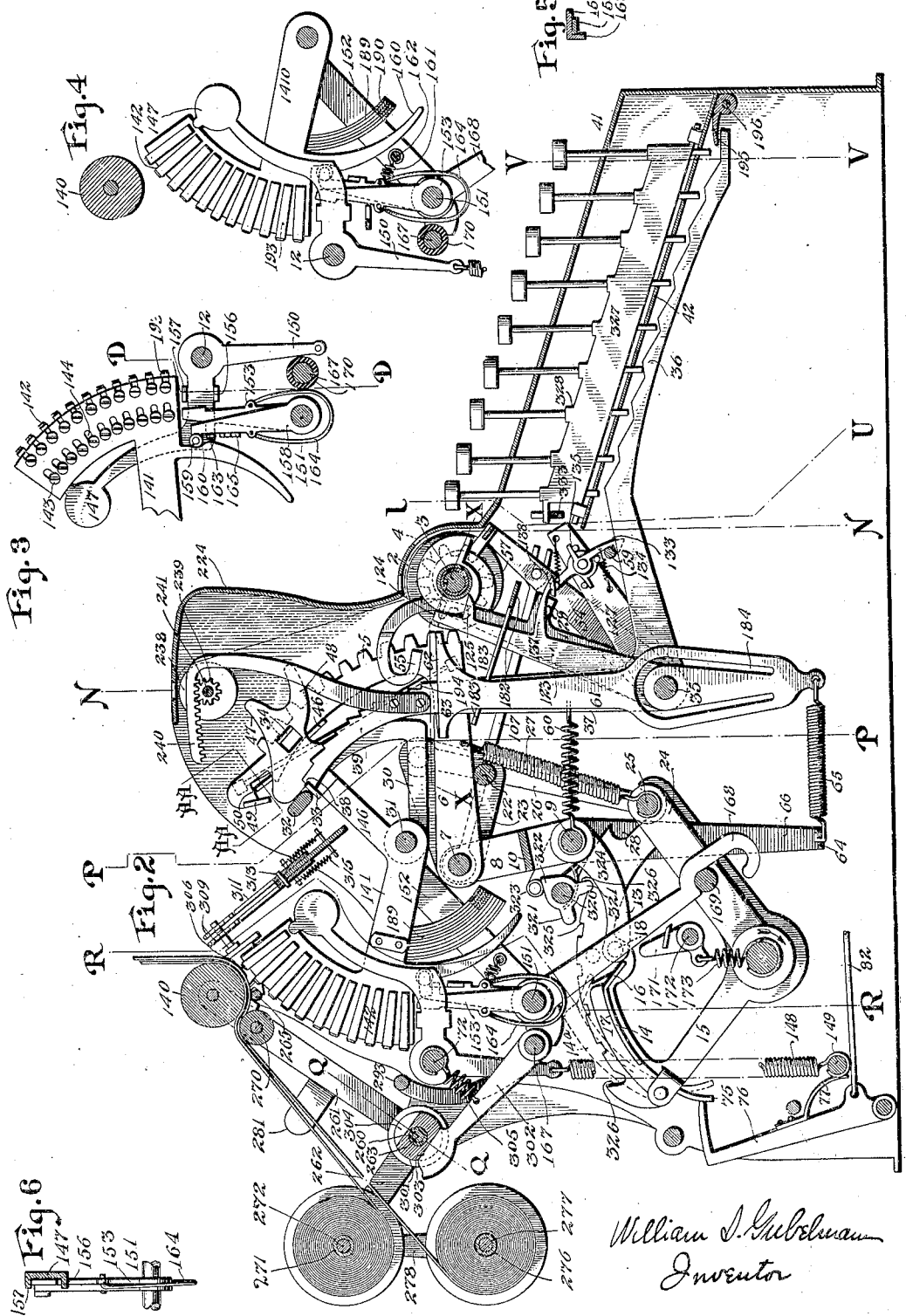

W. S. GUBELMANN.
ADDING AND RECORDING MACHINE.
APPLICATION FILED APR. 10, 1922.
1,429,202.
Patented Sept. 12, 1922.
12 SHEETS—SHEET 3.
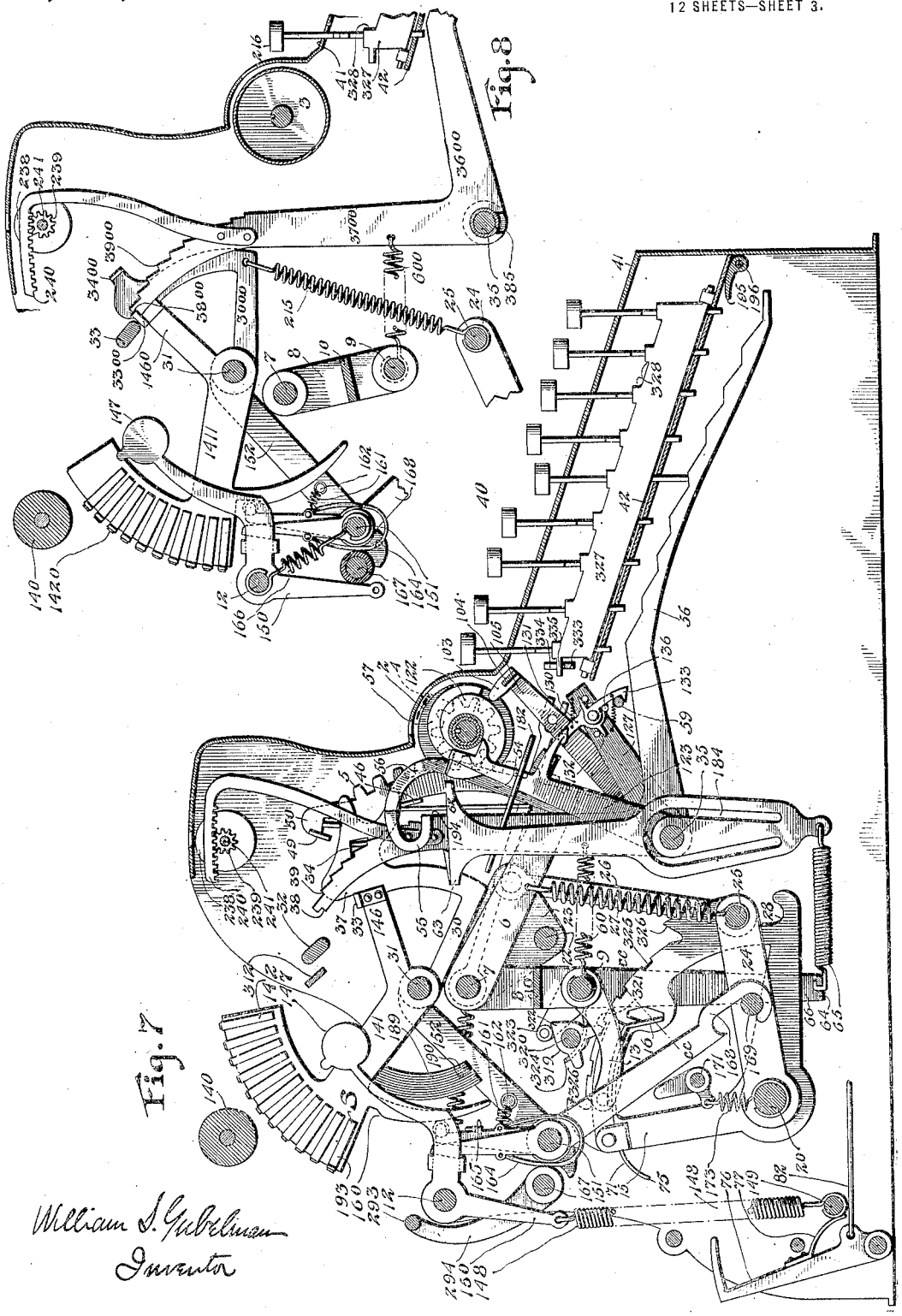
William S. Gubelmann
Inventor W. S. GUBELMANN.
ADDING AND RECORDING MACHINE.
APPLICATION FILED APR. 10, 1922.
1,429,202.
Patented Sept. 12, 1922.
12 SHEETS—SHEET 4.
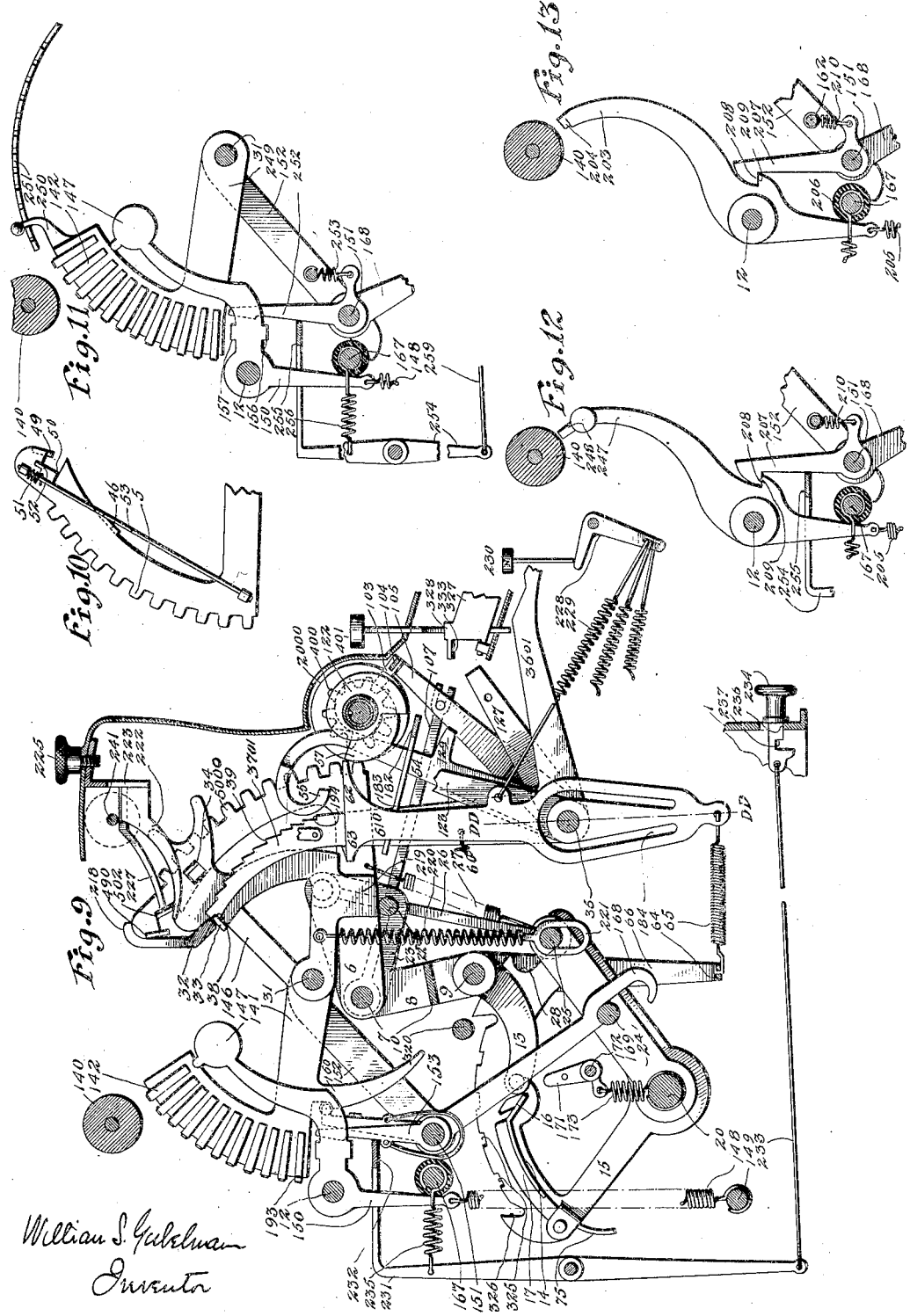

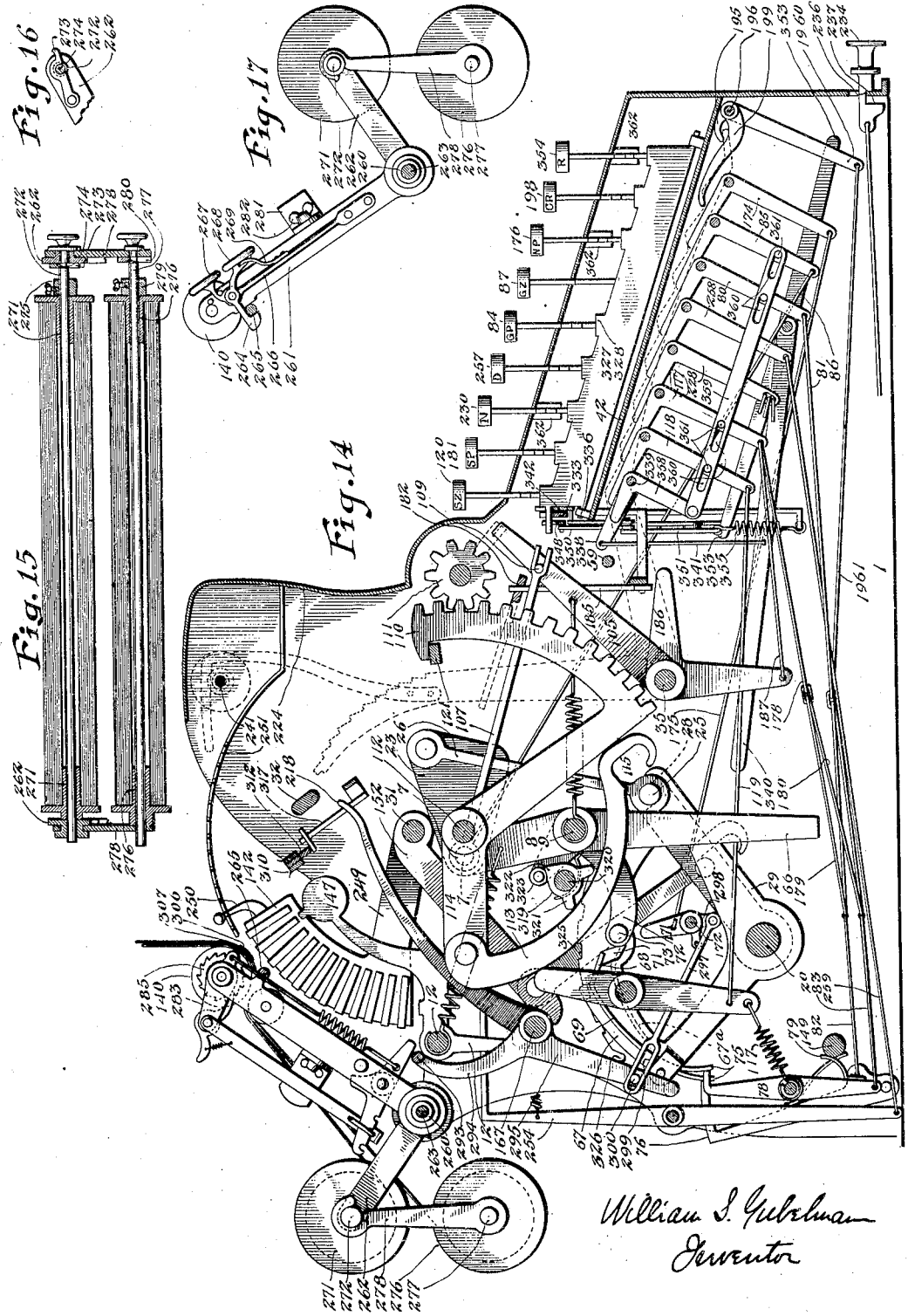

W. S. GUBELMANN.
ADDING AND RECORDING MACHINE.
APPLICATION FILED APR. 10, 1922.

1,429,202.

Patented Sept. 12, 1922.
12 SHEETS—SHEET 6.

William S. Gubelmann
Inventor

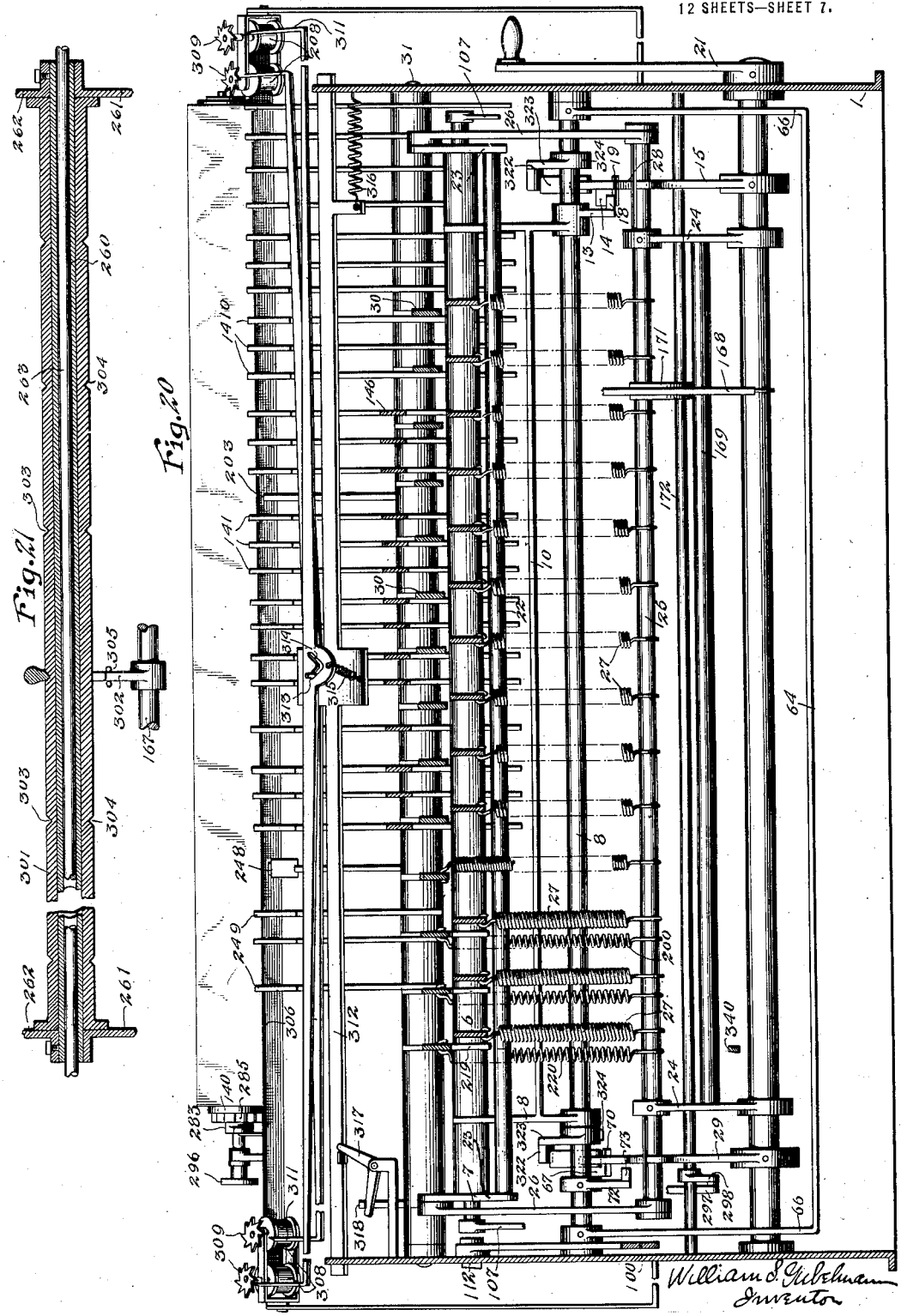

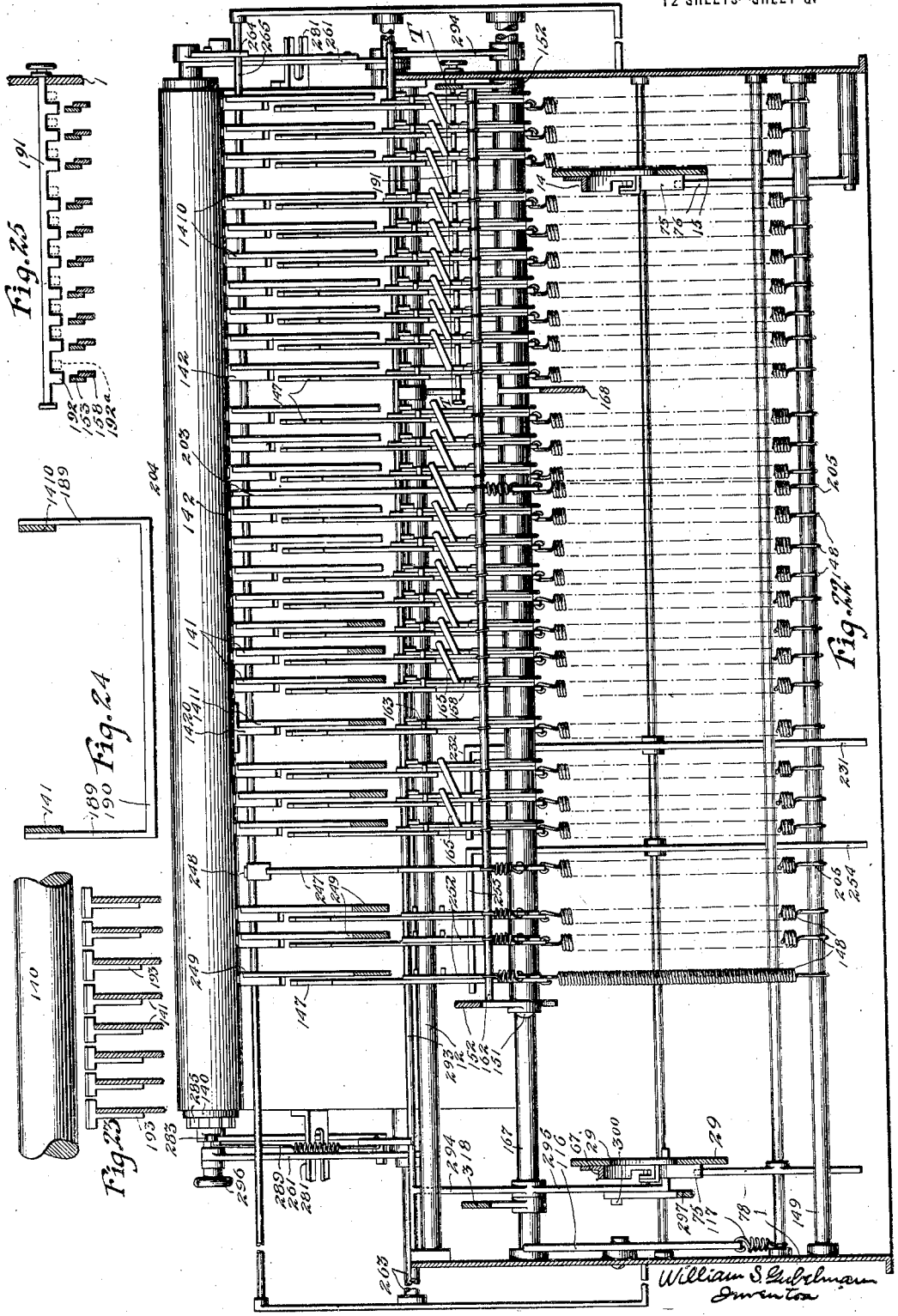

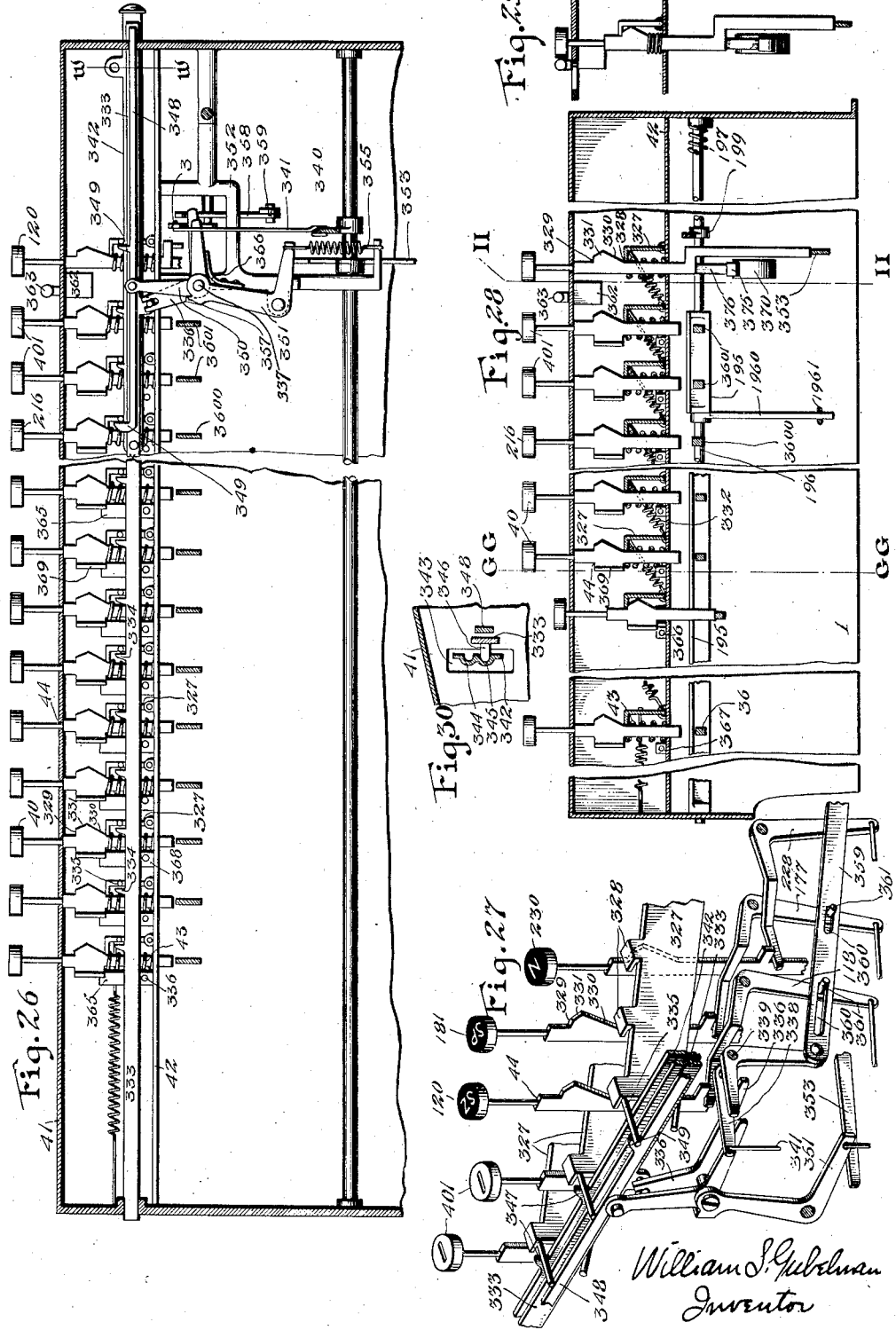

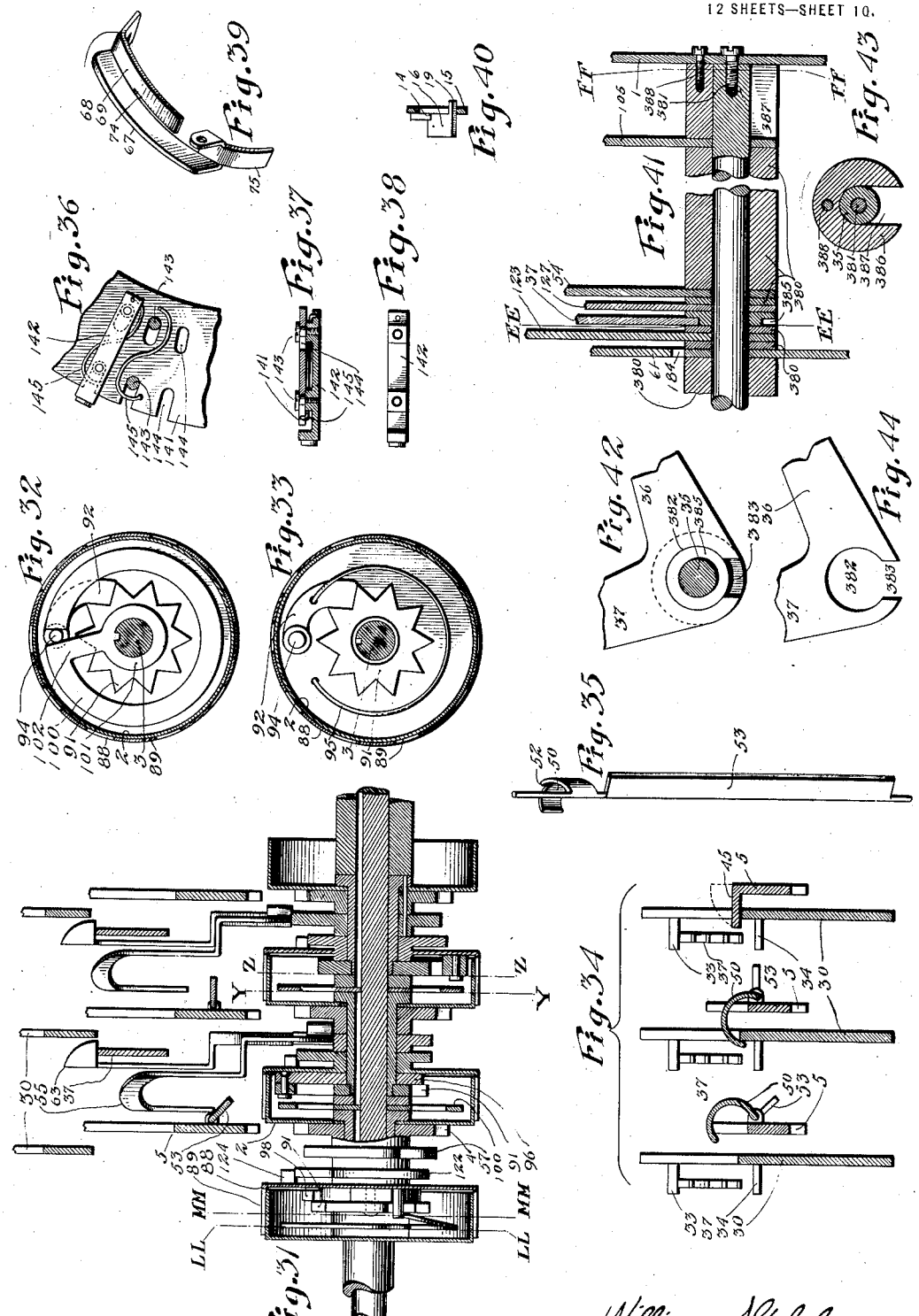

W. S. GUBELMANN.
ADDING AND RECORDING MACHINE.
APPLICATION FILED APR. 10, 1922.
1,429,202. Patented Sept. 12, 1922.
12 SHEETS—SHEET 11.
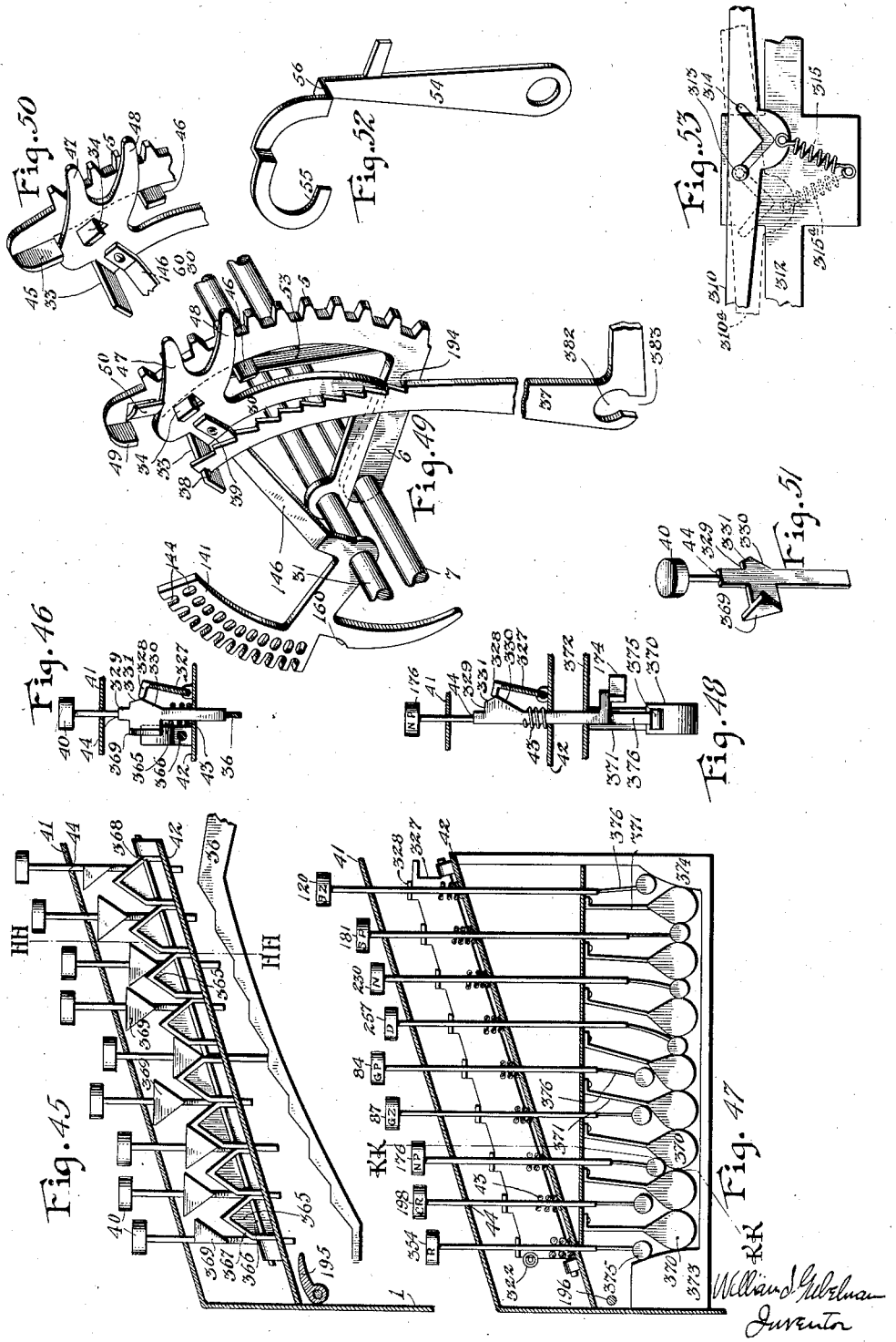

W. S. GUBELMANN.
ADDING AND RECORDING MACHINE.
APPLICATION FILED APR. 10, 1922.
1,429,202.
Patented Sept. 12, 1922.
12 SHEETS—SHEET 12.
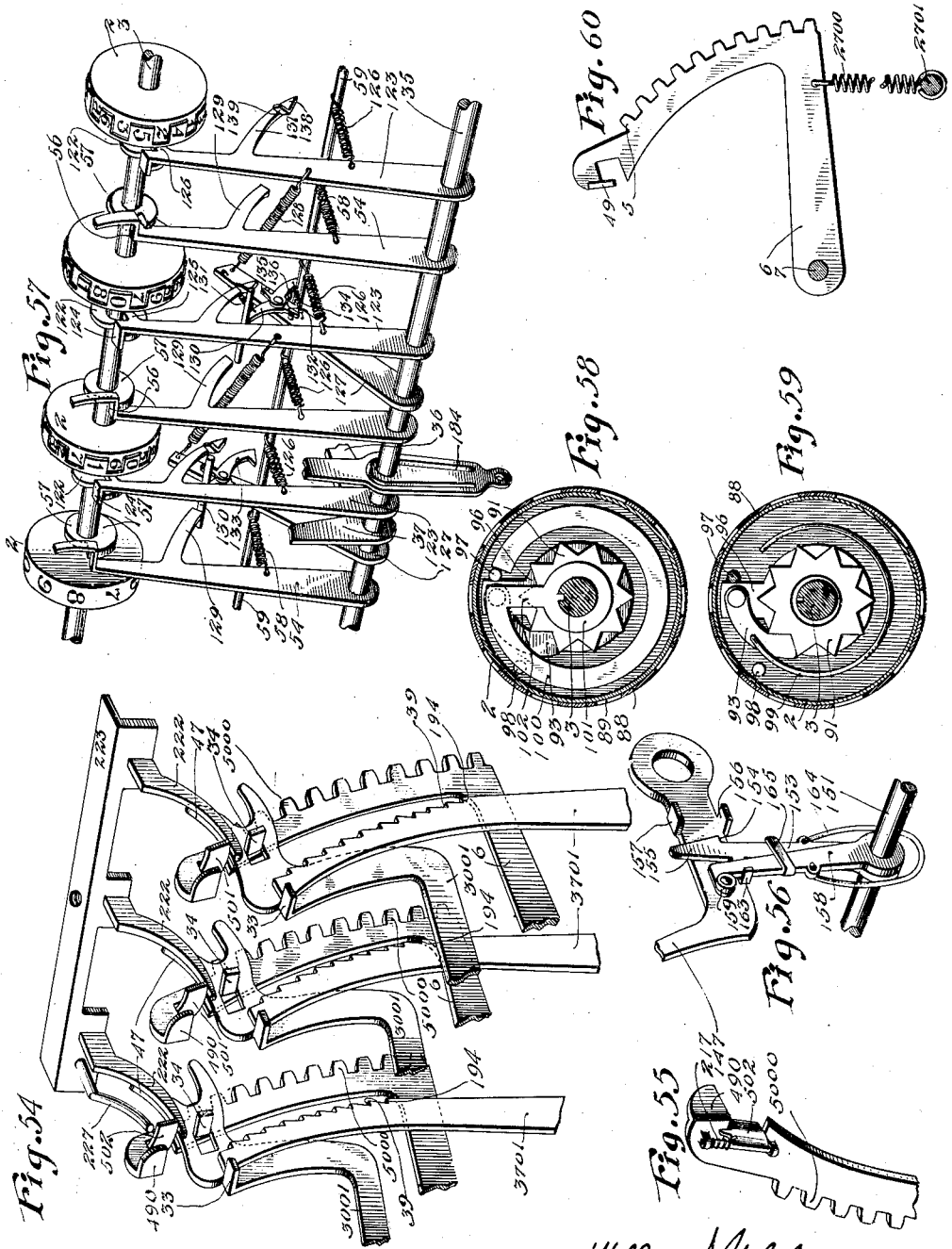

Patented Sept. 12, 1922.

1,429,202

UNITED STATES PATENT OFFICE.

WILLIAM S. GUBELMANN, OF BUFFALO, NEW YORK.

ADDING AND RECORDING MACHINE.

Application filed April 10, 1922. Serial No. 551,298.

*To all whom it may concern:*

Be it known that I, WILLIAM S. GUBELMANN, a citizen of the United States, residing in Buffalo, in the county of Erie and State of New York, have invented new and useful Improvements in Adding and Recording Machines, of which the following is a specification.

This invention relates to an adding and recording machine. The principal objects of this invention are to improve the means for adding and recording numbers; to permit of printing words in connection with the numbers; to permit of recording in duplicate the numbers which have been added; to provide means whereby the total of a group of numbers may be registered and recorded at the same time that these numbers are being added to the grand total of all the numbers which have been added together; to provide means whereby two separate sets or groups of numbers may be added simultaneously; to provide means whereby a number standing on any totalizer may be transferred additively or subtractively to another totalizer of the same group; to provide means whereby the number of individual adding operations may be registered and recorded consecutively; to permit of printing the date together with the numbers which are added, to provide an improved construction of paper carriage and connecting parts; to provide groups of keys with distinctive marks so as to facilitate manipulating the same; to provide means which prevent the depression of more than the correct number of keys; to provide means for readily producing vertical and horizontal ruling on the record, and to improve the machine in other respects.

This invention relates to improvements in mechanism for transferring the amount from one totalizer to another either additively or subtractively in calculating and like machines and is a division of my pending application, Serial No. 1004 filed Jan. 10, 1900. Only such of the mechanism herein described as refers to means for transferring an amount either additively or subtractively to either of the totalizers, algebraic totalizers and mechanism for printing items, columns appropriate to the different totalizers is claimed herein.

In the original application, Serial No. 1,004 filed January 10, 1900, is claimed grand total mechanism and combinations therewith broadly.

The following is a list of the divisions of said parent application 1,004 and the subjects matter claimed in each:

Serial No. 183,397 filed July 30, 1917, general combinations of all the mechanism of the machine exclusive of the grand total mechanism and not falling more particularly under one of the other divisions.

Serial No. 183,398 filed July 30, 1918, general combinations drawn to a simple adding machine.

Serial No. 254,065 filed Sept. 14, 1918, ribbon feeding and reversing mechanism.

Serial No. 123,842 filed Oct. 5, 1916, printing mechanism.

Serial No. 130,583 filed Nov. 10, 1916, key mechanism.

Serial No. 251,476 filed Aug. 26, 1918, counting mechanism.

Serial No. 257,465 filed Oct. 9, 1918, numbering mechanism.

Serial No. 264,629, filed Nov. 27, 1918, mechanism for transforming an adding and listing machine into a counting and numbering machine.

Serial No. 260,030, filed October 28, 1918, carriage mechanism.

Serial No. 245,336 filed July 17, 1918, vertical ruling mechanism, now Patent No. 1,370,499, dated March 1, 1921.

Serial No. 258,051, filed October 14, 1918, split calculating machine.

Serial No. 242,395 filed June 28, 1918, carriage mechanism.

Serial No. 246,158 filed July 22, 1918, non-print mechanism.

Serial No. 248,127 filed Aug. 3, 1918, eliminating or non-add mechanism.

Serial No. 249,303 filed August 10, 1918, repeating mechanism.

Serial No. 261,806 filed Nov. 9, 1918, distinguishing means for the keys and dials.

Serial No. 249,905 filed Aug. 14, 1918, key interlocking mechanism, now Patent No. 1,334,533 granted March 23, 1920.

Serial No. 243,444 filed July 5, 1918, paper supporting means, now Patent No. 1,372,748 granted Mar. 29, 1921.

Serial No. 251,778 filed Aug. 28, 1918 for word printing mechanism.

Serial No. 256,263 filed Sept. 30, 1918, dating mechanism for calculating machines and like machines, now Patent No. 1,348,942, granted Aug. 10, 1920.

Serial No. 244,575 filed July 12, 1918, horizontal ruling mechanism, now Patent No. 1,333,307 granted Mar. 9, 1920.

Serial No. 250,536 filed August 19, 1918, duplicate printing mechanism.

One of the objects of the invention is to provide improved means for adding the amount appearing on one totalizer to the amount standing on another totalizer.

Another object is to provide the regular number type carriers with means whereby the same may be set to print a total from either of a plurality of totalizers prior to the transferring of the amounts standing thereon to another totalizer.

Another object is to provide means for subtracting the amount standing on any of a plurality of totalizers from the amount standing on any other totalizer with means for printing the amount subtracted.

Another object is to provide means for indicating a true negative and positive total with means for indicating an incorrect total.

Another object is to provide means for printing items in columns appropriate to the totalizers actuated so that on numbers appearing in a particular column indicates that said items have been added in the one or the other of a plurality of the totalizers.

Another object is to provide means for printing a correct total irrespective of whether said total is positive or negative.

Another object is to provide means for printing arbitrary characters at the will of the operator in conjunction with any items added in one or more of the totalizers.

Another object is to provide means for printing arbitrary characters at the will of the operator in connection with the totals printed under the control of a totalizer from any of a plurality of totalizers.

The word "grand-total" as used in this description of the machine is intended to mean the sum or aggregate of all the numbers which are added by the machine and the word "sub-total" is intended to mean the sum of any group of numbers forming part of or included in the sum of all the numbers added by the machine.

In the accompanying drawings consisting of twelve sheets:

Figure 2 is a vertical longitudinal section of the same, taken substantially in line A—A, Figure 1, and showing the adding and recording mechanism of one column or set of keys in the normal or inoperative position.

Figure 3 is a fragmentary sectional elevation of the printing mechanism of one of the rows of keys viewed from the side opposite to that shown in Figure 2.

Figure 4 is a fragmentary sectional elevation taken in line B—B, Figure 1, and showing the devices whereby numbers are printed in duplicate.

Figure 5 is a horizontal section in line C—C, Figure 3.

Figure 6 is a vertical section in line D—D, Figure 3.

Figure 7 is a view similar to Figure 2 with the paper carrying device omitted and showing the parts of the adding and recording mechanism in a shifted position.

Figure 8 is a fragmentary longitudinal sectional elevation taken substantially in line E—E, Figure 1, and showing the mechanism whereby words are printed.

Figure 9 is a fragmentary longitudinal sectional elevation taken substantially in line F—F, Figure 1, and showing the mechanism whereby the number of adding operations of the machine are separately added and recorded.

Figure 10 is a fragmentary elevation of one of the main registering gear segments viewed from the side opposite to that shown in Figures 2, 7 and 9.

Figure 11 is a fragmentary longitudinal sectional elevation taken substantially in line G—G, Figure 1, and showing the mechanism whereby the months and days are recorded.

Figure 12 is a similar section, taken in line H—H, Figure 1, and showing the mechanism whereby the year is printed.

Figure 13 is a similar section, taken in line I—I, Figure 1, and showing the preferred means for producing vertical ruling on the sheet which receives the record.

Figure 14 is a longitudinal sectional elevation, taken substantially in line K—K, Figure 1, and showing particularly the paper carriage and the mechanism whereby different parts of the machine may be thrown into and out of gear.

Figure 15 is a vertical transverse section, on a reduced scale, taken in line L—L, Figure 14, and showing the means for supporting two rolls of web-paper, for manifold recording.

Figure 16 is a fragmentary vertical section, taken in line M—M, Figure 15, and showing the means for holding the paper spindle in place.

Figure 17 is a detached side elevation of the paper carriage, viewed from the side opposite to that shown in Figure 14.

Figure 20 is a vertical section, taken substantially in line P—P, Figure 2.

Figure 21 is a fragmentary transverse section, taken in line Q—Q, Figure 2, and showing the means for adjusting the paper carriage lengthwise of the line of printing.

Figure 22 is a vertical transverse section taken in line R—R, Figure 2.

Figure 23 is a fragmentary section taken in line S—S, Figure 7, and showing the preferred means for producing horizontal or cross ruling on the surface which receives the record.

Figure 24 is a fragmentary cross section showing the means for connecting one of the main printing segments with its companion duplicate printing segment.

Figure 25 is a fragmentary horizontal section taken in line T—T, Figure 22, and showing the means whereby the duplicate printing segments may be rendered operative or inoperative.

Figure 26 is a fragmentary transverse sectional elevation taken in line U—U, Figure 2, and showing the mechanism for holding the keys in their depressed position and for releasing the same.

Figure 27 is a fragmentary perspective view of the key holding and releasing mechanism.

Figure 28 is a fragmentary transverse sectional elevation, taken in line V—V, Figure 2.

Figure 29 is a similar view showing one of the keys locked in a depressed position.

Figure 30 is a fragmentary vertical section in line W—W, Figure 26.

Figure 31, is a horizontal section, on an enlarged scale, taken substantially in line X—X, Figure 2, and showing a number of the main registering dials and the adjacent actuating mechanism.

Figures 32 and 33 are vertical sections taken in lines Y—Y and Z—Z, Figure 31, respectively.

Figure 34 is a fragmentary horizontal section, on an enlarged scale, taken in line A—A, A—A, Figure 2.

Figure 35 is a perspective view of one of the latches forming part of the mechanism, whereby the addition of numbers is carried from each registering dial to the next higher dial.

Figure 36 is a fragmentary sectional side elevation of one of the printing segments showing the means for mounting the type movably thereon.

Figure 37 is a cross section of the type segment taken in line B—B, B—B, Figure 36.

Figure 38 is a side view of one of the type carriers viewed from the side opposite to that shown in Figure 36.

Figure 39 is a perspective view, showing one of a pair of substantially similar cams, one of which serves to shift the main dial operating segments into their operative position and the other one of which serves to shift the parts into position for printing a total of the added numbers.

Figure 40 is a vertical section in line C—C, C—C, Figure 7.

Figure 41 is a fragmentary vertical section, on an enlarged scale, taken in line D—D, D—D, Figure 9, and showing the means for supporting the key levers and adjacent parts.

Figures 42 and 43 are vertical sections in lines E—E, E—E and F F—F F, Figure 41, respectively.

Figure 44 is a fragmentary detached view of one of the key levers.

Figure 45 is a fragmentary longitudinal sectional elevation, taken in line G G—G G, Figure 28, and showing the mechanism whereby only one key can be held in a depressed position at a time.

Figure 46 is a cross-section in line H H—H H, Figure 45.

Figure 47 is a fragmentary longitudinal sectional elevation, taken in line I I—I I, Figure 28, and showing the mechanism whereby a group of keys may be held in a depressed position and this group will be released if any keys in excess of the proper number are depressed.

Figure 48 is a cross section in line K K—K K, Figure 47.

Figure 49 is a fragmentary perspective view showing the key lever, the main gear segment, the controller arm and the printing segment of one of the higher columns of numbers.

Figure 50 is a fragmentary perspective view of the units register of the main adding mechanism.

Figure 51 is a perspective view of one of the registering keys.

Figure 52 is a perspective view of one of the trip arms forming part of the device, whereby a number is carried from a lower to a higher dial.

Figure 53 is a fragmentary view, on an enlarged scale, of the mechanism for automatically reversing the ink ribbon of the recording mechanism when the same reaches the end of its movement in either direction.

Figure 54 is a fragmentary perspective view of the auxiliary adding mechanism.

Figure 55 is a fragmentary perspective view of the units register of the auxiliary adding mechanism.

Figure 56 is a fragmentary perspective view of the hammer operating mechanism.

Figure 57 is a fragmentary perspective view of the sub-total dial operating mechanism and adjacent parts, the same being shown separated abnormally for the purpose of illustrating the construction clearly.

Figures 58 and 59 are cross sections in lines L L—L L and M M—M M, Figure 31, respectively.

Figure 60 is a fragmentary sectional view of one of the main registering gear segments, showing a modification in the arrangement of its operating spring.

Like letters of reference refer to like parts in the several figures.

Figure 1:
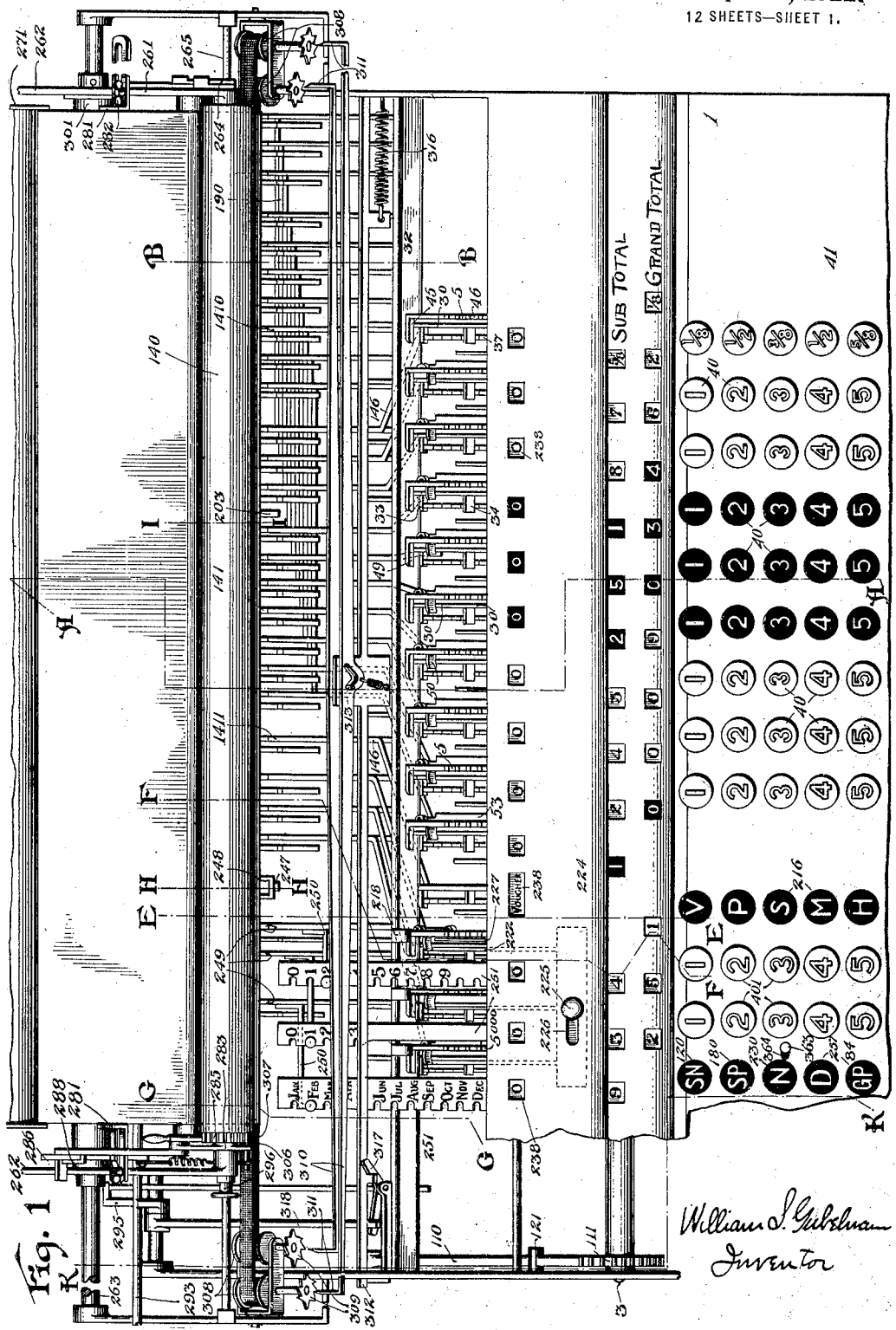
Figure 1 is a fragmentary top plan view of my improved adding and recording machine.

1 represents the main frame of the machine which may be of any suitable construction so as to support the working parts of the machine. 2,—Figures 2, 7, 9, 18, 31, 32, 33, 58, 59, and 60, represents a number of main dials which register the grand-total of the numbers which are added together. These dials consist preferably of cup-shaped wheels which are numbered on their periphery and are mounted in their proper order on a transverse dial shaft 3, which is journaled in bearings on the main frame, the dials being so arranged that the dial representing the lowest number is arranged on the right hand end of the series and the dials representing the successively higher numbers being arranged successively in their order toward the left—from the dial representing the lowest number. The lowest or right hand dial is preferably divided on its periphery into one eighths so as to indicate fractions of a cent in eighths, and the remaining dials are graduated on their periphery according to the decimal system into tenths. As shown in the drawings ten grand-total dials are shown and extend from fractions of a cent to tens of millions, but if desired, additional dials may be added to the right and to the left of the series, if it is desired to register smaller divisions of a cent or more than tens of millions. Each of the main or grand-total dials 2 is provided on its left hand side with a gear pinion 4, which is rigidly connected therewith, as shown in Figures 2, 7, 9, 18 and 31. The pinion of the fraction wheel has eight teeth while the pinions of the remaining dials are each provided with ten teeth. 5 represents the main registering gear segments, one of which is provided for each of the dials 2 and is adapted to engage with the pinion thereof, for operating the respective dial.

*Actuators, operating lever and connections, and timing of actuators and totalizer engagements.*

Each of these gear segments is arranged in rear of its companion gear pinion and is provided at its lower end with a rearwardly projecting arm 6 which is pivoted loosely on a transverse supporting rod 7. This rod is mounted with its ends on the upper ends of two rock arms 8 which turn loosely with their lower ends on a transverse rock-shaft 9. The rock-arms 8 are connected by a transverse bar 10 which compels the two arms to move back and forth together. In the normal position of the gear segments when the machine is at rest these segments are retracted rearwardly out of engagement with the dial pinions of the dials and the segments are elevated so that their lowermost teeth are opposite the spaces between the adjacent teeth of the dial pinions, these spaces being in line with the pivots of the pinions and the gear segments. The gear segments are yieldingly held backwardly out of engagement with the dial pinions by means of springs 11 connecting the rock-arms 8 with a stationary part of the frame. Figure 14 shows one of the springs 11 connecting one of the rock-arms 8 with a transverse stationary bar 12 in the rear part of the machine. The gear segments are moved forwardly so that their teeth engage with the dial pinions 4 by means of a shifting rock-arm 13, which is preferably secured to the right hand rock-arm 8 and projects rearwardly. Upon raising the shifting rock-arm 13, the rock-arms 8 are swung forwardly and the gear segments 5 are engaged with the dial pinions, while upon swinging the shifting rock-arms downwardly, the rock-arms 8 are swung rearwardly and the gear segments are disengaged from the dial pinions. 14 represents a cam whereby the gear segments are engaged with the dial pinions. This cam is mounted on the upper portion of a vertically swinging rocking frame 15 which is arranged on the right hand side of the machine. This cam is provided at its front end with an incline or cam face 16 and at its rear end with a concentric face 17. When the cam is in its rearmost or retracted position, its incline stands in rear of a roller or projection 18 on the rear end of the shifting arm 13, as shown in Figures 2, 7, 9 and 20. Upon swinging the rocking frame 15, so that the cam 14 moves forwardly, the incline of the latter engages underneath the roller 18 and raises the arm 13, thereby moving the arms 8 forwardly. The throw of the incline 16 is just sufficient to engage the teeth of the gear segments with the dial pinions. When the roller 18 has been raised to the top of the incline, the concentric portion of the cam engages with the roller during the continued forward movement of the cam and the latter does not shift the gear segments any further forward. When the rear end of the concentric face 17 of the cam passes forwardly from underneath the roller 18, the constant pull of the springs 11 causes the rock-arm 13 to be depressed and the rock-arms 8 to be moved rearward, thereby disengaging the gear segments from the dial pinions. Upon now moving the cam 14 backwardly together with the rocking frame 15, this cam does not effect the arm 13 and the parts connected therewith until the last portion of the backward movement of the cam, at which time the back or lower side of its incline engages with the roller 18 and lifts the same, and at the end of the backward movement of the cam, the latter clears said roller and drops behind the same, as shown in Figure 2, preparatory to again raising the roller 18 and connecting parts during the next forward movement of the cam 14. For the purpose of permitting the front end of the cam to rise so as to clear the roller 18, this cam is pivoted at its rear end to the rear portion of the rocking frame 15. The upward and downward movement of the front end of the cam is limited by means of a lug 19 projecting from the side of the cam and engaging with a slot in the adjacent part of the rocking frame 15, as shown in Figures 20 and 40. The rocking frame is secured with its lower portion to a transverse rock-shaft 20 journaled in the main frame and provided outside of the frame with a hand crank 21, as shown in Fig. 20, whereby this shaft is rocked and the parts connected therewith are operated. The gear segments 5 are raised to their highest position by means of a return or lifting bar 22 which extends transversely underneath all of the arms 6 of the gear segments and which is connected loosely at its rear ends with the transverse rod 7 by lifting plates 23. 24 represents two shifting arms which are mounted loosely at their rear ends on the rock-shaft 20 and which are connected at its ends by two links 26 with the lifting plates 23, whereby upon raising the shifting arms 24, the lifting bar 22 is caused to raise the gear segments and the other parts connected therewith resting on said bar. Upon depressing the transverse bar 25, the lifting bar 22 is moved downwardly and the gear segments resting thereon are permitted to move downwardly with the bar until the segments are arrested. Each of the gear segments is yieldingly held in contact with the lifting bar 22 by a spring 27 which connects the arm of the segment with the transverse bar 25. If the downward movement of the gear segment is arrested while the shifting arms 24 continue to move downwardly, the lifting bar 22 is moved away from the underside of the arm of the gear segment and the spring 27 strained. The transverse bar 25 is arranged in one end in a segmental notch 28 formed in the front part of the rocking frame 15, shown in Figures 2, 7, 9 and 20, and its opposite end is arranged in a similar segmental notch 28, formed in a rocking frame 29 which is secured to the operating shaft 20 on the left-hand side of the machine. When the machine is at rest, as shown in Figure 2, the transverse bar 25 engages with the front side of the notches 28 in the rocking frame 15 and 29. Upon turning the rocking shaft 20 forwardly by means of its handle 21 in the direction of the arrow, Figure 2, the rocking frames are moved forwardly during the first part of the movement independent of the transverse bar 25. The latter remains at rest until the inclined front end 16 of the cam 14 has raised the arm 13 and moved the gear segments into engagement with the dial pinions, during which movement the rocking frames move idly the extent of their notches 28 along the ends of the bar 25 without disturbing the latter. After the gear segments have been engaged with the dial pinions, the continued forward movement of the rocking frames causes the rear ends of their notches 28 to engage with the bar 25 and depress the same, thereby causing the lifting bar 22 to be moved downwardly and strain the springs 27. This causes all of the gear segments which are free, to be moved downwardly and to continue their downward movement until they are arrested. During the downward movement of the gear segments, while they are in engagement with the dial pinions, the latter and the dials connected therewith are turned in the direction of the arrow, Figure 7, until the downward movement of the segments is arrested. The extent which each dial is turned depends upon the position in which the downward movement of its operating segment is arrested. After the segments have been arrested in their downward movement, they remain in this position while the rocking frames complete their forward movement. At the end of the forward movement of the rocking frames, the roller 18 of the rock arm 13 drops off from the rear end of the concentric part of the cam 14, thereby causing the springs 11 to pull the gear segments rearwardly out of engagement from the dial pinions. Upon now turning the rock-shaft 20 backwardly by means of the handle 21, the rocking frames are moved with their notches 28 backwardly, independent of the bar 25, until the front ends of the notches engage with this bar. When the latter is so engaged it is moved backwardly with the rocking frames to the end of their rearward movement which causes the transverse bar 25 to lift the lifting bar 22 and the gear segments which have been depressed into their highest or normal position. During this upward movement of the depressed gear segments they are out of engagement with the dial pinions, whereby the dials are not turned backwardly with the segments, but remain in their shifted position. 30 represents a number of elbow-shaped controlling arms, which form part of the devices whereby the downward movement of the registering gear segments is controlled. One of these arms is arranged along the left-hand side of each gear segment and consists of an upright front part and a horizontal lower part which extends rearwardly from the lower end of the upright part, thereby leaving a clear space in rear of the upright part of the controlling lever, as represented in Figures 1, 2, 7, 9, 18, 31, 34, 49, 50, and 54. The rear end of the lower part of each controlling arm is mounted loosely on a transverse supporting bar 31, while the upper end of the front or upright part is loosely connected with the upper portion of its companion gear segment. This loose connection permits the controlling arm and the gear segment to swing freely about their individual centers, which are arranged parallel but out of line, and also permits the gear segment to move forward and backward into and out of engagement with its companion dial pinion. In the uppermost position of the controlling arms 30 the same bear with their upper ends against a transverse stop bar 32, as shown in Figure 2, which limits the upward movement of these arms. The upper portion of each controlling arm is provided on the rear part of its upper end with a locking lug 33, and on the front part of its upper end with a stop lug 34, both of which lugs project toward the left and are preferably stamped out of one piece with the controlling arm.

*Key levers or differential mechanism.*

The operation of the registering devices is controlled by a number of elbow-shaped key levers which are arranged side by side and pivoted to a transverse supporting rod 35. Each key lever is provided with a lower actuating arm 36 which projects forwardly and an upper stop arm 37 which projects upwardly along the left hand side of one of the controlling arms and gear segments, as represented in Figures 2, 7, 18, 31 and 49. Each of these key levers is provided on the rear side of its stop arm with a locking shoulder 38 which is adapted to engage with the locking lug 33 of the controlling arm when the latter is elevated into its highest position and the key-lever is in its fully retracted position, as shown in Figure 2. When the parts are in this position, the key lever holds the controlling arm against downward movement and the latter holds the gear segment against downward or forward movement. If the gear segment while so held against downward movement is moved forward into engagement with the adjacent dial pinion and the rocking frames are turned forwardly for depressing the gear segment, the spring 27 of this segment will be strained without however, shifting the segment. At the end of this forward movement of the rocking segments, the roller 18 of the rock arm 13 drops off from the rear end of the cam 14, the gear segment is moved rearwardly out of engagement from the dial pinion and then the rocking frames move backwardly without having shifted the dial. The upper arm of each key lever is provided on its front side with a vertical series of differential stop shoulders 39, which are arranged step fashion and extend from the upper end of this arm downwardly and forwardly thereon, or in other words the stop shoulders 39 are arranged radially out of line with one another and different distances from the pivot of the key lever. These stop shoulders of the key lever are adapted to be moved forwardly into the path of the stop lug on the controlling arm 30. The stop shoulders 39 are arranged different distances from the stop lug of the controlling arm, so that by moving different stop shoulders of the key lever into the path of the stop lug of the controller arm, the latter and the gear segment connected therewith may be arrested at different points in their downward movement. The uppermost stop shoulder of the key lever is most remote from the stop lug of the controlling arm and therefore requires the greatest forward movement of the key lever, in order to bring this stop shoulder into the path of this stop lug. The stop shoulders of the key lever are so arranged that the distance from the stop shoulders to the path of the stop lug gradually grows less from the uppermost stop shoulder to the lowermost stop shoulder. The relative position of the different stop shoulders of the key lever is such that when its locking shoulder 38 remains in engagement with the locking lug 33 and the gear segment is simply moved into and out of engagement with its dial pinion, the latter remains at zero, if the same has not been previously moved. But when the key lever has been moved forwardly, so as to disengage its locking shoulder from the locking lug and moves one of its stop shoulders into the path of the stop lug of the controlling arm, the latter arm and gear segment connected therewith will be moved downwardly or forwardly, upon moving the rocking frames forwardly, until the stop lug of the controlling arm strikes the respective stop shoulder of the key lever which stands in its path, as represented in Figure 7, whereby the gear segment while turning in engagement with the adjacent dial gear pinion turns the same forward. By turning the key lever forward more or less and moving one or the other of its stop shoulders into the path of the stop lug of the controlling arm, the distance which this arm descends can be varied, thereby varying the number of spaces which its gear segment turns the adjacent dial.

40 represents the main keys whereby the key levers of the main registering and recording mechanism are operated, and which are guided with their depending stems in the top 41 and bottom 42 of the key-board. As shown in the drawings, nine longitudinal columns of these keys are arranged transversely side by side. The first column on the right hand side of the machine contains eight keys and represents fractions of one-eighth of a cent, the next column toward the left contains nine keys and represents cents and the remaining columns of keys toward the left each contains nine keys and represents progressively higher orders of numbers according to the decimal system, so that the registering keys in the last or left hand column represent hundreds of thousands. The lowest number of the several columns of keys are arranged transversely in a row on the rear part of the key-board and the corresponding higher numbers of the several columns are arranged likewise in transverse rows and progressively in their order toward the front end of the key-board. Each of the registering keys is yieldingly held in an elevated position by a spring 43 surrounding the stem of the key and connected at its upper end to the key and bearing with its lower end against the bottom of the key-board. The upper movement of each key is limited by a shoulder 44 formed on the upper part of its stem and engaging with the underside of the top of the key-board, as represented in Figures 26, 28, 46 and 47. The downward movement of all of the keys is substantially the same, but the arrangement of each column of keys lengthwise of the lower actuating arm of each key lever causes the keys to bear against the lever at different distances from its pivot so that by depressing different keys the same distance, the key lever will be turned different distances. The keys having the lowest number bear against each key lever nearest its pivot and consequently this lever is thrown the greatest distance, and its uppermost stop shoulder is shifted into the path of the stop lug of the controlling arm. The throw of each key lever upon depressing any one of its keys is so adjusted, that the proper stop shoulder on its upper arm is moved into the path of the stop lug of the controlling arm and the downward movement of the respective gear segment is arrested after having turned the adjacent dial gear pinion a number of spaces corresponding to the number of the key which is depressed. The loose connection between each controlling arm and its gear segment, heretofore referred to, is shown in its simplest form in the connection between the controlling arm and the gear segment, which are controlled by the initial or lowest column of registering keys. As shown in Figures 1, 18, 34 and 50, the loose connection between the controlling arm and the gear segment of the lowest registering device consists of upper and lower guide lugs 45 and 46 arranged on the upper end of the segment and bearing against the upper and lower guide faces 47 and 48, which are formed on the upper end of its companion controlling arm.

As the controlling arm and segment rise and fall, the guide lugs of the segment slide back and forth on the guide faces of the arm. The guide faces are so constructed that the back and forth movement of the segment on the arm is radially with reference to the dial pinion in all positions of the segment. By so forming the guide faces of the arm, the gear segment can be engaged with and disengaged from the dial pinion in all positions of the segment without disturbing the position of the dial pinion. The construction of the loose connection between the controlling arms and gear segments of all of the higher registering devices above the fractional registering device are combined with carrying devices, whereby each registering dial, upon making one complete turn, causes the next higher dial to be turned forward one space, thereby carrying up a number from one column to the next higher column. The loose connections between the controlling arms and the segments and the carrying mechanism of the higher registering devices are constructed as follows:

As shown in Figures 1, 2, 7, and 18 and 50, each controlling arm is provided at its upper end with upper and lower guide faces 47 and 48 and its lower guide face is engaged by a lower guide lug 46 on the adjacent gear segment, the same as in the coupling between the controlling arm and segment of the intial registering device.

*Grand total transfer.*
The gear segments of the higher registering devices are each provided with an upper guide lug 49 which is adapted at times to bear against the upper guide face 47 of the companion controlling arm in substantially the same manner in which the upper guide lug 45 of the fractional gear segment bears against its companion arm, the only difference being that the upper guide lug 49 of the higher gear segments are held out of engagement and separated by a space from the upper guide face of the companion arm when no number is carried from a lower to a higher registering device. The upper guide lug 49 is held in this elevated position above the adjacent guide face by a rocking latch 50 which is arranged in a notch in the rear side of the gear segment and which normally projects toward the left and engages with the upper guide face 47 of the adjacent controlling arm, as shown in Figures 2, 34 and 50. During the ordinary up and down movement of each higher controlling arm and gear segment, the latter is guided by its lower guide lug 46 and the locking latch 50 engaging with the lower and upper faces of the adjacent arm, this movement being the same as the movement of the controlling arm and gear segment of the fractional registering device. Normally the downward movement of the controlling arm is determined by the position of its companion key lever and this arm in turn controls the extent of the downward movement of the gear segment. When however, the locking finger 50 is withdrawn out of engagement from the upper guide face 47 of the arm, the companion gear segment is capable of moving downward independent of the arm until the upper guide lug 49 engages with the upper guide face of the arm. The extent of this independent movement of the gear segment with reference to its companion arm is equal to one tooth or space of the segment, so that by this means the gear segment is enabled to turn the dial pinion one space more than the position of the key lever permits the same to move.

The withdrawal of the locking latch of each higher registering device is controlled by the next lower registering device and the withdrawal of each latch is effected when the next lower registering device has made one complete turn and arrived at zero. Each of the locking latches is pivoted on the right hand side of its adjacent gear segment, so as to turn transversely with reference to the latter. The latch is turned toward the left into its operative position by a spring 51, the movement in this direction being limited by a shoulder 52 arranged on the latch and bearing against the right hand side of the gear segment, as shown in Figure 10. 53 is an upright trip plate connected with the lower end of each latch and arranged normally at right angles or nearly so to the adjacent gear segment, when the latch is in its operating position. 54 represents a number of upright trip arms, each of which is controlled by a lower registering device and which turns the locking latch of the next higher registering device into an inoperative position. This arm is mounted loosely with its lower end on the supporting bar 35 and is provided at its upper end with a rearwardly and forwardly projecting hook 55, and in front and below said hook with a bend forming a bearing finger 56. 57 represents trip cams arranged on the left-hand side of each registering dial pinion and connected with the adjacent pinion and dial, but separated from the pinion by an intervening space or groove. The face of each of these cams begins at its lowermost point near the axis thereof and then extends outwardly in a spiral line terminating with its highest point radially in line with its lowermost point with which it connects abruptly. The trip cam of the fractional registering device has its face divided into eight parts, each part of which is arranged one-eighth of a space farther from the center of the cam than the preceding part, while the trip cams of the higher registering devices each has its face divided into ten parts, each part being arranged one tenth of a space farther from the axis of the cam than the preceding part. Each of the trip arms 54 extends upwardly along the right-hand side of the trip cam of a lower registering device and its shoulder 56 engages with the face of this cam, while the hook 55 at its upper end extends toward the left and is adapted to engage with the trip plates 53 of the next higher registering mechanism. In the initial position of each trip arm, its shoulder 56 engages with the lowest part of its trip cam, as represented in Figures 2, 9 and 31. As the trip cam is turned in the direction of the arrow, Figure 2, at the same time that its dial and gear pinion are moved forwardly by the adjacent gear segment during the adding operation, the trip arm is moved backwardly by the gradually rising face of the trip cam. During this backward movement of the trip arm, its hook engages with the trip plate 53 of the next higher registering device and is deflected toward the right thereby, the hook being sufficiently elastic for this purpose. After the hook has passed in rear of said trip plate, the hook, owing to its resilience springs back to its normal position, so as to stand behind said trip plate. When the shoulder of the trip arm reaches the highest part of the face on the trip cam the trip arm has been shifted to its rearmost position. Upon now turning this cam forwardly another space together with its companion dial and pinion, the highest part of the cam is carried from underneath the shoulder of the trip arm and the latter is moved forwardly over the abrupt face of the cam until its shoulder 56 again engages with the lowest part of the cam face. During this movement of the trip arm, its hook strikes the rear side of the trip plate 53 of the next higher registering mechanism and turns the same forwardly, as shown in figures 31 and 34, thereby disengaging the locking latch from the adjacent controlling arm and permitting the gear segment carrying the trip plate to move forward one space. The forward movement of the trip arm is effected when the dial with which its trip cam is connected has made one complete rotation and again stands at zero, whereby the addition represented by this complete rotation is carried to the next higher registering device. The forward movement of the trip arm is effected quickly by a spring 58, which connects with a stationary cross bar 59 arranged in front of the trip arms, as shown in Figure 57. The trip plate 53 of each registering device is so arranged and is of such length that the hook of the next lower trip arm can engage with the rear side of the plate, for disengaging its latch in any position of the gear segment carrying the plate. If a gear segment is locked in its highest position by reason of none of its companion keys having been depressed, the withdrawal of its latch from the controlling arm simply permits the gear segment to drop one space and turn its companion dial pinion forward one space, while in engagement therewith the movement of this dial representing one number carried up from the next lower dial. If any one of the keys of the key levers has been depressed, so as to release the gear segment and permit the same to move downwardly for effecting an addition, and if during this time the next lower registering device has made a complete turn, so as to require the carrying up of a number from the next lower registering mechanism, the latch of the higher registering device will be withdrawn while the same is effecting its addition, thereby causing the segment to descend and turn its dial one space in addition to the spaces corresponding to the depression of its respective key.

Resetting grand total transfer.

When the locking latch has been withdrawn so as to permit a gear segment to move downwardly one space farther than its controlling arm, the latch remains in this position during the subsequent upward movement of the arm and the segment until the upward movement of the arm is arrested by striking the stop bar 32 and the gear segment continues its upward movement independent of the arm the extent of one space. The gear segment has now reached its highest position and its latch is again swung automatically by its spring over the controlling arm. The controlling arm and gear segment now remain in this relative position until another number is to be carried up from the next lower registering device. When the controlling arm has been retracted to its highest position, the adjacent key lever is moved into its normal retracted position, so that its locking shoulder 38 engages with the locking lug 33 of the controlling arm and locks the latter against downward movement. The return movement of each key lever is preferably effected by a spring 60 which connects the upper arm of the key lever with the transverse shaft 9, as shown in Figures 2 and 7, or some other convenient part of the machine. The lower guide lug of the gear segment is not absolutely necessary because the weight of the parts connected with the controlling arm and arranged in rear of its pivot is sufficient to raise the arm, but it is preferable to employ this lower guide lug 46 on the gear segment because it compels the arm to rise with the gear segment and avoids displacement of these parts with reference to each other, and also serves as a stop to limit the upward movement of the gear segment. The gear pinion and the cooperating gear segment of the fractional registering device are so constructed that the fractional dial makes one rotation whenever it is moved forward eight spaces. After the fractional dial has made one rotation the whole number represented by this rotation is transferred by the first carrying device from the registering mechanism of the fractional dials to the next higher registering device which represents cents.

The complete turns of each of the following registering devices are in like manner carried or transferred to the next higher dial by the respective carrying device. The dial which records the highest number, in this instance the millions, is preferably operated only by the adjacent carrying device of the next lower dial and is incapable of being operated directly from the keyboard because it is not provided with a key operating mechanism.

Resetting grand total wheels and setting the key levers according to the position of the grand total cams.

The mechanism whereby the grand-total dials are all turned back to zero or the place of beginning after the addition of numbers has been completed is constructed as follows:

61 represents a series of feeling rock levers which are adapted to shift the key levers, so as to permit the gear segments to descend the proper distance for resetting or restoring the main registering dials to zero. One of these shifting levers is mounted loosely on the supporting bar 35 adjacent to the left hand side of each of the key levers and is provided on its upper arm with a forwardly projecting feeling finger 62 and with a shifting finger 63 which extends behind the upper arm of the adjacent key lever, as shown in Figure 31. The feeling levers have their fingers normally arranged in rear of the grand-total cams 57 and each of these levers is turned so that its upper arm moves backwardly by the upper arm of the adjacent key lever engaging with the shifting finger 63 of the feeling lever. 64 represents a transverse pull bar arranged in rear of the lower arms of the feeling levers and connected with each of the latter by a pull spring 65, as represented in Figures 2, 7 and 20. This pull bar is connected at its ends to the lower end of two depending pull or rock arms 66, which are secured at their upper ends to the rock shaft 9, as shown in Figure 20. Upon turning this rock-shaft, so as to swing its depending pull arms backwardly the feeling levers are turned by means of the springs 65 so as to move the upper arms of these levers forwardly. This movement of the rock-shaft 9 is effected by a cam 67, which is mounted on the left-hand side of the rocking frame 29 and which is constructed substantially the same as the cam 14 which is mounted on the rocking frame 15. As shown in Figures 14 and 22, this cam is pivoted at its rear end by a transverse pin to the rear portion of the rocking frame 29 and is provided at its front end with an incline or cam face 68. The cam 67 is pivotally supported on the rocking frame 29 in the same manner in which the like cam 14 is pivoted on its corresponding rocking frame 15, and in the rear of the incline with a concentric face 69. The cam 67 can be raised and lowered with its front end into an inoperative or operative position, this movement being limited by means of a lug 70 arranged on the cam as shown in Fig. 20 and projecting into a slot 71 in the adjacent rocking frame in the same manner in which the movement of the cam 14 is limited as shown in Fig. 40. 72, Figures 14 and 20, represents a rearwardly projecting rock-arm secured to the rock shaft 9 and provided at its rear end with a roller or projection 73 which is adapted to be engaged by the cam 67 for turning the rock shaft 9. When numbers are being added with the machine, the cam 14 is depressed, as shown in full lines, Figure 2, so as to be in a position when moved forwardly by the rocking frame 15 to engage the roller on the arm 13, for moving the gear segments into engagement with the dial pinions, and during this time the cam 67 is lifted into the position shown in full lines, Figure 14, so that when the rocking frame 29 is moved forwardly, the cam 67 will clear the roller 73 of the rock arm 72 and not disturb the rock-shaft 9 and the parts connected therewith. If it is desired to restore all of the grand-total dials 2 to zero, the cam 14 is raised into its inoperative position, shown by dotted lines 14 in Figure 2, and the cam 67 is lowered into its operative position, as shown by dotted lines 67ª in Figure 14. Upon now turning the rock shaft 20 by hand so as to move both rocking frames 15 and 29 forward, the cam 14 passes over the roller 18 of the arm 13 without disturbing the same, but the inclined front of the cam 67 engages with the roller 73 on the rear end of the rock-arm 72 and raises the same until this roller engages with the concentric part 69 of this cam. By this movement of the arm 72, the rock shaft 9 is turned in the direction for moving its depending arms 66 rearwardly and pulling the springs 65 rearwardly. This pull on the springs 65 causes the feeling levers to be turned until the feeling fingers of their upper arms engage with the spiral surfaces of the grand-total trip cams. After the feeling fingers bear against these cams, their movement is arrested and the continued backward movement of the pull bar 64 simply stretches the springs 65 until the bar reaches the end of its backward movement. The feeling finger of each feeling lever engages with that part of the surface of the adjacent trip cam which is directly opposite the feeling finger, and as these trip cams are turned with the adjacent grand-total dial they present different parts of their spiral surfaces to the opposing feeling fingers, which causes the forward movement of the upper arms of the feeling levers to be arrested in different positions when swung forwardly. During the forward movement of the upper arm of each feeling lever, its shifting finger 63 engages with the rear side of the upwardly projecting arm of the adjacent key lever and moves this arm forwardly. The construction of the parts is such that the spiral surfaces of the trip cam bears a definite relation to the step-shaped series of stop shoulders on the upper arm of the key lever. When the feeling finger of the feeling lever, upon being moved forwardly, bears against the lowest part of the adjacent trip cam, the adjacent key lever is carried simultaneously forward with the feeling lever the greatest distance and its uppermost stop shoulder is carried into the path of the stop lug of the controlling arm. The succeeding parts of the spiral surface of the trip cam are so constructed that they rise progressively higher and arrest the forward movement of the feeling lever when the same has carried the adjacent key lever with its corresponding stop shoulder into the path of the stop lug of the controlling arm. This forward movement of the feeling lever and that of the upper arm of the key lever is gradually reduced as the progressively higher parts of the trip cam are presented to the feeling finger, and when the highest part of the trip cam is presented to the feeling finger, the feeling lever is prevented from moving forward at all and the upper arm of the key lever is not moved with its locking shoulder out of engagement with the locking stop of the controlling arm and consequently the companion gear segment connected therewith is held against downward movement. After the rocking frames 15 and 29 have been turned forwardly sufficiently to engage with several feeling fingers of the feeling levers with their respective trip cams, the rear ends of the segmental notches 28 in the rocking frames engage with the cross bar 25 and depress the same, thereby moving the lifting bar 22 downwardly and at the same time pulling down the springs 27. This downward pull on these springs causes each spring to pull its respective gear segment down as far as possible, and after the downward movement of the segment has been arrested the continued downward movement of the cross bar 22 together with the rocking frames simply stretches these springs until this bar reaches the end of its downward movement. If a gear segment is locked in its uppermost or zero position its spring 27 will be stretched its fullest extent, whereas, if a gear segment moves downwardly more or less before it is arrested by its shifted key lever, its spring 27 will be stretched less in proportion. This downward movement of the gear segments which are free to move in this direction takes place while the gear segments are in their retracted position and out of engagement from the dial pinions, so that the dials are not affected by this movement of the segments. After the rocking frames have reached the end of their forward movement, and the roller 73 has dropped off from the rear end of the concentric portion 69 of the cam 67, the gear segments are moved forwardly by hand operated mechanism into engagement with their respective dial pinions and are held in this position during the entire subsequent backward movement of the rocking frames, which is effected by hand operated mechanism. During the backward movement of the rocking frames, the gear segments are raised to their highest positions, while in engagement with the dial pinions by the rod 22 and connecting parts and turn the dial backwardly. At the end of the upward movement of the gear segments the latter are released, so as to permit them to move into their retracted position, out of engagement from the dial pinions. During this operation, those gear segments which are held or locked in their highest positions, by reason of their dials being at zero, are simply moved forward at the end of the forward movement of the rocking frames, so as to engage with their respective dial pinions and are again moved backwardly out of engagement therefrom at the end of the backward movement of the rocking frames, without disturbing their respective dials. Each of the unlocked gear segments is moved downwardly a number of spaces corresponding to the number which is registered on its dial, the extent of this movement being controlled by the companion trip cam which arrests the forward movement of the key lever, through the medium of its feeling lever, when the proper stop shoulder of the key lever has been presented to the controlling arm.

Grand total indication.

Upon now moving the gear segments forwardly in their variously depressed positions and then raising them to their highest position, each depressed gear segment will turn its dial backward the same number of spaces that the gear segment was depressed. Inasmuch as each gear segment was permitted to descend by its trip cam, feeling lever and key lever the same number of spaces as the number indicated on its dial, the gear segment subsequently moves upwardly the same number of spaces before reaching its highest position, thereby turning its dial backwardly the same number of spaces and restoring the same to zero. When all of the dials have been returned to zero, the shoulders 56 of all the trip arms engage with the lowest part of all of the trip cams 57. The cam 67 is provided with a longitudinal slit 74, as shown in Figure 39, so as to render the rear end of the concentric part of this cam somewhat elastic. As the roller 73 of the rock-arm 72 engages with the elastic rear part of the cam 67, this portion of the cam is depressed gradually by the pressure of the roller 73 and connecting parts against the same, thereby causing the tension upon the pull springs 65 to be relaxed and easing off the forward or return movement of the depending rock arms 66 and connecting parts 8. The mechanism whereby the positions of the cams 14 and 67 are reversed preparatory to restoring the dials to zero is constructed as follows:

The cams 14 and 67 drop into their operative position by gravity. Each of these cams is provided in rear of its pivot with a tail 75 which is depressed when it is desired to lift the respective cam into its inoperative position.

Nonadd key, grand total printing key, and grand total zero key.

76 is a shifting lever which is pivoted at its lower end and is normally turned so that its upper end is disengaged from the rear side of the tail on the cam 14 by a spring 77, as shown in Figures 2 and 7. 78 is a shifting lever which is pivoted between its upper and lower arms and arranged with its upper arm in rear of the tail on the cam 67 and normally held in engagement therewith by a spring 79, as shown in Figure 14. 80 represents an elbow lever pivoted below the bottom of the key-board, as represented in Figure 14. 81 represents a main line or cord which is connected with the lower arm of the elbow lever 80 and which is provided at its rear end with two branches 82 and 83. The branch 82 connects with the shifting lever 76 above its pivot, and the branch 83 connects with the shifting lever 78 below its pivot. 84 represents grand-total shifting key having a depending stem which is guided in top and bottom of the keyboard and which bears with its lower end against the upper arm of the elbow lever 80. Upon depressing the key 84, the elbow lever 80 is turned, so as to draw the cords or lines 81, 82 and 83 forwardly, thereby moving the upper end of the shifting lever 76 into engagement with the tail of the cam 14 and lifting the same into an inoperative position, while the shifting lever 78 is moved rearwardly with its upper arm from the tail of the cam 67, thereby allowing the latter to drop into its operative position. Upon depressing the gear segments while the parts are in this shifted position, the segments move downwardly out of engagement with the dial pinions. After the gear segments have been depressed they are moved forwardly into engagement with their respective dial pinions by an elbow lever 85 which is connected with its lower arm by a line or cord 86 to the rod or bar 7, as shown in Figure 14, or to one of the rock arms 8. The elbow lever is turned in the proper direction for this purpose by a shifting key 87 having a depending stem which is guided in the top and bottom of the key-board and which bears against the upper arm of the elbow lever 85. After the gear segments have been moved forwardly into engagement with the dial pinions, while in the depressed position, the gear segments are retained in this position, and at the same time raised until they reach their uppermost position, whereby the dials are turned to zero. The shifting key 87 is now released which permits the spring 11 to move the gear segments rearwardly out of engagement with the dial pinions. The key 84 is also released, thereby permitting the shifting levers 76 and 78 to resume the positions shown in Figures 2 and 14, leaving the machine in position to resume adding. For the purpose of permitting the sub-total of a group of numbers to be obtained at any time without interfering with the grand-total of all the numbers which have been added the following mechanism is provided:

*Sub-total wheels.*

88 represents a number of circular sub-total dials, one of which is provided for each grand-total dial and is mounted loosely on the dial shaft 3 on the left hand side of its companion grand-total dial, as represented in Figures 18, 31–33 and 58–59. For the sake of making the machine compact the adjacent dials of two registering devices telescope one over the other, and in order to permit both the dials to be read the outer member of the telescoping dials is provided with notches 89 in its rim which uncover the numbers on the rim of the inner member of the telescoping dials. As shown in the drawings, the rim of each grand-total dial is made complete and arranged within the notched rim of the sub-total dial of the next lower registering device, but if desired, the rim of the sub-total dial may be made complete and arranged within the rim of the grand-total dial, which latter in this case is notched, so as to uncover the numbers of the sub-total dial. Each of the sub-total dials is graduated or numbered on its rim to correspond with its companion grand-total dial and is capable of turning simultaneously with its companion grand-total dial and also independent thereof. 90 represents a number of supporting sleeves, whereby the several registering devices are supported upon the dial shaft 3.

One of these sleeve is provided for each registering device and has the grand-total dial 2, the gear pinion 4 and the grand-total cam 57 of one of the registering devices rigidly secured to its right hand end, while the sub-total dial 88 of the same registering device is mounted loosely on the sleeve toward the left of its companion grand-total dial, as shown in Figure 31.

*Connection between the grand and sub-total wheels, and sub-total resetting pawls.*

91 represents a number of star wheels one of which is secured to the left hand end of the supporting sleeve 90 of each registering device, as shown in Figures 31–33 and 58–59. The star wheel of the fractional registering device has eight teeth, while the star wheels of the remaining registering devices each is provided with ten teeth, so that each star wheel corresponds to its companion registering device. Each star wheel is arranged in the space between the sub-total dial of its companion registering device and the grand-total dial of the next higher registering device, as shown in Figure 31. 92, 93 represent the pawls of the coupling devices whereby the sub-total dials are coupled with their companion grand-total dials. The coupling pawl 92 of the initial or first sub-total dial is pivoted by a pin 94 to the left-hand side of this sub-total dial and is held by a bow spring 95 in engagement with its companion star wheel 91, as shown in Figures 31–33. The spring 95 is secured with its ends to the initial sub-total dial and to its pawl and is sufficiently stiff to hold the pawl ordinarily in engagement with the star wheel and thereby cause the sub-total dial to turn with the grand-total dial, when the latter is shifted by the operating mechanism. Upon turning the sub-total dial and its pawl when the grand-total dial is held against movement, the tension of the spring 95 is overcome and the sub-total dial can be moved independently of its companion grand-total dial, during which movement the spring pawl simply trips from one tooth of the star wheel to another. The coupling pawl 93 of each of the higher registering devices engages with its companion star wheel 91 and is pivoted on an arm 96 which turns loosely on the adjacent supporting sleeve 90 between its star wheel and its companion sub-total dial. 97, 98 represent front and rear stops which are arranged on each higher sub-total dial in front and in rear of the arm 96 supporting its companion coupling pawl. 99 represents bow springs each of which is connected at one end to one of the higher coupling pawls 93 and at its other end to the adjacent higher sub-total dial, as represented in Figure 64. The tension of each of these springs holds its pawl yieldingly in engagement with the teeth of its star wheel and it also holds the sub-total dial with its front stop 97 yieldingly in engagement with the adjacent pawl arm 96, as shown in full lines of Figure 59, so that the sub-total dial when unrestrained moves with the pawl arm 96. By thus connecting each sub-total with its companion grand-total dial, the sub-total dial is capable of turning with its grand-total dial for any length of time and thereby separately adds the same group of numbers which have been added to the grand-total dial during this time, and then the sub-total dial can be turned backwardly to the zero point for separately adding the next group of numbers which are added to the grand-total dial, while the latter continues to add up all of the numbers. The sub-total dials are turned back to zero by a number of resetting pawls, one of which is arranged in each space between the adjacent telescoping dials of two registering devices. Each resetting pawl consists of a split ring 100, a hub 101 which is keyed or splined to the dial shaft 3 between two adjacent supporting sleeves 90 so as to turn positively with the shaft and a radial arm 102 connecting the rear end of the split ring, as shown in Figures 31, 32 and 58.

*Resetting subtotal and subtotal zero key.*

Figures 18, 19:
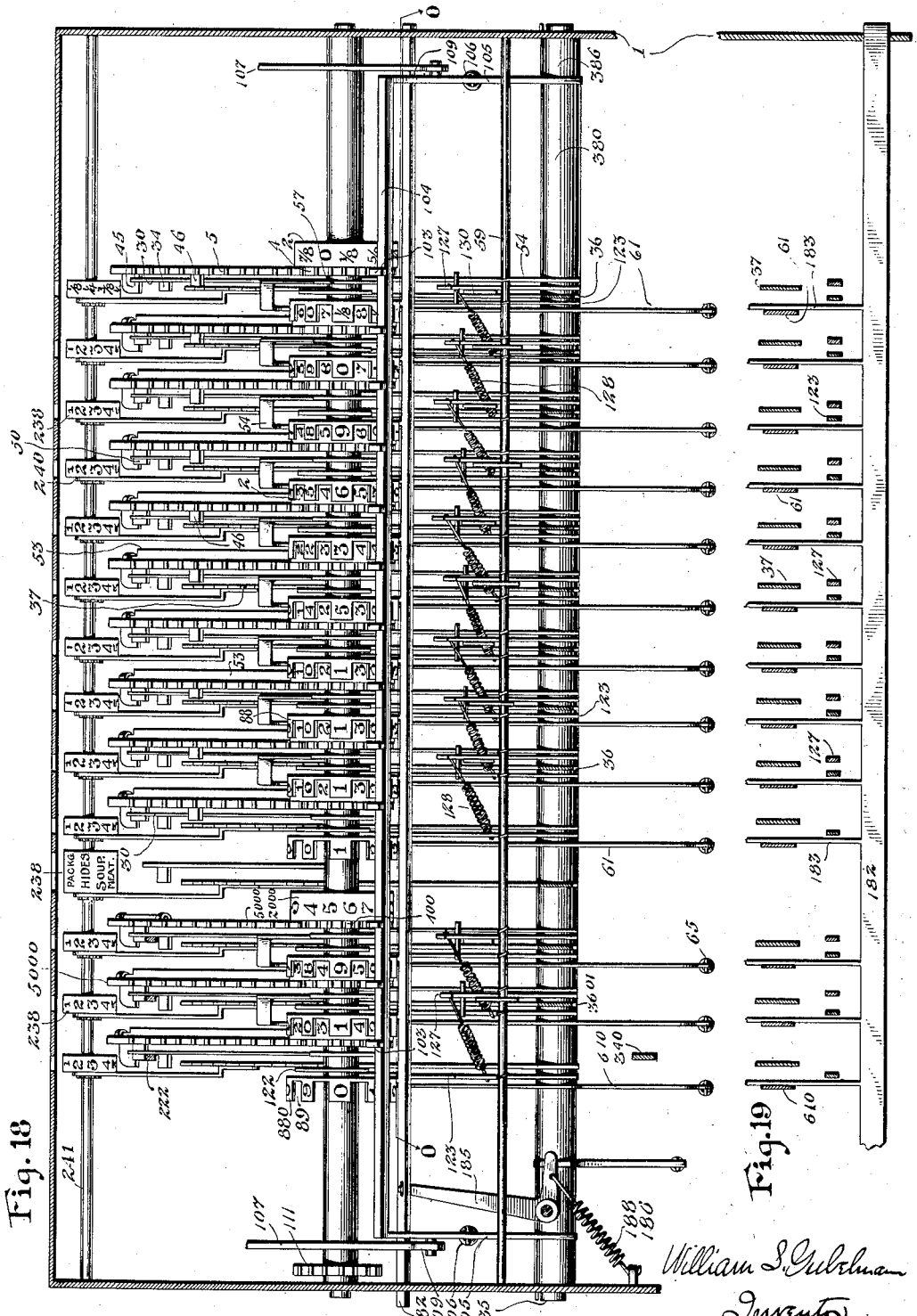
Figure 18 is a fragmentary vertical section, taken substantially in line N—N, Figure 2.
Figure 19 is a fragmentary horizontal section, taken in line O—O, Figure 18.

The front or free end of the split ring is deflected toward the right and adapted to engage with a coupling shoulder or projection on the sub-total dial upon turning the resetting pawl forwardly. A shoulder for this purpose is formed on the initial sub-total dial by its pawl pivot 94 and a similar shoulder is provided on each higher sub-total dial by the front stop 97 thereof. Upon turning the dial shaft 3 backwardly by segment 110, Fig. 14, and connecting mechanism as hereinafter described all of the resetting pawls are turned simultaneously in the same direction by reason of these pawls being keyed to the shaft and during this movement the free ends of the pawls are deflected upon striking the coupling shoulders 94 and 97 and pass over the same without shifting the sub-total dials connected therewith. During the forward movement of the dial shaft and the resetting pawls in the direction of the arrow, Figures 32 and 58, each of the resetting pawls moves idly until its free front end engages with the coupling shoulder of the adjacent sub-total dial, after which the sub-total dial is caused to move forwardly with the resetting pawl until the latter reaches the end of its forward stroke in which position the sub-total dial is at zero. Inasmuch as the sub-total dials may be in different positions preparatory to resetting the same, the resetting pawls of the different sub-total dials will move forwardly different distances before engaging the respective coupling shoulders thereof. The dial shaft is only turned backwardly slightly over nine spaces so as not to disturb the sub-total dials which stand at zero, and as the dial shaft is moved forwardly the resetting pawls engage successively with the coupling shoulders of the differently shifted sub-total dials and when the dial shaft reaches the end of its forward movement all of the shifted sub-total dials are turned to zero. During this forward movement of the sub-total dials the grand-total dials are held against turning which causes the coupling pawls of the sub-total dials to trip over the star wheels connected with the grand-total dials until the subtotal dials reach the zero position. Each of the grand-total dials is held against turning while its companion sub-total dial is being turned to zero by means of a detent pawl 103 which engages with the front side of its companion gear pinion, as shown in Figures 2, 7, 9 and 18. The pawls 103 of the several gear pinions are mounted on a transverse pawl bar 104, which is supported at its ends by means of two pawl arms 105, which turn loosely upon the supporting rod or bar 35 of the key levers, as shown in Figures 2, 18 and 41. The pawl arms are moved rearwardly for engaging the pawls of the bar 104 with the gear pinions by means of springs 106, as shown in Figures 14 and 18. These springs are connected loosely at their rear ends to the rock-shaft 9 and at their front ends to the pawl arms 105. During the forward movement of the gear segments preparatory to turning the dial pinions, the detent pawls are swung forwardly out of engagement with the dial pinions by means of two shifting rods 107 which are connected at their rear ends to opposite ends of the transverse rod 7 or some part moving therewith and each of which is provided at its front end with a fork or bifurcation 108, which engages with a pin or shoulder 109 on the pawl arm arranged on the adjacent side of the machine, as shown in Figures 2, 14 and 18. As the gear segments move forward into engagement with the dial pinions the shifting rods 107 move the detent pawls 103 out of engagement with the dial pinions and when the gear segments move backwardly the detent pawls are again engaged with the dial pinions by the springs 106. 110 represents a resetting gear segment whereby the sub-total dials are turned to zero. This segment meshes with the gear side of a resetting gear pinion 111 which is secured to the left hand end of the dial shaft 3, as shown in Figures 1, 14 and 18. The resetting segment is pivoted by a pin 112 to the left hand side of the frame so that it is axially in line with the pivots of the registering gear segments when the latter are in their foremost position. 113 represents a resetting link which is pivoted at its upper end to an arm 114 formed on the resetting segment in rear of its pivot and which link 113 is provided at its lower end with a hook 115. When this link is free it drops with its lower end so that its hook engages with the adjacent left-hand end of the shifting bar 25. When the link is so engaged with the bar and the rocking frames 15 and 29 are moved forwardly for engaging the registering gear segment with the dial pinions and turning the latter forwardly, the bar 25 at the same time pulls the link 113 downwardly and thereby raises the resetting gear segment. During the movement of the latter the dial shaft 3 and resetting pawls 100 are turned backwardly without disturbing the sub-total dials. During the subsequent backward movement of the rocking frames 15 and 29 for raising the registering gear segments, the cross bar 25 raises the link 113 and depresses the resetting gear segment. During this movement of the latter the dial shaft and the resetting pawls connected therewith are turned forwardly and the sub-total dials coupled with the resetting pawls during this movement of the pawls are turned to the zero position. When a group of numbers is being added by the sub-total dials the resetting link is raised with its hook out of engagement from the bar 25, as represented in Figure 14, so that the resetting mechanism is inoperative while the addition of the sub-total of a group of numbers is being effected. The resetting link is held in its elevated inoperative position by means of a disengaging lever 116 which is pivoted to the adjacent side of the frame, and which is held with its upper arm yieldingly in engagement with the rear side of the resetting link by means of a spring 117 connected with the lower arm of the disengaging lever, as represented in Figures 14 and 22. This spring constantly tends to turn the disengaging lever in the direction for lifting the resetting lever with its hook out of engagement from the bar 25. When it is desired to turn the sub-total dials to zero the disengaging lever is swung in the direction for allowing the resetting link to engage with the car 25 by an elbow lever 118 arranged under the bottom of the keyboard and connected with its lower arm by a line or cord 119 with the lower arm of the disengaging lever, and a shifting key 120 having a depending stem which is guided in the key-board and which engages with the upper arm of the elbow lever 118, as represented in Figure 14. Upon depressing this key the elbow lever 118 is turned in the direction for disengaging the lever 116 from the resetting link, thereby permitting the latter to engage with the bar 25 and causing the sub-total dials to be turned to zero during the subsequent rocking movement of the frames 15 and 29. Upon releasing the sub-total zero shifting key 120, the disengaging lever 116 is again permitted to raise the resetting link out of engagement from the bar 25, thereby permitting the next group of numbers to be added on the sub-total dials. The downward movement of the resetting segment is limited by a stop 121 on the frame and adapted to be engaged by a co-operating stop on said segment, as shown in Figures 1 and 14.

When a group of numbers has been added on the grand-total and sub-total dials and the latter have been turned to zero for obtaining the sub-total of the next group of numbers separate from the grand-total, it is necessary at times to prevent each sub-total dial, except the first, from turning forward with its companion grand-total dial in order to avoid producing an incorrect sub-total. If the first of a pair of adjacent grand-total dials registers 9 and the second registers 5, forming together the number 59, and subsequently the number 4 is added to the first dial, this latter dial would be turned to 3 and the carrying mechanism would turn the second dial to 6 forming the number 63.

Assuming that the grand-total dials representing 59 had their sub-total dials at zero previous to adding 4, the addition of this number to the grand-total dials causes the sub-total dial of the first grand-total dial to turn to 4, and in the absence of any provision to the contrary the sub-total dial of the second grand-total dial would be turned to 1 at the same time the second grand-total dial is turned from 5 to 6, thereby registering an erroneous sub-total of 14 instead of 4. For the purpose of avoiding the registration of an incorrect sub-total in this manner the following mechanism is provided:

*Sub-total cams.*

122 represents a number of sub-total cams which are provided with spiral faces the same as the grand-total cams and one of which is secured to the right side of each sub-total dial, as represented in Figures 2, 7, 9, 18, 31 and 57. 123 represents a number of retarding or brake arms whereby the forward rotation of the sub-total dials, except the first, is at times retarded, and which are mounted loosely with their lower ends on the supporting rod 35. Each of these retarding arms is provided at its upper end with a shoulder or bearing piece 124 which engages with the spiral face of one of the sub-total cams, and at its side with a lip or bearing piece 125 which engages with the left-hand side of the same sub-total cam.

126 represents a number of light springs, whereby the retarding arms are connected with the cross bar 59, as shown in Figure 57, and which draw the retarding arms with their upper ends against the faces of the higher sub-total cams with a sufficiently light pressure, so as not to retard the rotation of these cams and the sub-total dials connected therewith.

*Sub-total tens carrying.*

127 represents tension arms, one of which is pivoted on the rod 35 between the trip arm 54 and retarding arm 123 of each part of grand total and sub-total dials and inclines forwardly with its upper end, as represented in Figures 2, 7, 18, 41, and 57. Each tension arm is connected at its upper end by a comparatively heavy spring 128 with the retarding arm 123 of the next higher sub-total dial, this connection of the spring causing the same to be arranged obliquely, as shown in Figures 18 and 57. 129 represents a forwardly projecting presser finger arranged on the upper end of each grand-total trip arm 54. 130 represents a rearwardly projecting shifting head pivoted on the upper end of the adjacent tension arm and provided with a transverse bar at its rear end, which is adapted to be engaged by the adjacent presser finger, as represented in Figures 2, 7, and 57. The shifting head is yieldingly held in an elevated position with its bar in the path of the presser finger by a spring 131, and this movement of the shifting finger is limited by a stop 132 formed thereon and engaging with a stop on the tension arm, as represented in Figures 2 and 57. 133 represents a forwardly projecting catch pivoted on the tension arm concentrically with the shifting head and provided at its front end with a depending hook. This hook is yieldingly held in a depressed position by a spring 134 connected with the tension arm and the downward movement of the catch is limited by a stop 135 arranged on the catch and engaging with a cooperating stop on the tension arm. Upon moving the tension arm into its foremost position, its catch engages over the transverse rod 59 secured to the main frame of the machine. The shifting head is provided in front of its pivot and below the catch with a shifting pin 136, whereby upon depressing the rear end of the head the catch is released from the rod 59 and the tension arm is permitted to move rearwardly. 137 represents a forwardly projecting releasing finger arranged on each retarding arm 123 adjacent to the presser finger of its companion grand-total trip arm.

Each of these releasing fingers is provided at its front end with a hook having a vertically inclined front side 138 and a horizontally inclined rear side 139.

When two adjacent grand-total dials indicate 59 and the number 4 is added to the first of these dials, as before described, the trip arm of the first grand-total cam drops from the high to the low part of its cam, when the latter completes a revolution and moves forwardly. During this forward movement of this trip arm its presser finger 129 engages with the cross bar of the shifting head on the adjacent tension arm and moves the latter forwardly until its catch engages with the rod 59. While in this foremost position the tension arm through the medium of its oblique spring 128 causes the next higher retarding arm 123 to be pressed against its sub-total cam 122 sufficiently to prevent the same from being turned forward easily, thereby causing the rotation of this cam and its dial to be retarded. As the first dial moves from 9 past zero to 3, its companion sub-total dial is turned from 0 to 4, and the carrying device turns the second grand-total dial from 5 to 6. While the second grand-total dial is thus advanced one number, its companion sub-total dial is held against forward movement by the pressure of the retarding arm 123 against its cam. During this independent movement of the second grand-total dial with reference to its sub-total dial, the pawl arm 96 of the flexible coupling between these two dials moves from the front stop 97 of this sub-total dial to the rear stop 98 thereof without shifting this sub-total dial, so that the same remains at zero. This movement of the pawl arm 96 is due to the fact that its pawl 93 at this time is held in engagement with the star wheel 91 by the spring 99, so that the movement of the star wheel is transmitted to the pawl arm while at the same time the wheel 88 which carries the stops 97 and 98 is yieldingly held against turning by the pressure of the arm 123 against the respective cam 122 which is connected with the wheel 88.

The extent of this independent movement of the dials with reference to each other is equal to one space on the dials. During the independent forward movement of the second grand-total dial, the spring 99 holds the coupling pawl 92 in engagement with the star wheel 91, but the spring is strained as the pawl supporting arm 96 moves from the front stop 97 to the rear stop 98 of the sub-total cam. When further numbers are added to the second grand-total dial either by operating the same directly from its own key lever or by carrying numbers up from the next lower grand-total dial, the second sub-total dial is turned with the second grand-total dial by the supporting arm of the coupling pawl engaging with the rear stop 98 of the sub-total dial, during which movement of the second sub-total dial its cam overcomes the friction of the retarding arm 123 and slips past the same. This retarded movement of the second sub-total dial to the extent of one space or number with reference to the second grand-total dial continues until the first sub-total cam has made one complete rotation and its retarding arm drops from the high to the low part of its cam and moves forward. As the retarding arm of the first sub-total cam moves forward its releasing finger 137 engages with its inclined front end against the cross bar on the shifting head of the adjacent tension arm and depresses this head, thereby disengaging its catch 133 from the rod 59 and releasing the tension arm. When the tension arm is released, it is moved backwardly by its oblique spring 128, thereby relieving the next higher sub-total cam from the retarding pressure of its retarding arm. The instant this takes place the resilience of the spring 99 causes the second sub-total cam to be turned forward until its front stop 97 engages with the adjacent pawl supporting arm 96, whereby its sub-total dial is advanced one space or number which represents the number carried up from the next lower sub-total dial. During the backward movement of the sub-total retarding arm the inclined rear side 139 of its hook engages with the cross bar of the shifting head on the tension arm and deflects the same laterally sufficiently to permit these parts to pass each other. The relative position of the presser finger and the releasing finger of the companion trip and retarding arms 54, 123, is such that when the arms move forwardly together the inclined front end of the releasing finger deflects the shifting head of the tension arm downwardly before the presser finger of the trip arm engages the same, thereby preventing the tension arm from being moved forward and retarding the next higher sub-total cam. By arranging the springs 128 obliquely, each retarding arm is pulled laterally toward the right as well as forwardly when its tension arm is moved forward. This causes the lower lip 125 of the retarding arm to bear against the left side of the sub-total cam at the same time that its upper lip 124 bears against the face thereof, thereby retaining control over the sub-total cam, and preventing the sub-total dial from carrying up a number if its retarding arm is passing from the high to the low part of this cam while retarding the same.

It will thus be seen that each lower grand-total dial when completing a turn carries a number to the next higher grand-total dial, but the next higher sub-total dial is prevented from registering the number which was carried up on the grand-total dial until the lower sub-total dial has also made a complete turn and then the higher sub-total dial is permitted to carry up the number from the lower sub-total dial.

For the purpose of recording the numbers which are added together by the above described mechanism a recording mechanism is provided which is constructed as follows:

*Type-carriers, concentrating mechanism for printing, printing hammers, and automatic coupling of hammers for operation.*

140 represents a printing roller or platen which is arranged transversely in the upper, rear part of the machine and under the lower side of which the sheet or other article is placed which receives the record. 141 represents a number of type segments which are arranged transversely side by side below the platen and which are pivoted at their front ends to the supporting bar 31 upon which the rear ends of the controlling arms are pivoted. Each of these type segments is provided at its rear end with a segmental row of type carriers 142, which are capable of moving radially back and forth on the type segment. Each of the type carriers is provided at its rear end with a type and is guided upon the type segment by means of screws or rivets 143 secured to the type carrier and arranged in radial slots 144 formed in the type segment, as shown in Figures 2, 3 and 37. Each of the type carriers is held in its inward or retracted position by means of an S-shaped spring 145, which is arranged between the carrier and the type segment and is secured with one end to the carrier and with its other end to the type segment, as shown in Figures 36 and 37. Upon raising or lowering the type segment any one of its type can be brought to the printing point or line, and upon striking the back or inner end of the type carrier, when the same is in line with the printing point the type carrier will be driven outwardly and its type will produce an impression on the sheet supported by the platen. After the carrier has received the blow for driving the same against the platen, the carrier is again quickly retracted to its innermost position by means of its spring. Each of the type segments is connected with one of the controlling arms, so that upon depressing a controlling arm and the registering gear segment connected therewith the companion type segment will be raised and present one of its type to the printing point. For convenience in operating the machine, the keys are separated a considerable distance on the keyboard and in order to produce a compact record, the printing segments are arranged closer together than the keys and the registering mechanism. In order to permit of this arrangement, each type segment and its corresponding controlling arm are connected by a connecting arm 146, as represented in Figures 1, 2, and 49. The connecting arms of the central controlling arms and type segment are comparatively straight, but the connecting arms of the outer type segments and controlling arms are arranged obliquely, the degree of this obliquity gradually increasing from the central type segments and controlling arms in opposite directions toward the outer type segments and controlling arms, as represented in Figure 1. The connecting arms 146 of the outer controlling arms are arranged in the spaces behind the upright parts and above the horizontal parts of the controlling arms, thereby permitting the inner controlling arms to move up and down without interfering with the connecting arms 146 of the outer controlling arms. The types on each type segment are arranged to correspond with the teeth and numbers of its companion gear segment and registering dial, the zero type being at the upper end of the series and the progressively higher digits arranged in their order downwardly from the zero type. When the registering gear segment is in its highest position it presents its zero tooth to the dial pinion, and the type segment which at this time is in its lowest position presents its zero type to the printing point. Upon depressing a gear segment so as to present one of its higher teeth to the dial pinion, its companion type segment is raised proportionally and presents a corresponding higher numbered type to the printing point. 147 represents a number of hammers whereby the type carriers are struck for driving the type against the platen. One of these hammers is arranged adjacent to each type segment and is provided with a head which is arranged in front of the series of types and in line with the printing point of the platen. Upon shifting the type segment so as to bring one or another of its type carriers to the printing line and then operating the hammer, the latter delivers a blow against the inner end of the particular carrier which is at the printing point and produces an impression of its type on the platen. The several hammers are pivoted on the transverse rod 12 arranged in rear of the segments and each of the hammers is yieldingly held in its forward position by a spring 148 connected at its lower end to a cross bar 149 and with its upper end to a depending arm 150 on the hammer. 151 represents a vertically movable trip bar or rod which is arranged transversely below the hammers and whereby the latter are operated. This bar is supported at its ends upon the rear end of rock arms 152 which turn loosely with their front ends on the rod 31 supporting the type segments and controlling arms. 153 represents a number of hammers or trip pawls, whereby the hammers are retracted preparatory to delivering a blow against the type carriers which are at the printing point. One of these pawls is arranged adjacent to each hammer and pivoted loosely at its lower end to the trip bar 151 and its upper end is provided on its rear side with a downwardly facing hook or shoulder 154, and above said shoulder with a trip face 155, as shown in Figures 3, 6, and 56. Each of the hammers is provided in front of its pivot adjacent to the upper end of the hammer pawl with a lower trip lug or shoulder 156 and an upper trip lug or shoulder 157. When the parts are at rest the hammer pawl 153 is raised into its highest position and the hammer is in its foremost position with its lower trip lug 156 below and in rear of the hook of the hammer pawl and with its upper shoulder 157 in rear of the trip face of the hammer pawl, as represented in Figures 2, 3 and 56. Upon shifting the hammer pawl rearwardly, while the parts are in this position, so that its hook overhangs the lower shoulder 156 of the hammer, and then pulling the hammer pawl downwardly the hook of the hammer pawl engages with the lower shoulder of the hammer and turns the same so that its head is moved backwardly from the type carrier at the printing line. As the hammer moves downwardly with the hammer pawl, the upper shoulder of the hammer comes into engagement with the trip face of the hammer pawl and during the continued downward movement of the hammer and its pawl, this upper shoulder gradually crowds the hammer pawl forwardly with reference to the hammer by reason of the hammer and its pawl swinging on different centers. During the last portion of the downward movement of the trip bar 151 and the hammer pawl mounted thereon, the pawl is crowded forwardly by the upper shoulder 157 of the hammer to such an extent that its hook is disengaged from the lower shoulder 156 of the hammer, thereby liberating the latter and permitting its spring 148 to throw the same quickly forward and deliver a blow against the type carrier at the printing line. The trip bar 151 now rises and carries the hammer pawl into its highest position, preparatory to again engaging the hammer for depressing the same. 158 represents a number of upright shifting arms whereby the hammer pawls are moved rearwardly, so that their hooks engage with the lower shoulders of the hammers. One of these arms is arranged adjacent to each hammer pawl, as shown in Figures 3, 6, and 56, and is pivoted at its lower end on the trip bar 151, and its upper end is provided with a roller or projection 159 which bears against a hammer cam 160 on the lower part of the adjacent type segment, as shown in Figures 3, 7, and 49. This hammer cam is provided at its upper end with a receding or low portion, an inclined portion arranged below the low portion and a concentric or high portion arranged below the inclined portion. Each shifting arm 158 is moved forwardly and its roller is yieldingly held in engagement with the adjacent hammer cam by a spring 161 connecting said arm with a cross bar 162 secured to the rock arms 152, as represented in Figures 7 and 8. The backward movement of each hammer pawl with reference to its companion shifting arm is limited by means of a stop 163 secured to the upper portion of the hammer pawl and engaging with the front side of the shifting arm, as represented in Figures 3, 5 and 56. Each hammer pawl is yieldingly held in its rearmost position with reference to its shifting arm by means of a C-shaped spring 164 secured with its ends, respectively, to the hammer pawl and its shifting arm, as shown in Figures 2, 3 and 56. In the lowermost position of a type segment the receding part of its cam is presented to the roller of the shifting arm 158, which permits the pawl hammer to be retracted into its foremost position, as represented in Figure 2. Upon depressing the trip bar 151 when the parts are in this position, the roller 159 is not engaged soon enough by the incline of the cam 160 to engage the hook of the hammer pawl with the lower shoulder of the hammer, before the hook has passed below this shoulder, but instead the trip face of the hammer pawl is engaged with the lower shoulder of the hammer, thereby causing the hammer pawl to move downwardly idly without retracting the hammer, whereby no impression of the particular type at the printing line is produced. If the type segment is raised, so as to present one of its lower types to the printing point of line, the incline of its cam during the first part of the upward movement of the segment moves the shifting arm 158 rearwardly together with the hammer pawl yieldingly connected therewith, so that the hook of the hammer pawl stands over the lower shoulder 156 of the hammer. Upon now depressing the pawl the hammer will be retracted and released near the end of the downward movement of the pawl, thereby delivering a blow against the type at the printing point and producing an impression thereof.

The incline of the type segment cam is so constructed that it throws the hammer pawl backwardly into an operative position when the segment is raised one space, and during the continued upward movement of the segment, the hammer pawl is held in this operative position by the lower high concentric part of the segment cam. By thus constructing the type segment cam its companion hammer pawl is not shifted when the segment is not raised and its zero type remains at the printing line, but the hammer pawl is shifted into an operative position for producing an impression, if it is raised one or more spaces and presents any one of its digits higher than zero to the printing line.

*Automatic cipher printing.*

165 represents a number of transfer or coupling fingers which enable the ciphers in a number to be printed automatically. One of these transfer fingers is secured to each of the shifting arms 158, as represented in Figs. 3, 7 and 56, and extends laterally toward the right therefrom into engagement with the shifting arm of the next lower hammer pawl, as represented in Figure 22. If any one of the printing segments remains in its lowest position, so that its cipher remains at the printing line and the next higher printing segments has been raised for printing a higher number or digit, the transfer finger of the higher hammer shifting arm 158 while being moved rearwardly by the cam of its companion printing segment, is caused to engage with the shifting arm 158 of the next lower hammer pawl and shift the latter backwardly, so that its hook is carried backwardly over the lower shoulder of the companion hammer. Upon now depressing the trip bar 151, the higher hammer pawl 153 is coupled with its hammer and the next lower hammer pawl is also coupled with its hammer, whereby an impression of the cipher type on the lower segment is produced on the platen at the same time that the next higher number is printed on the platen. If two ciphers occur in succession in the body of a number, the shifting arms of the hammer pawls relating to the unshifted type segment are moved successively by their respective transfer fingers from the first higher shifting arm which has been moved by its type segment. This operation of producing an impression of the cipher type is effected automatically and renders it possible to print any number of ciphers in succession in the body of a number because the hammer operating mechanism of each segment which remains standing with its upper type at the printing line is controlled by the hammer operating mechanism of a higher type segment and in turn controls the hammer operating mechanism of the next lower type segment, if the next lower segment presents a cipher to the printing line. Only the ciphers below the highest digit in the number to be recorded are thus printed automatically because the printing of a digit depends upon the upward movement of a printing segment, thereby avoiding the printing of ciphers ahead of the highest digit in the number to be recorded. The hammer shifting device of the segment which prints the numbers representing cents is, preferably, not provided with a transfer finger to operate on the hammer shifting device of the segment which prints fractions of a cent, because this printing segment is the lowest and it is not necessary to print the cipher at the right end of the number when this fractional printing segment has been raised to record a fraction. The carrying bar 151 is raised by one or more springs 166 which connects this bar with the transverse rod 12, as shown in Figure 8, and the upward movement of the bar 151 is arrested when the hammer operating pawls reach their highest position by a transverse bar 167 which is engaged by the rear ends of the rock arms 152. 168 represents a coupling hook, whereby the hammer trip devices are depressed. This hook is pivoted with its upper end to the trip bar 151 and its lower engaging end is provided with a notch having upper and lower shoulders.

In the lowered position of this hook its notch engages with a cross bar 169 which is connected with the rock arms 24, as represented in Figures 2 and 7, so that the hook and the hammer operating devices connecting therewith are actuated from the rocking frames 15 and 29, through the medium of the rock arms 24. In the rearmost position of the rocking frames, the front ends of their notches 24 bear against the front side of the bar 25 to which the gear segments are yieldingly connected, and the cross bar 169 bears against the rear or upper shoulder of the notch of the hook 168, as represented in Figure 2. Upon swinging the rocking frames forwardly, the incline of the cam 14 first raises the rock arm 13 and shifts the gear segments into engagement with the dial pinions and after the segments have been so shifted, the rear shoulders of the notches 28 in the rocking frames engage with the cross bar 25, so that thereafter this bar is carried downwardly with the rocking frames and the gear segments are depressed. During this downward movement of the bar 25 with the rocking frames, the companion bar 169 moves down idly in the notch of the hook 168 until this bar engages with the lower or front shoulder of this hook. After the cross bar 169 engages with the lower shoulder of the notch of the hook, the latter and the hammer operating devices connected therewith are moved downwardly with the rocking frames until these frames reach the end of their downward movement. During the last portion of the downward movement of the rocking frames the hammer pawls are disengaged as before described, from the retracted hammers, whereby the latter are released and strike the type carriers which are at the printing line. By this means, the blow of the hammers is delivered after the registering of the numbers has been effected on the dials and the type segments have been shifted into their proper position for recording the respective number. The hammers do not follow the type carriers to the end of their outward movement but are stopped short, after delivering a blow against the inner ends of the carriers by their depending arms 150 engaging with a rubber facing 170 on the cross bar 167, as shown in Figure 3, whereby the types are moved outwardly by the impact of the hammers and are then returned by their springs so as to clear the printing surface.

*No print.*

When it is desired to only add the numbers and not record the same, the coupling hook 168 is raised with its notch out of engagement with the cross bar 169, which causes the rocking frames and connecting parts to move back and forth without affecting the hammer operating devices. The coupling hook is disengaged from the cross bar by means of an elbow lever 171 secured to a transverse rock shaft 172. The lower arm of the elbow lever is connected with the shaft 20 by a spring 173, whereby the lever and the shaft carrying the same are turned in the direction for engaging the upper arm of the lever with the hook 168 and disengaging the latter from the bar 169. 174 represents an elbow lever arranged below the bottom of the key-board and connected by a line or cord 175 with its lower arm to the upper arm of the elbow lever 171, as represented in Figure 14. 176 represents a shifting key having a depending stem which is guided in the top and bottom of the key-board and which engages with its lower end against the upper arm of the elbow lever 174. Upon depressing this key the elbow lever 174 is turned in the direction for moving the rock arm 171 into engagement with the coupling hook 168 and disengaging the latter from the cross bar 169, thereby throwing the recording mechanism out of gear. Upon releasing the key 176, the rock arm 171 is permitted to swing backwardly and allow the coupling hook to engage with the cross bar 169, thereby throwing the recording mechanism into gear. When the gear segments and the printing segments are thus operated relatively to the keys which have been depressed, the number represented by the depressed keys is registered, and also recorded by the printing mechanism. The addition of further numbers proceeds in like manner the several numbers added successively by the registering mechanism but each number is printed individually by the recording mechanism.

To print grand total.

When it is desired to print or record the grand-total at the foot of the column of the numbers which have been printed, the operation is as follows:— The grand-total key 84 is first depressed, thereby raising the cam 14 into an inoperative position and lowering the cam 67 into an operative position. Upon now moving the rocking frames 15 and 29 forwardly the feeling levers 61 are turned so as to move their feeling fingers forwardly into engagement with the respective cams 57 of the grand-total dials and at the same time each feeling lever carries the adjacent key lever forwardly so that its particular stop shoulder 39 corresponding to the position of the trip cam 57 and its grand-total dial is moved into the path of the stop lug 34 of the controlling arm. After the key levers have been thus shifted forwardly into their respective positions corresponding with their dials, the continued forward movement of the rocking frames causes the gear segments while in a retracted position out of engagement with the dial pinions to be depressed until each segment is arrested by the engagement of the stop lug on its controlling arm with the respective stop shoulder of its key lever, whereby each printing segment is raised so as to present the type carrier to the printing point which carries the type corresponding to the number registered on its companion grand-total dial. During the last part of the forward and downward rocking movement of the rocking frames the hammers are operated and the particular type at the printing lines are impressed on the platen.

Grand total zero key.

Upon now swinging the rocking frames backwardly, the gear segments are raised while still in a retracted position out of engagement with their companion dial pinions, thereby permitting further numbers to be added to the total already registered on the dials. If, however, it is desired to turn the grand-total dials back to zero, after the grand-total of the added numbers has been printed or recorded the gear segments, while in the retracted lower position which they occupy while printing the totals, are moved forwardly into engagement with their respective dial pinions by the depression of the key 87. Upon now moving the rocking frames backwardly the gear segments are raised while in their forward position in engagement with their pinions, whereby each of the latter is turned backwardly when the segments reach the end of their upward movement, the dials have been turned backwardly a number of spaces corresponding to the number on the dial, thereby turning all of the dials to zero.

To print subtotal.

For the purpose of recording the sub-total of any particular group of numbers forming part of the grand-total, the machine is provided with mechanism which is constructed and operated as follows:

177 represents an elbow lever arranged below the bottom of the key-board and having its lower arm connected by a wire or cord 178 and branch wires or cords 179, 180 with the cords 82, 83 leading to the levers 76, 78, as shown in Figure 14. 181 is a shifting key provided with a depending stem which is guided in the top and bottom of the keyboard and which engages with the upper arm of the elbow lever 177. 182 represents a transversely movable shifting bar which is guided with its ends in the main frame and which is provided with a number of rearwardly projecting shifting fingers 183, one of which is adapted to engage with the right hand side of the upper arm of each feeling lever 61, as represented in Figures 2, 18 and 19.

The upper arm of each feeling lever 61 is made flexible so that the cams can be shifted laterally or in the direction parallel with its axis, so as to bring the front end of its feeling finger in rear of the face of the adjacent sub-total trip cam. In order to provide the necessary lateral flexibility in the feeling lever and still maintain the same comparatively rigid when moved in a direction at right angles to its axis, the lever is provided with an inverted U-shaped slot 184. This slot is arranged with its bight or curved portion in the lever above the pivot thereof and its branches or ends extend downwardly on opposite sides of its pivot, as shown in Figures 2, 3 and 57. By this construction of the feeling lever its upper arm, when deflected in the direction of its axis, swings from a point near the lower end of the lever, thereby distributing the deflection of the lever over a considerable portion thereof and preserving its elasticity without danger of kinking the same.

185 represents an upper elbow lever which is connected with its upper arm to the shifting bar 182, and 186 is a lower elbow lever which is pivoted on the rod 35 and engages with its upper arm against the lower arm of the upper lever 185, as represented in Figures 14 and 18. 187 represents a cord which connects the lower arm of the lower elbow lever 186 with the lower arm of the elbow lever 177, as represented in Fig. 14. The shifting bar 182 is yieldingly held in its normal position toward the right by a spring 188 which connects the lower arm of the lower elbow lever 186 with the adjacent stationary part of the machine, as represented in Figure 18, whereby the feeling fingers of the feeling levers are always held normally in rear of the grand-total cams of the registering devices, ready to print the grand-total of the numbers. Upon depressing the key 181, the elbow levers 185 and 186 are turned in the proper direction so that the shifting bar 182 is moved toward the left and the feeling fingers of the feeling levers 61 are moved in rear of the sub-total trip cams and at the same time the trip levers 76 and 78 are shifted simultaneously in opposite directions, so as to raise the cam 14 into an inoperative position, and depress the cam 67 into an operative position, thereby recording the sub-total of a group of numbers.

*Zero reset for subtotalizer.*

Upon now moving the rocking frames 15 and 29 forwardly by means of the handle 21, the upper arms of the feeling levers are moved forwardly until they bear with their feeling fingers against their companion sub-total cams, the feeling leavers carry the key levers forwardly until their stop shoulders corresponding with the position of the sub-total cams and their respective sub-total dials stand in the path of the stop lugs of the controlling arms. During the continued forward movement of the rocking frames the gear segments are depressed in a retracted position out of engagement with their dial pinions until arrested by the stop lugs on their respective controlling arms engaging with the proper stop shoulders of the key levers, thereby carrying the type segments upwardly so that they present the types which correspond to the numbers registered on the sub-total dials to the printing point. During the continued forward movement of the rocking frames, the hammers are operated and produce impressions of the types which are at the printing line. If it is desired to add more numbers to the sub-total of the group of numbers already registered on the sub-total dials the gear segments are moved upward in a retracted position and the cams 14 and 67 are reversed, so as to permit of resuming the adding of numbers. When it is desired to turn the sub-total dials to zero after having printed the sub-total of the separate group of numbers, the sub-total zero key 120 is depressed so as to permit the coupling hook 113 to engage with the end of the bar 25 before the rocking frames begin their forward movement. During the forward movement of the rocking frames with cam 14 elevated and the cam 67 depressed the printing of the sub-total of the group of numbers will be effected, as before described, and during this movement the resetting gear segment 110 turns all of the resetting pawls backwardly. During the subsequent backward movement of the rocking frames the gear segment 110 moves downwardly and the resetting pawls coupled therewith are engaged with the stops 94 and 97 of the sub-total dials and turn all of these dials forward to zero. Upon releasing the key 181, the shifting bar 182 is shifted toward the right by the spring 188, thereby permitting the upper arms of the feeling levers to move toward the right and carry their feeling fingers from the sub-total cams to the grand-total cams, and at the same time the cams 14 and 67 are restored to their normal position.

In the highest registering and recording mechanism which registers and records the highest numbers for which the machine is designed, the stop arm 37 having the differential stops, is not provided with a lower key operated arm 36, because the arm 37 is only used to arrest its gear segment and printing segment at different points, for setting the parts preparatory to turning the highest grand-total dial to zero or for printing the grand total or sub-total of the number indicated by the highest grand total or sub-total dials.

*Duplicate printing.*

For the purpose of permitting the numbers to be printed in duplicate, for instance, when it is desired to print an amount on a bank check, and the same amount on a stub, the machine is provided with mechanism which is constructed as follows:

1410 represents a number of duplicate printing or type segments which are arranged transversely in line and preferably toward the right of the main printing segments 141, as represented in Figures 1, 20 and 22, and which are pivoted loosely at their front ends on the supporting rod 31. One of these duplicate number printing segments is provided for each of the main number printing segments and each duplicate segment is connected with its companion main segment by a U-shaped frame which is connected with the upper ends of its arms 189 to the duplicate and main segment and has its cross bar 190 arranged transversely below the intervening segments, as shown in Figures 1, 2, 4, 7 and 24. The cross bars 190 are arranged sufficient distances below the segments so that each pair of connected main and duplicate printing segments can be raised to their highest position without interfering with the other segments. For the purpose of permitting the connecting frames of the several pairs of printing segments to be arranged compactly, the arms of the connecting frame are curved concentrically with the pivots of the segments, as represented in Figures 2 and 4.

Each of these duplicate printing segments is provided with type carriers corresponding to and constructed the same as the type carriers of its companion main segment and each of these duplicate segments is provided with a hammer operating device which is constructed the same as the hammer operating devices of the main segments, and the same description and letters of reference, therefore apply to the details of both the main and duplicate printing segments.

If it is desired to duplicate only the small numbers no duplicate segments need be provided for the higher numbered printing segments. For the purpose of throwing the duplicate printing mechanism out of gear when it is not desired to print the numbers in duplicate a horizontal movable bar 191 is provided which is arranged transversely in rear of the hammer pawls of the duplicate printing segments and which is provided with a number of forwardly projecting lugs or stops 192, as represented in full lines in Figures 4, 22 and 25. Upon shifting this bar, so that its stops stand in rear of the duplicate hammer pawls, as shown in full lines in Figure 25, these pawls are prevented from being swung rearwardly and operating the hammers. Upon moving this bar so that its stops clear the duplicate hammer pawls, as represented by dotted line 192$^a$, Figure 25, these pawls are free to be swung rearwardly by the segment cams 160 into engagement with the hammers, so as to retract the same during the downward movement of the pawls for producing an impression of the types of the duplicate segments which are at the printing line.

Horizontal rule.

For the purpose of producing horizontal or cross ruling upon the sheet or surface which receives the record, the following mechanism is provided:

193 represents the lowermost type carrier of each of the number printing segments, each of which is provided at its rear end with a horizontal ruling type. Each of these ruling type carriers is constructed the same as the number type carriers with the exception that the front end of each ruling type carrier is widened horizontally, preferably in both directions in the form of the letter T, as shown in Figure 23, and the ruling type extends transversely from end to end of the widened part of this carrier, so that the ruling types when placed transversely in line and are driven against the platen will produce a practically continuous line transversely on the recording surface. Each of the number key levers is provided on the front side of its upper arm with a ruling stop or shoulder 194, which is arranged one space below the lowermost number registering stop or shoulder 39. Upon swinging the key levers, so as to bring their ruling shoulders 194 into the path of the lugs 34 of the controlling arms, the latter together with the gear segments connected therewith are depressed upon moving the rocking frames 15 and 29 forwardly until the stop lugs 34 of the controlling arms engage with the lowermost or ruling shoulders 194 of the key levers. When the controlling arms reach this lowermost position the printing segments connected therewith have been raised to their highest position and present the ruling types of all the segments to the printing line. During the last portion of the forward movement of the rocking frames 15 and 29, while the ruling types are at the printing line, all of the hammers are operated for producing an impression of these types. The key levers are turned simultaneously for bringing all of their ruling shoulders simultaneously into the path of the stop lugs of the respective controlling arms by means of a rocking plate 195 which is arranged transversely in front of the lower arms of the key levers and overhangs the front ends thereof, as represented in Figures 2, 7 and 28. This rocking plate is secured to a transverse rock shaft 196 which is journaled in the frame of the machine and which is turned for holding the rocking plate in its uppermost position out of engagement from the key levers by means of a spring 197, as shown in Figure 28. 198 represents a shifting key, whereby the parts are shifted to permit of producing cross ruling. This key is provided with a depending stem which is guided in the top and bottom of the key-board and which engages against the rear end of a rock arm 199 projecting rearwardly from the rock shaft 196, as represented in Figure 14. Upon depressing this key, the rocking plate 195 is turned in the direction for depressing the front arms of all the number key levers and bringing the ruling shoulders on the upper arms thereof into position for arresting the type segments during their upward movement when the ruling types arrive at the printing point. In order to prevent the gear segments from meshing with the dial pinions during the cross ruling operation the position of the cams 14 and 67 is reversed at the same time that the plate 195 is depressed. This is effected by a depending arm 1960 secured to the shaft 196 and connected by a cord or wire 1961 which the branch wires 82, 83 leading to the shifting levers 76 and 78, as represented in Figures 14 and 28. When it is desired to produce horizontal ruling on the recording surface, the key 198 is depressed thereby raising the cam 14 into an inoperative position, depressing the cam 67 into an operative position and moving all the number key levers with their ruling shoulders 194 into the paths of the stop lugs of the controlling arms. Upon now moving the handle 21 forwardly, the rocking of the frames 15 and 29 first causes the gear segments together with their controlling arms to be moved downwardly until arrested by the ruling shoulders of the keys, in which position of the parts, the printing segments have been raised with their ruling types to the printing line. The continued forward movement of the rocking frames operates the hammer tripping mechanism and produces an impression of the ruling types on the recording surface. Upon now moving the handle 21 backwardly and releasing the key 198, the parts resume their normal position. While the cams 14 and 67 are reversed so as to move the gear segments downwardly out of engagement with the dial pinions for producing horizontal ruling, the feeling levers are also shifted, but this movement of the feeling levers is of no effect.

Vertical rule.

Mechanism is provided whereby vertical rulings may be produced on the recording surface, this mechanism being constructed as follows:

203 represents an upright ruling lever which turns loosely on the supporting bar 12 and which is arranged between the dollars and dimes printing segments, as shown in Figures 1, 13, 20 and 22. The upper arm of the ruling lever is provided with a vertical ruling blade 204 which is arranged close to the platen when in its upper or foremost position. The ruling lever is yieldingly held in this position by means of a spring 205 connected with the lower arm of the ruling lever and the movement of the latter toward the platen is limited by the engagement of its lower arm with the rear side of a rubber buffer 206 on the cross bar 167 similar to the rubber 170. 207 represents a pawl whereby the ruling lever is retracted and then released for permitting the same to deliver a blow against the recording surface for producing a vertical ruling impression thereon. This pawl is pivoted at its lower end on the cross bar 151 and is yieldingly held with the hook 208 on its upper arm in engagement with a shoulder 209 on the ruling lever by means of a spring 210 which connects the lower arm of the ruling lever with the rod 162.

In the uppermost position of the bar 167 the ruling pawl engages the shoulder of the ruling lever and upon depressing this bar, the ruling lever is pulled downwardly by the ruling pawl. During this downward movement of the ruling lever and pawl, the front side of this lever engages with the upper arm of the pawl and gradually crowds the pawl forward until the pawl is disengaged from the shoulder of the lever. When the ruling lever is thus released from the pawl, the lever is quickly turned by the spring 210 in a direction for throwing its upper arm forwardly or upwardly, whereby its blade delivers a blow against the recording sheet or surface on the platen and produces a ruling impression thereon. During the last portion of the subsequent upward movement of the ruling pawl 207 its hook again engages over the shoulder of the ruling lever. This construction of vertical ruling devices produces the vertical ruling in sections by successive blows of the ruling blade.

Word printing.

For the purpose of permitting words to be printed in front of the numbers which are added together the following mechanism is provided:—

1411 represents a word printing segment which is mounted loosely on the rod 31 next to the highest number printing segment of the main number recording mechanism, as represented in Figures 1, 8, 20 and 22. This segment is provided with a number of radially movable carriers 1420, which are constructed the same as the carriers of the number printing segments and each of which is provided on its face or front end with a word type. The words of these types are selected according to the purpose or business for which the machine is to be used. For instance, if the machine is to be used in a bank types representing the words "Vouchers" "Checks" "Drafts" "Bills" and similar words common to the banking business may be used. When the machine is designed for use in a restaurant the words " Soup " " Vegetables " " Meats " " Dessert " and other words peculiar to this business may be used. The position of the word type segment is controlled by a key lever which turns on the bar 35 similar to the number key levers and is provided on the front side of its upper arm 3700 with a vertical series of differential stops or shoulders 3900 which are adapted to be engaged by the stop lug 3400 of a controlling arm 3000 and with a locking stop or shoulder which is adapted to be engaged by a locking lug 3300 on the controlling arm, as represented in Figure 8. The controlling arm 3000 is connected with the word printing segment by a connecting bar 1460. The stop shoulders on the upper arm of the word key lever are so arranged that upon swinging this lever so as to carry different shoulders into the path of the stop lug on the controlling arm, the latter will be arrested at different points in its downward or forward movement and the word printing segments connected therewith will be stopped at different points in its upward movement and present the particular word type to the printing point which corresponds with the shoulder or stop on the word key lever. The upward movement of the controlling arm 3000 is limited by its rear locking lug 3300 engaging with the stop bar 32 which arrest the upward movement of the controlling arms 30 of the number registering and recording mechanism. The downward movement of the controlling arm 3000 and the simultaneously upward movement of the word printing segment is effected by a spring 215 which yieldingly connects this arm with the bar 25 to which the registering gear segments are connected. 216 represents a row of word keys having depending stems which are guided in the top and bottom of the keyboard and which engage against the upper side of the front arm 3600 of the word key lever at different distances from the fulcrum thereof. Upon depressing any one of the word keys the word key lever will be turned the proper distance to bring its proper stop shoulder into the path of the stop lug of the companion controlling arm and arrest the word type segment during its upward movement, when the word type corresponding with the word of the depressed key has reached the printing line. When the respective word type is in this position the same is driven against the recording surface for producing an impression thereon, at the same time that the printing of the numbers by the numbering printing segments is effected. The word types are driven against the platen by a hammer operating mechanism which is constructed the same as the hammer operating devices of the number printing mechanism and the same letters of reference are therefore used to denote the same.. The word key lever is yieldingly held in its normal position by a spring 600.

*Auxiliary add.*

An auxiliary adding mechanism is provided which permits of registering and recording the individual or separate number of adding and recording operations which have been made by the main adding mechanism and also permits of effecting an addition of numbers different from the numbers which are added by the main adding mechanism.

This auxiliary adding mechanism is constructed as follows:

2000 represents a number of auxiliary grand-total dials and 880 a number of auxiliary sub-total dials which are mounted on the left hand end of the dial shaft 3. 500 represents a number of auxiliary gear segments which are mounted on the transverse rod 7 and are adapted to engage with gear pinions 400 on the auxiliary grand-total dials, as represented in figures 9 and 18. Each gear segment 500 is connected with a controlling arm 3001 arranged adjacent to the gear segment by a latch or coupling which at times permits the segment to move independently of the controlling arm. 3601 and 3701 represent auxiliary key levers which are operated by auxiliary keys 401 and which control the operation of the auxiliary registering and recording mechanism. The detail construction of the dials, gear segments, printing segments, key levers and the parts co-operating therewith of the auxiliary registering and recording mechanism is substantially the same as the construction of the same parts in the main registering and recording mechanism, except as hereinafter distingushed, and the same letters of reference are therefore employed to denote like parts in both of these sets of mechanism.

In the drawings, two auxiliary key levers and three pairs of auxiliary grand-total and sub-total dials are shown which permits of registering and recording a total of 999, but additional registering and recording devices may be employed if it is desired to increase the capacity of the machine.

In the auxiliary mechanism each of the higher gear segments 500 is provided with a pivot latch 501 the same as in the main registering mechanism. The lowest or primary gear segment of the auxiliary registering mechanism is provided with a movable latch 502 which is adapted to be engaged with or to be disengaged from the upper guide face on its companion controlling arm. This latch is pivoted on the primary gear segment and yieldingly held in position by a spring 217, shown in Fig. 55, so as to overhand the horn of its companion guide arm as shown in Figs. 9, 54, and as represented in Fig. 55, while upon moving the latch rearwardly so as to clear the controlling arm its gear segment is permitted to drop until a stop 490 on the segment adjacent to the latch bears against the controlling arm. The extent of this drop of the primary segment independent of its controlling arm is equal to one space or number of the registering mechanism the same as in the higher auxiliary registering devices. In the auxiliary registering mechanism the gear segments are not provided with lower stops 46 like those of the gear segments of the main registering mechanism which permits the auxiliary controlling arms to move downwardly when necessary independently of the auxiliary gear segments. The upward movement of the auxiliary gear segments is limited by stops 218 with which the upper ends of the gear segments engage. 219 represents a foot formed on the lower side of each controlling arm 3001 and adapted to engage with the lifting cross bar 22.

For the purpose of effecting an ordinary addition of numbers on the auxiliary registering mechanism, the auxiliary key levers are shifted into the proper position by the depression of the keys 401 representing the numbers to be added and then the rocking segments 15 and 29 are turned forwardly. During the forward movement of the rocking frames the auxiliary gear segments are first moved into engagement with the auxiliary dial pinions by the cam 14 and then pulled down by the springs 27, and the controlling arms are also pulled down by the latches of the gear segments engaging with the controlling arms. The downward movement of the gear segments and controlling arms continues until the stops 34 of the controlling arm strike the shoulders 39 on the key levers which stand in the path of the stops 34. At the end of the forward movement of the rocking frames the gear segments are withdrawn from the dial pinions by the springs 11 and during the subsequent backward movement of the rocking frames the gear segments and controlling arms are raised by the cross bar 22 engaging with the gear segments and with the feet 219 of the arms. The carrying of numbers from the units dials to the tens dials and from the latter to the hundreds dials and the turning the the dials to zero is effected in the same manner as in the main registering mechanism.

By this organization of the machine, numbers such as sales or prices of goods can be added and recorded by the main registering mechanism and other numbers such as the rebate on sales or discount on the prices of the goods, can be separately added and recorded by the auxiliary registering mechanism.

The key controlled devices whereby the parts of the main registering and recording mechanism are shifted into the proper position preparatory to registering and recording a number are distinct from the key controlled devices whereby the same effect is produced in the auxiliary registering and recording mechanism, but both sets of registering and recordings mechanisms are operated simultaneously by the one universal shifting mechanism for effecting the registration and recording of the numbers which are represented by the different positions of both key controlled devices.

*Counting.*

For the purpose of permitting counting of the separate number of additions which has been effected on the main registering mechanism the auxiliary adding mechanism is constructed as follows:

220 represents springs whereby the auxiliary controlling arms are connected with the cross bar 25. The springs 220 of auxiliary tens and hundreds controlling arms are rigidly connected with the cross bar 25, as shown in Figure 20, but the spring 220 of the auxiliary units controlling arm is provided at its lower end with a vertically elongated loop 221 which receives the bar 25, as shown in Figure 9, and which forms a slack connection between the springs or the tens and hundreds springs 220 and the bar 25.

222 represents a number of auxiliary stops, whereby the gear segments, when in their foremost position, are permitted to move downwardly only one space when the auxiliary registering is used to count the number of additions which have been made by the main registering mechanism. One of these stops is arranged adjacent to the left hand side of each auxiliary controlling arm and is provided on the upper side of its rear end with a curved guide face which corresponds to and is in line with the upper curved bearing face of the controlling arm when the latter is in its highest position, as represented in Figures 9 and 54. The several stops 222 are secured with their front ends to a transversely movable slide 223 which is adjustably secured to the underside of the cover 224 of the registering mechanism by a screw 225 passing through a transverse slot 226 in the cover, as represented in Figures 1, 9, and 54. 227 represents a trip finger secured with its front end to the slide 223 and arranged with its rear end adjacent to the front side of the latch 502 of the primary or units gear segment. 228 represents an elbow lever arranged below the bottom of the keyboard and having its lower arm connected with each of the upper arms of the auxiliary feeling levers 610 by springs 229, as shown in Figures 9 and 14. 230 represents a key having a depending stem which is guided in the top and bottom of the key-board and which bears against the upper arm of the elbow lever 228. During the ordinary adding operation by the auxiliary registering mechanism, the slide 223 is moved toward the left, so that the finger 227 and stops 222 are not in the path of the lugs 490 and latches 501, 502, the springs 229 are loose and do not interfere with the movement of the auxiliary key levers and the springs 220 do not come into use.

When it is desired to count and record consecutively the number of separate additions which are made by the main adding mechanism, the slide 223 is shifted to the right so that its stops 222 stand in the downward path of the stop lugs 490 and latches 501, and 502 of the gear segments and the trip finger 227 stands in the forward path of the latch 502 of the primary or initial gear segment, and the shifting key 230 is depressed, whereby the upper arms of the feeling levers are swung forwardly until their feeling fingers bear against the grand-total cams of the auxiliary dials, these levers together with their companion key levers being yieldingly held in this forward position by the springs 229.

Previous to beginning the consecutive counting and recording of the separate addition of the main registering mechanism, the dials are all turned to zero, in which position all of the upper key lever arms 3701 are in their rearmost position and have their locking shoulders 38 in engagement with the locking lugs 33 of the auxiliary controlling arms, whereby the latter are held in their highest position. Upon moving the rocking segments 15 and 29 forwardly after depressing the proper keys of the number to be added on the main registering mechanism, the gear segments are all moved forwardly into engagement with their respective dial pinions and the springs 27 of the several gear segments are then pulled downward by the bar 25.

During the forward movement of the auxiliary tens and hundreds gear segments their latches 501 engage with their companion controlling arms which prevents these gear segments from being depressed by the pull of their springs 27, whereby the tens and hundreds dials are not turned. During the forward movement of the primary or units gear segment its latch 502 engages with the trip finger 227 and is turned backwardly out of engagement with the top of its companion controlling arm, thereby releasing the units gear segment and permitting the same to be pulled downwardly by its spring 27, while in engagement with its gear pinion, whereby the grand-total and sub-total units dials are turned. As the auxiliary gear segments move forwardly into engagement with the dial pinions, their lugs 490 move over the stops 222, but in the foremost position of these gear segments their stop lugs 490 are separated from the stops 222 a distance equal to one tooth of the segments or one space on the dials. The instant the latch 502 of the units gear segments is released from the units controlling arm, while the units gear segment is in its foremost position the pull of the spring 27 depresses the units segment until its stop lug 490 engages with the units stop 222, this movement of the units gear segment causing the same to turn the units dial one space or number. During the subsequent backward movement of the rocking segments 15 and 29 the auxiliary gear segments are withdrawn rearwardly from the dial pinions. While in this rearwardly retracted position the units gear segment is raised by the bar 22 and when the same reaches the upper end of this movement the latch 502 is automatically turned over the units controlling arm by the spring 217 of this latch. This operation is repeated and the grand-total and sub-total units dials are turned one space at a time during every adding operation of the main registering mechanism. When the units dials make one complete rotation the companion grand-total cam 57 releases the units trip arm 54, thereby causing the same to disengage the latch 501 of the auxiliary tens gear segment from the tens controlling arm, whereby the tens gear segment is liberated and permitted to be pulled downward by its spring 27 during the subsequent forward movement of the rocking segments 15 and 29. The tens gear segment moves downwardly until its stop lug 490 engages the adjacent tens stop 222, during which movement the tens gear segment turns the tens dials one space. During the subsequent backward movement of the rocking frames 15 and 29 the tens gear segment is moved backwardly by the springs 11 out of engagement with its dial pinion and upwardly by the bar 22 while in its retracted position at the same time that the units gear segment is retracted and moved upwardly. At the end of the upward movement of the tens gear segment its latch 501 is again turned by its spring into engagement with the tens controlling arm. When the tens gear segment has turned the tens dials one rotation, the auxiliary hundreds gear segment is released by the carrying mechanism between the tens and hundreds registering mechanisms and the hundreds dials are shifted by their gear segment in the same manner as the tens dials.

At the beginning of the counting operation by the auxiliary registering mechanism the grand-total cams thereof engage with their highest parts against the feeling fingers of the feeling levers whereby the upper arms of the key levers are permitted to occupy their rearmost position with their locking shoulders 38 in engagement with the locking lug 33 of the controlling arms, thereby preventing these arms from being depressed by the pull of their springs 220 upon moving the rocking frames 15 and 29 forwardly. Upon counting the first number on the units dials the grand-total cam 57 thereof, while being shifted with said dials permits the units feeling lever to drop with its feeling finger 62 from the highest to the lowest part of the units grand-total cam, thereby causing the upper arm of the key lever to be moved forwardly by the feeling lever, so that the uppermost stop shoulder 39 of the key lever stands in the path of the stop lug of the units controlling arm. In this position of the parts, the units controlling arm is arrested after being moved downwardly one space by the pull of its spring 27 which is strained by the forward movement of the rocking frames 15 and 29. As the counting on the units dials progresses the units grand-total cam engage its successively higher parts with the feeling finger of the units feeling lever and moves the same rearwardly one space for each counting operation, and the springs 60 of the units key lever turns the upper arm of the latter backward intermittently in the same measure as the backward movement of the feeling lever permits the same. During every backward step of the upper arm of the units key lever the latter presents a successively lower stop shoulder 39 to the stop lug 34 of the units controlling arm, whereby the latter is permitted to be drawn down by its spring 220 one space farther during every counting operation, although its companion gear segment during this time never moves down more than one space by reason of its stop lug 490 engaging its stop 222, thereby causing its companion printing segment to be shifted to the proper position for printing the number corresponding to its grand-total dial. During the upward movement of the units gear segment its controlling arm is also moved upward to its highest position by the rod 22 engaging with the foot 219 of the controlling arm.

When the grand-total dial of the units register has completed one rotation the highest part of its cam has turned the feeling lever backwardly to its fullest extent and the upper arm of the units key lever is again engaged with its locking shoulder underneath the locking lug of the units controlling arm. The loop 221 at the lower end of the units controlling arm spring 220 is of such length, so as to permit its gear segment to descend in advance of the controlling arm and first turn the units dial and grand-total cam one space and then the rod 25 engages with the lower end of the loop 221 and pulls the controlling arm downwardly, until the same is arrested by the proper stop shoulder 39 on the upper arm of its key lever. By thus moving the units gear segment down in advance of its controlling arm the grand-total cam upon turning from 9 to 0 permits the upper arm of the key lever to be shifted rearwardly and moved with its locking shoulder underneath the locking lug of its controlling arm before the latter can descend, thereby holding the controlling arm and the segment in the highest or zero position, if the dials while registering move to zero. When turning the grand total dials of the auxiliary registering mechanism to zero the key 225 is shifted to inoperative position for counting and the dials may be cleared in the same manner as hereinabove described in connection with the main totalizers. Instead of moving the gear segments and controlling arms downwardly by means of the springs 27, which connect these parts to the movable bar 25 or other actuating device, each gear segment and controlling arm connected therewith may be drawn downwardly constantly by a spring 2700 which connects the segment with a stationary bar 2701 of the main frame, as shown in Figure 60.

*No print for auxiliary.*

231 is an upright shifting lever whereby the operation of the printing mechanism of the auxiliary registering mechanism may be controlled. This lever is provided on its upper arm with a cross bar 232 which is arranged in rear of the hammer actuating pawls of the auxiliary printing segments and its lower arm is connected by a wire or cord 233 with a thumb piece 234 which is guided in an opening in the front part of the frame as shown in Figure 9. The lever is turned by a spring 235 in the direction for moving its cross bar forwardly against the auxiliary hammer pawls, thereby holding the same out of engagement with the hammers of the auxiliary printing segments and preventing the same from recording on the impression surface. Upon pulling the thumb piece 234 forwardly, the lever is turned so as to move its cross bar rearwardly away from the auxiliary hammer pawls, thereby permitting the same to engage the hammers of the auxiliary printing segments for recording the numbers corresponding to the auxiliary registering mechanism. The shifting lever is held in its operative or inoperative position by two shoulders 236, 237 arranged one behind the other on the thumb piece and adapted to engage with the edge of the opening in which the thumb piece is guided.

By adjusting the auxiliary registering mechanism so as to count consecutively and throwing its printing mechanism into gear, numbers may be printed consecutively on the impression surface by simply rocking the handle 21 back and forth. While thus printing numbers consecutively, none of the registering keys are depressed and the gear segments of the main registering mechanism are moved idly back and forth.

In order to enable the operator to see which particular character or characters are at the printing point after depressing the keys and thereby detect any errors in the depression of the keys, each of the key levers is provided with an auxiliary dial which is turned forward the same number of spaces that the key lever has been depressed and then returns to its initial position when the key lever moves backward into its normal position. In the preferred construction of the detector dials shown in Figures 1, 2, 7, and 18, each of these dials consists preferably of a wheel 238 provided on one side with a pinion 239 which is engaged by a gear segment 240 secured to the adjacent key lever, as shown in Figures 2, 7 and 18. Upon depressing one of the keys of one of the number registering and recording keys, the detector dial thereof is turned forwardly by the connecting gearing the same number of spaces corresponding with the number of the key which has been depressed. If a key lever is not depressed its detector dial remains at zero. The detector dial of the word printing mechanism is in like manner turned by its key lever so as to indicate the word which corresponds to the word of the depressed key. The detector dials of the several registering and recording devices are mounted loosely on a transverse supporting rod 241. By means of these detector dials the operator can see which number and word is represented by the depressed keys, thereby enabling the same to be corrected if an error occurs before registering and printing the same.

Dating.

For the purpose of permitting the date to be printed on the impression surface the following mechanism is provided:

247 represents a year printing lever which is arranged toward the left of the auxiliary registering and numbering mechanism and which is mounted loosely upon the rod 12 which supports the hammers of the printing segments. The upper arm of the year lever is provided with a year type 248 representing the year to be printed, and this lever is turned for moving its type against the platen or the impression surface by means of a spring 205 secured to the lower arm thereof. The year printing lever is turned so that its type moves away from the platen and is then permitted to spring back quickly so as to produce an impression of its type on the impression surface by means of an operating mechanism which is constructed the same as the operating mechanism of the vertical ruling blade 204, shown in Figure 13, and the same reference letters are therefore used to denote like parts in these operating mechanisms.

249 represents three printing segments whereby the months and the days of the months may be printed and which are arranged in the order named on the left hand side of the year printing lever, as shown in Figures 1, 11, 20 and 22.

Nonprinting for dating.

Each of these segments is pivoted at its rear end on the same bar 31 which carries the other printing segments and is provided with type carriers which are constructed the same as the type carriers of the other printing segments. The units dating segment, whereby the days of the month from 0 to 9 are printed is provided with ten correspondingly numbered type carriers. The tens dating segment which prints the days of the month above 9 in connection with the units dating segment is provided with three type carriers bearing the numbers 1, 2 and 3. The month printing segment is provided with twelve type carriers which are provided with type characters representing the different months of the year. Upon shifting the several type or printing segments of the dating mechanism, so as to carry the desired month and day of the month to the printing line the respective type may be driven against the impression surface for recording the date represented by the same. Each of the months and day printing segments is retained in its adjusted position by means of a catch 250 projecting upwardly from the segment and engaging with the notches of a curved bar 251 secured to the adjacent stationary part of the machine, as represented in Figures 1 and 11. The notches in each of these bars are spaced to correspond with the position of the type when the same are at the printing point, and each of these notches is marked according to the month or day of the month which it represents, as shown in Figure 1, for the purpose of enabling the operator to readily set the dating mechanism. Each of the dating segments is provided with a printing hammer which is constructed the same as the printing hammer of the other printing segments, as shown in Figure 13. The printing hammer of each date printing segment is depressed by a pawl 252, shown in Figure 11, which, when free is moved rearward by a spring 253 so that its shoulder or hook engages with the lower shoulder 156 of the adjacent printing hammer and pulls the latter downwardly when the bar 151 is depressed. When the bar 151 is near the end of its downward movement, the pawl 252 is crowded with its hook from said lower shoulder by the upper shoulder 157 of the hammer engaging with the upper end of the pawl, thereby liberating the hammer and permitting the same to deliver a blow against the date type carrier which is at the printing line for producing an impression thereof. Inasmuch as the printing of the date is not required frequently, the pawls of the month, day and year printing mechanism are held in an inoperative position when it is not desired to print the date, by means of a rock lever 254, as shown in Figures 11, 12, 14 and 22. This rock lever is provided on its upper arm with a cross bar 255 which is arranged transversely in rear of the several pawls of the dating mechanism. The rock lever 254 is turned by a spring 256, so as to move its upper arm forwardly and cause its cross bar to engage with the rear side of the pawls 207 and 252 of the dating mechanism and shift them into an inoperative position out of engagement with the lever 247 and hammers 150. While the dating pawls are in this position, the same move up and down idly without operating the date printing mechanism, but the pawls of the other printing segments are free to operate.

257 represents a shifting key whereby the pawls of the dating mechanism are released and permitted to move into their operative position for printing the date. This key is provided with a depending stem which is guided in the top and bottom of the keyboard and which engages with its lower end against the upper arm of an elbow lever 258, as represented in Figure 14. The lower arm of this elbow lever is connected by a line or cord 259 with the lower arm of the lever 254. Upon depressing the shifting key 257 its respective elbow lever shifts the rock lever 254, so that the cross bar on its upper arm moves rearwardly from the dating pawls and permits the latter to assume an operative position.

*Platen and paper supports.*

The mechanism whereby the platen is supported and operated and the sheet or other impression surface which receives the record is presented to the printing line, is constructed as follows:

The frame of the carriage which supports the platen, paper and inking device consists essentially of a transverse supporting sleeve 260 arranged in rear of the printing mechanism and provided at opposite ends with two upwardly and forwardly projecting arms 261 and with two upwardly and rearwardly projecting arms 262, as represented in Figures 1, 2, 14–16, 20, 21 and 22. The supporting sleeve is arranged to slide transversely on a rod 263 which is secured with its ends to the sides of the frame. The platen is journaled in the upper ends of the front arms 261 of the paper carriage and is held in position at the printing line by means of a catch 264 which engages with its front hooked end over a transverse rod 265 arranged below the platen and secured with its ends to the sides of the main frame, as represented in Figures 1, 2, 17 and 22. This catch is yieldingly connected with the paper carriage, so as to permit the platen to recede more or less from the printing mechanism for the purpose of adjusting the platen to the thickness of the sheet of paper or other object which receives the impression and which is interposed between the platen and the printing mechanism. As shown in Figure 17, this yielding connection between the paper carriage and its retaining catch consists of a flat tension spring 266 which is secured with its lower end to the right hand front arm 261 of the paper carriage and the retaining catch 264 is pivoted to the upper end of this spring so as to turn in a vertical plane. The upper end of the tension spring 266 is provided with a thumb piece 267 and the adjacent end of the retaining catch is provided with a similar thumb or finger piece 268. The paper carriage is swung forwardly until its front arms 261 strike the cross bar 265. The retaining catch, while moving forwardly with the carriage rides with its inclined front end over the rod 265 and then engages with the front side of this bar, thereby holding the paper carriage in its operative position. If the article which receives the record is above normal thickness, the platen cannot be moved forwardly sufficiently to engage with the upper arms 261 with the cross bar 265. In order to hold the carriage in position while printing upon such an abnormally thick object, the upper end of the spring 266 is pressed forward by means of its finger piece 267 until the hook of the retaining catch engages with the cross bar 265. When it is desired to inspect the writing on the sheet or object, the upper end of the paper carriage may be swung backwardly from the printing mechanism by first pressing the tension spring 266 forwardly to ease the strain on the catch 264 and then turning this catch by means of its finger piece out of engagement from the cross bar 265, thereby leaving the carriage free to move rearwardly. The catch 264 is yieldingly held in engagement with the cross bar 265 by a spring 269 which is secured at one end to the main tension spring 266 and bears with its opposite end against the rear end of the catch. When printing upon a sheet of paper this sheet is fed forwardly underneath the platen and upwardly in front of the same, so that the sheet passes the printing line. The sheet is pressed against the underside of the platen in rear of the printing line by a transverse presser roller 270 arranged below the platen and journaled with its ends in the front arms 261 of the paper carriage. When it is desired to print upon a roll or web of paper, this roll is supported in rear of the platen and fed with its web around the platen in the same manner in which a sheet is fed. As shown in Figures 2, 14 and 17, an upper roll of paper is supported upon a divided spool consisting of two sections 271 which support opposite ends of the roll. 272 represents a horizontal supporting spindle which extends through the center of the upper roll of paper and through the sections of its supporting spool and which is supported at its ends in openings formed in the rear arms 262 of the paper carriage. This spindle is held against displacement in the paper carriage by a catch 273 pivoted to one of said arms 262 and engaging with a notch or groove 274 formed in said spindle, as represented in Figures 15 and 16. The paper roll may be held against longitudinal displacement on the spindle by any suitable means, for instance by engaging one of its spool sections against one of the rear carriage arms and a clamping collar 275 secured to the spindle and bearing against the outer side of the other spool section, as represented in Figure 16. By moving the sections of the roll supporting spool toward and from each other on the spindle the spool can be adjusted to suit different widths of paper. When it is desired to print the record in duplicate, a duplicate roll or web of paper is fed simultaneously with the main sheet past the printing line. The duplicate roll of web paper is preferably supported below the main roll on the sections 276 of a divided spool which is mounted on a spindle 277. This roll spindle is supported at its ends by means of hangers or hooks 278 which engage with the ends of the rear arms of the carriage, as shown in Figures 14, 15 and 17. The lower spool is held on its spindle by a collar 279 and the lower spindle is held in place on the hangers by a catch 280. 281 represents two paper guides which engage against opposite sides of the webs or sheets between the rolls and the platen, as represented in Figures 1, 2, 14 and 17, and prevent lateral displacement of the same. Each of these guides is adjustably secured to the adjacent front arms of the paper carriage, preferably by means of a clamping screw 282 arranged on the adjacent carriage arm and engaging with a slot in the adjacent guide.

*Line spacing, no print disables paper feed, and laterally movable paper carriage.*

283 represents a platen feed lever which is pivoted loosely on the left end of the platen shaft and which is provided on its rearwardly projecting arm with a pawl 284 which engages with a ratchet wheel 285 secured to the adjacent end of the platen, as represented in figures 1 and 14. 286 represents an intermediate actuating lever which is pivoted on the lower part of the front carriage arm 261 which is adjacent to the ratchet wheel 285. The ratchet lever is connected with the intermediate lever by means of a link 287 which is pivoted at its upper end to the rear arm of the ratchet lever and is provided at its lower end with a loop 288 which receives the rear arm of the intermediate lever. 289 represents a spring which connects the front arms of the ratchet and intermediate levers. The upper end of this spring is connected with the front arm of the ratchet lever a greater distance from the pivot of the latter than the distance between the connection of this spring and intermediate lever to the pivot of the latter. By this connection of the spring 289, the leverage of the ratchet lever is greater than that of the intermediate lever which causes this spring, when both of these levers are free, to turn these levers simultaneously in the direction for raising their rear arms, thereby moving the ratchet pawl upwardly or backwardly for taking up a new tooth on the ratchet wheel. The ratchet pawl is yieldingly held in engagement with the ratchet teeth by means of a spring 290. The movement of the intermediate lever in the direction for raising its rear arms and moving the ratchet pawl backwardly is limited by means of a nose 291 formed on this lever and engaging with a stop on the adjacent arm of the carriage as represented in Figure 14. The rocking motion of the intermediate lever is always the same, and in order to enable the same to turn the platen different distances, the rear arm of the intermediate lever is provided on its inner side with a number of notches 292 which are arranged different distances from its fulcrum and one or another of which is engaged by the lower end of the loop 288 on the connecting link 287. Upon engaging this loop with the notch of the intermediate lever nearest its axis the ratchet pawl is turned one space at a time, while upon shifting this loop into engagement with one of the outer notches of the intermediate lever, the platen will be turned forward by its ratchet mechanism a correspondingly greater distance each time. The intermediate lever is turned in the direction for shifting the platen by a transverse bar 293 arranged below the front arm thereof, as represented in Figures 1, 2, 7, 14 and 22. This bar is supported upon the upper ends of two rock arms 294 which are mounted loosely with their lower ends on the cross bar 167. 295 represents a depending arm which is preferably formed in one piece with one of the arms 294 arranged on the left hand side of the machine. This depending arm is provided with a nose which is arranged in rear and in the path of the rocking frame 29. During the last portion of the rearward movement of this rocking frame it engages with the nose of the depending arm 295 and moves the same rearwardly, and the upper arms 294 connected therewith are moved forwardly, thereby causing the cross bar 293 to be carried upwardly and turn the intermediate lever in the direction for feeding the platen and paper forwardly. During the forward movement of the rocking frame 29 the rock arms 294 are turned backwardly together with the intermediate lever and connecting parts by the spring 289 preparatory to feeding the platen forward the next space. If desired the platen may be turned by hand when it is desired to adjust the paper, this being effected by releasing the pawl 284 from the ratchet wheel and then turning the platen by means of a button 296 secured to one end of the shaft, as shown in Figures 1, 20 and 22. The cross bar 293 extends a sufficient distance transversely of the machine so as to engage with the front arm of the intermediate rock lever 286 in all the positions which the paper carriage can be shifted transversely in the machine. In order to render the paper feeding mechanism inoperative during the time that the printing mechanism is out of gear, the operating mechanism of the printing paper feeding mechanisms are so connected that the printing and paper feeding mechanisms are thrown into and out of gear simultaneously. A simple means for this purpose consists of a link 297 connected at its front end with a depending arm 298 on the rock shaft 172 and provided at its rear end with a slot 299 which receives a pin 300 on the depending arm 295, as represented in Figures 14 and 22. Upon turning the rock shaft 172 by means of the key 176 in the direction for engaging its upper arm 171 with the hook 168 and disengaging the latter from the bar 169, the link 297 is moved rearwardly so that the front end of its slot engages with the pin of the depending arm 295 and holds the latter in its rearmost position. While the depending rock arm is so held it cannot move forwardly with the rocking frame 29 and consequently the ratchet pawl of the paper feed mechanism does not move backwardly for taking up a new tooth on the ratchet wheel. Upon releasing the key 176 the rock shaft 172 turns in the direction for coupling the printing mechanism with the rocking segments, the link 297 is moved forwardly and the front end of its slot is carried forwardly a sufficient distance to permit the rock arm 295 to oscillate freely for actuating the paper feeding mechanism. The paper carriage is capable of sliding lengthwise on the rods 263 and 265 for presenting different parts of the paper to any particular type and is held in its adjusted position by a spacing device which consists essentially of a graduating adjusting sleeve 301 and an adjusting catch 302, as represented in Figures 2 and 21. The adjusting sleeve is revolubly mounted on the supporting sleeve 260 between the carriage frame arms and is provided with two or more longitudinal series of stop notches or graduations 303, 304. The notches in each series are equidistant and the notches in one series are spaced different from the notches in the other series, as shown in Figure 21. The catch 302 is pivoted on the rod 167 and is yieldingly held in engagement with one of the notches in the adjusting sleeve 301 by a spring 305. When it is desired to shift the carriage intermittently short distances lengthwise of the platen for writing narrow columns, the adjusting sleeve is turned so as to present its closely spaced notches to the catch, and the latter is shifted from one of these notches to another as the writing progresses. When wider columns are to be written the adjusting sleeve is turned so as to present correspondingly wider spaced notches to the catch. As shown in the drawings only two series of adjusting notches are provided on the adjusting sleeve, but more series of notches may be provided if necessary.

If desired sheet paper may be substituted for web paper to receive the record without changing the parts of the machine, but the devices for holding the rolls of web paper may be removed from the machine when writing upon sheet paper.

*Inking ribbon.*

306, 307 represent two inking ribbons whereby the impression of the types at the printing line is produced simultaneously on the two sheets or webs of paper. The front or outer ribbon 306 is arranged in front of the outer or lower sheet and the rear or inner ribbon 307 is arranged between the front and rear sheets at the printing line, as represented in Figures 1, 2, 14 and 20. Each of these ink ribbons is wound with its opposite ends upon spools 308 and upon turning one of these spools in one direction, the ribbon will be wound thereon and unwound from the other spool and vice versa. The two spools of the two ribbons on the same side of the machine are preferably arranged side by side and are journaled in bearings on the adjacent portion of the main frame, so that the spools of the front ribbon are arranged adjacent to the inner sides of the spools of the rear or inner ribbon.

Each of the ink ribbon spools is provided on the front end of its shaft with a ratchet wheel 309, the ratchet wheels of the outer spools being arranged slightly forward of the ratchet wheels of the inner spools. 310 represents two ratchet levers whereby the ink ribbons are intermittently shifted lengthwise of the platen or transversely of the sheet. One of these levers is provided for each pair of spools and is provided at opposite ends with upwardly projecting hooks 311 which are adapted to engage with the ratchet wheels of its respective spools. 312 represents a transversely reciprocating bar which is guided with its ends in the side portions of the frame and which supports and operates the ribbon operating ratchet levers. The ribbon ratchet levers are arranged on opposite sides of the reciprocating bar 312 and the latter is provided on its central portion with a pin 313 which engages at its front end with a slot 314 in the central portion of the front ratchet lever and engages at its rear end with a similar slot 314 in the central portion of the rear ratchet lever, as represented in Figures 1, 2, 20 and 53. Each of the slots 314 consists of two branches which are united at their lower ends and diverge upwardly in the form of the letter V. 315 represents springs whereby the ribbon shifting ratchet levers are yieldingly held in their operative position. Each of these springs is secured at its upper end to one of the shifting levers adjacent to the junction of its slot branches and with its other end to the adjacent part of the reciprocating bar. The tension of each of the springs 315 serves to draw the central part of its ribbon shifting lever downwardly so that the upper end of one of its slot branches engages with the pivot pin 313 of the same. As shown in Figures 1, 20 and 53, the left branch of the V-shaped slot of the front ribbon shifting lever engages with its upper end against the pivot pin 313 and the connection between the spring 315 and this lever is arranged on the right hand side of the pivot pin, which causes the right arm of this lever to be swung downwardly with its hook out of engagement with the opposing ratchet wheel, while its left arm is raised and its hook is yieldingly held in engagement with the adjacent ribbon ratchet wheel. Upon reciprocating the bar 312 by the spring 316, lever 317 and connecting mechanism hereinafter described when the parts are in this position, the left arm of the front ribbon shifting lever is moved idly toward the left and its hook takes up a new tooth on the adjacent ratchet wheel and during the subsequent movement of the lever with the bar 312 toward the right, this hook turns the ratchet wheel and the spool connected therewith in the direction for winding the ribbon thereon. This operation of the front shifting lever is repeated during every reciprocating movement of the bar 312 thereby feeding the ribbon intermittently from the right hand spool to the left hand spool. When the front ribbon has been wholly unwound from the right hand spool, the further movement of the ribbon toward the left is prevented by reason of the ribbon being connected with this spool. Upon moving the bar 312 toward the right while the right hand end of the ribbon is thus held, the ribbon shifting lever is prevented from moving toward the right with the bar by reason of the hook of its left arm being in engagement with the ratchet wheel of the left hand ribbon spool. When the ribbon shifting lever is thus arrested, the bar 312 moves toward the right independent of the lever and during this movement, the pivot pin 313 moves to the inner end of the left branch of the V slot therein and then outwardly in the right branch to the outer end thereof. By thus shifting the pivot pin 313 of the bar in the slot of the lever the connection between this lever and the spring is carried toward the left side of the pivot pin, so that the relative position of the shifting lever and spring is reversed, as represented by dotted lines 310ª, 315ª, in Figure 53.

*Automatic ribbon reverse.*

When this lever is so reversed its right arm of the ratchet shifting lever is turned with its hook into engagement with the ratchet wheel of the adjacent ribbon spool and the left arm thereof is moved with its hook out of engagement from the ratchet wheel of the adjacent ribbon spool, whereby the movement of the ribbon is automatically reversed and the ribbon is caused to wind upon the right hand spool and to unwind from the left hand spool. The ribbon continues to move toward the right until wholly unwound from the left hand spool to which it is connected when the pivot pin 313 of the ribbon shifting lever is shifted back to the upper end of the left branch of the V slot and the movement of the ribbon is again reversed in the same manner as before described.

The front and rear shifting ribbon ratchet levers are reversed independently of each other and can feed their respective ribbons in opposite directions although they are both operated from the reciprocating bar. The latter is moved lengthwise in one direction preferably toward the right by a spring 316, as shown in Figures 1 and 20. The ribbon shifting bar 312 is moved in the opposite direction by an elbow lever 317 which engages with its upper end against a lug or shoulder on the bar. 318 represents a rock arm which is secured to the rock lever 294, 295 of the paper feed mechanism and which engages with the lower arm of the elbow lever 317, as shown in Figures 1, 14 and 20. When the rock lever 294, 295 turns in the direction for feeding the paper forward, the arm 318 turns the elbow lever 317 and moves the ribbon shifting bar 312 toward the left, and when the rock lever 294, 295 turns in the opposite direction, the spring 316 moves the bar 312 toward the right. When it is desired to print only one sheet or web of paper one of the ink ribbons may be removed.

*Full stroke.*

In order to prevent the operator from making a partial forward and backward stroke of the rocking frames 15 and 29, and thereby prevent erroneous registration, the following mechanism is provided:

319 represents two detent pawls which are arranged over the rocking frames 15 and 29, respectively, and pivoted on a transverse rod 320, as represented in Figures 2, 7, 14 and 20. Each of these pawls is provided on its underside with two downwardly diverging jaws 321 which are arranged substantially at right angles to each other and on its upper side with a V-shaped ridge 322. Upon turning the detent pawl in one direction its front jaw engages with the upper concentric edge or face of the adjacent rocking frame, while upon turning the pawl in the opposite direction its rear jaw engages with said edge. Each of the detent pawls is yieldingly held with either of its jaws in engagement with the respective rocking frame by a presser arm 323 pivoted loosely with its front end on the transverse shaft 9 and provided at its rear end with a roller or projection which is held in engagement with the ridge of the adjacent pawl by a spring 324 connected with the pawl and bearing against the underside of the rod 320. The concentric face or edge of each rocking frame is provided with a segmental series of notches 325 and undercut inclines 326 converging upwardly from the outer sides of the front and rear notches in the said concentric edge, as represented in Figures 2, 7, 9 and 14. In the rearmost positions of the rocking frames 15 and 29, the front jaws of the detent pawls engage with the front inclines 326 of the rocking frames and turn the pawls so that their front jaws are depressed into engagement with the foremost notches of the frames, while their rear jaws are raised, as shown in Figure 2. The pawls are yieldingly held in this position during the forward movement of the frames by the presser arms 322 bearing against the inclined rear sides of the ridges on the pawls.

As the rocking frames move forward the front jaws of the detent pawls engage with one pair of notches after another of the frames 15, 29 and at the end of the forward movement of the frames the rear inclines 326 thereof engage with the rear jaws of the pawls and turn the same so that the front jaws are raised and the rear jaws are depressed into engagement with the foremost notches 325 of the rocking frames. When the pawls are thus reversed by the rear inclines of the rocking frames, the ridge of each pawl is moved with its highest part in rear of the roller of the presser arm, which causes this arm to now hold the pawl in this position during the subsequent backward movement of its frame. As the rocking frames move backwardly, the rear jaws of the detent pawls engage successively with the notches of the rocking frames and when the latter reach the end of their backward movement, the front inclines 326 thereof engage with the front jaws of the detent pawls and depress the same into engagement with the foremost notches of the frames and lift their rear jaws into an inoperative position, as shown in Figure 1. If the operator has moved the rocking frames forwardly more or less, so that one of the intermediate notches in each frame stands in front of its detent pawl and then attempts to move the rocking frames backwardly, before completing the forward movement of the frames, the front jaws of the pawls will engage with the intermediate notches immediately in front of the detent pawls and hold the frames against backward movement. After the rocking frames have completed their forward movement and the pawls have been reversed, each frame is in like manner held against forward movement after the same has been moved backward sufficiently to carry one of its intermediate notches in rear of the rear jaw of its detent pawl. By this means the operator is compelled to complete a stroke of the rocking frames in one direction before reversing the movement of the frames, thereby avoiding displacement of the registering and recording mechanism.

*Key release and flexible keyboard.*

The keys which have been depressed in the operation of adding or recording a number, word or other character are automatically locked in a depressed position until the adding or recording operation of the particular number, word or other character has been completed, and then the depressed keys are automatically released and permitted to be raised by their springs, as shown in Figures 2, 7, 9, 14, 26-29 and 46-48, the keys are held in a depressed position by a number of locking plates 327, one of which is arranged lengthwise on the left side of the stems of each row of keys. Each of the locking plates is pivoted at its lower end to the top of the keyboard bottom, so as to swing transversely and is provided along its upper edge with a number of downwardly facing catches or shoulders 328 which are adapted to engage with upwardly facing locking shoulders 329 on the stems of the keys. Each of the keys is provided with a convex face below its locking shoulder, consisting of a lower rising portion 330 which inclines upwardly and laterally from the lower part of the key toward the adjacent locking plate, and an upper receding portion 331 which inclines from the upper end of the rising portion to the outer end of the locking shoulder 329 of the stem, as shown in Figures 27, 28 and 48. Each locking plate is drawn yieldingly with its catches against the stems of the adjacent rows of keys by a spring 332, as shown in Figures 28 and 47. The locking catches of the locking plates bear against the key stems below the convex faces thereof when the keys are in an elevated position, as shown in Figure 26. Upon depressing a key the convex face on its stem deflects the locking plate and when the key has been depressed fully the respective locking catch of the locking plate engages with the locking shoulder 329 of the stem of the depressed key, thereby retaining the parts which are operated by said key in a shifted position. If a wrong key has been depressed and the operator subsequently depressed the right key the latter during the first part of its downward movement engages the lower or rising part 330 of its convex face with the adjacent locking catch of the locking plate and disengages the respective locking catch from the locking shoulder of the previously depressed key, thereby releasing the same, as represented in Figures 46 and 48. Upon continuing the depression of the second or correct key after the first or wrong key has been released, the receding or upper part 331 of the convex face of the correct key engages with the adjacent locking catch of the locking plate, therepy permitting the latter to approach the key stem and when the correct key has been fully depressed its locking shoulder is carried below the locking catch of the plate and is engaged thereby, whereby the correct key is locked in a depressed position, as represented in Figure 29. By this means any incorrectly depressed key is automatically released by the depression of the correct key and the latter is in turn automatically locked in a depressed position.

333 represents a transversely movable releasing bar, whereby the keys of the main numbering registering devices are released. This bar is arranged transversely in rear of the rear ends of the locking plates of the main number keys and is guided with its ends in the frame of the machine, as shown in Figures 26 and 30. This bar is provided with a number of upwardly projecting releasing lugs or shoulders 334, one of which is adapted to engage with the right side of a pin or projection 335 on the rear end of each locking plate of the main registering keys, as represented in Figures 7 and 26. Upon shifting the releasing bar 333 toward the left its releasing lugs move the main locking plates in the same direction thereby releasing any number keys which are held in a depressed position by the same.

The main releasing bar 333 when free is shifted toward the right into its retracted position by the resilience of the springs which hold the main locking plates in their operative position. The releasing bar 333 is shifted into its operative position by a releasing elbow lever 336 which turns on a pivot pin 337 and is connected with its upwardly projecting arm with the releasing bar 333 while its lower arm projects horizontally outward. 338 represents a releasing arm which is arranged lengthwise in the machine and transversely over the lower arm of the releasing elbow lever 336 and which is pivoted at its rear end on a pin 339, as represented in Figures 14, 26 and 27. 340 represents a longitudinal releasing lever connected by an upright cord 341 with the rear end of the releasing arm 338 and projecting with its rear end into the path of the cross bar 25 as represented in Figure 14. The main number keys are held in their depressed position until the rocking frames 15 and 29 have been moved forwardly sufficiently to operate the registering and recording mechanisms in accordance with the numbers of the depressed main keys and then the cross bar 25, during the last part of its forward movement with the rocking frames 15 and 29 engages with the releasing lever 340 and depresses the same. The releasing arm 338, during its downward movement with the releasing lever 340 engages with the lower arm of the elbow lever 336 and turns the latter so that its upper arm moves the main releasing bar 333 toward the left and moves the main locking plates out of engagement with the main number keys, thereby releasing the depressed main keys and permitting them to rise preparatory to setting the machine for registering and recording the next number.

The row of word keys 216 is arranged on the left hand side of the main keys and the keys 401 of the auxiliary adding mechanism are arranged on the left hand side of the word keys. Each row of word and auxiliary number keys is provided with a locking mechanism similar to the rows of main keys.

The several shifting keys are arranged in a longitudinal row or column on the left side of the auxiliary keys, and the elbow levers operated thereby are arranged one behind the other, as represented in Figures 14, 26 and 27.

*Release auxiliary add keys and lock word and shifting keys.*

342 represents an auxiliary releasing bar whereby the locking plates of the auxiliary keys are released. This bar is arranged lengthwise in front of the main releasing bar 333 and is adjustably connected therewith, so that the auxiliary releasing bar can be moved into an operative or inoperative position on the main releasing bar. As shown in Figure 26, the auxiliary releasing bar is pivoted at its inner end to the main bar by a horizontal pivot, and its outer end projects through an opening 343 in the frame, as shown in Figure 30, which permits this bar to be manipulated by the operator from the outside of the frame. The auxiliary releasing bar is held in its raised or lowered position by means of two notches or recesses 344, 345, formed one above the other in this bar and either of which is adapted to be engaged with a pin or projection 346 on the main releasing bar, as shown in Figures 26 and 30, by the resilience of the auxiliary releasing bar which is sufficiently elastic for this purpose. Upon raising the auxiliary releasing bar and engaging its lower recess with the pin 346, the releasing lugs 347 of this bar are carried in front of the right side of the pins on the rear ends of the locking plates of the auxiliary keys, so that upon moving the main releasing bar toward the left for releasing the main keys, the auxiliary releasing bar is simultaneously moved in the same direction and disengages the locking plates from the auxiliary keys. When it is desired to register or record an arithmetical progression of a number, the auxiliary releasing bar is depressed, so that its lugs 347 are below the pins of the locking plates of the auxiliary releasing plates, this bar being held in this position by engaging its upper recess 344 with the pin 346. Upon now depressing the auxiliary keys of the desired number and then operating the registering and recording mechanism the number represented by the depressed keys will be registered and recorded, but these keys will not be released. While the depressed keys are thus held in a depressed position, the registering and recording mechanism can be repeatedly operated, during each of which operations the number represented by the depressed key is added over and over again, thereby registering and recording the arithmetical progression of this number. The two columns or rows of word and shifting keys are each provided with a locking mechanism similar to the main word and auxiliary keys, but the locking plates of these keys are disengaged from the stems by a separate releasing mechanism so as to permit the main and auxiliary number keys to be released without releasing the word and shifting keys. As shown in Figures 26 and 27, the release of the word and shifting keys is effected by a supplemental releasing bar 348 having lugs 349 which engage with the pins 335 on the rear end of the locking plates of the word and shifting keys and which is guided at its outer end in the frame. The inner end of the supplemental releasing bar is pivoted to the upper arm of a releasing elbow lever 350. This lever is pivoted on the pin 337 and its lower arm projects toward the right and underneath the releasing arm 338 adjacent to the rear side of the lower arm of the releasing elbow lever 336. When both lower arms of the releasing elbow levers 336 and 350 are arranged underneath the releasing arm 338 the depression of the latter by the rocking frames causes the supplemental releasing bar to be moved toward the left so that its lugs disengage the locking plates of the word and shifting keys from their respective stems at the same time that the main and auxiliary releasing bars disengage the locking plates of the main and auxiliary number keys from their respective stems, thereby releasing all of the keys simultaneously after the registering and recording of the words and numbers has been effected.

Repeat for word and shifting keys.

For the purpose of permitting all the words and numbers represented by the depressed keys to be added and recorded repeatedly the releasing elbow levers 336, 350 are shifted toward the right and their lower arms are moved from underneath the releasing arm 338 so that the depression of the lever 340 by the rocking frames will not affect the releasing elbow levers 336, 350, thereby retaining the keys in their shifted position and permitting of producing repeated additions and impressions of the types which correspond to the depressed keys. The releasing elbow levers 336, 350 are moved into an operative or inoperative position by means of a supporting elbow lever 351, as shown in Figures 14, 26 and 27. This lever is pivoted on a stationary bracket 352 and its upper arm carries the pin 337 on which the releasing elbow levers 336, 350 are pivoted. 353 represents an actuating rock lever which engages with its front arm against the underside of the lower arm of the supporting elbow lever 351. 354 represents a repeating shifting key having a depending stem which is guided in the top and bottom of the keyboard and which engages with its lower end against the front arm of the actuating rock lever 353. Upon depressing the repeating key, the supporting elbow lever 351 is turned by the actuating lever in the direction for moving the releasing elbow levers 336, 350, so that their lower arms clear the releasing arm 338 and will not be affected by the depression of the latter. Upon releasing the repeating key the supporting elbow lever 353 is returned to its normal position by a spring 355, shown in Figures 14 and 26, and the releasing elbow levers 336, 350 are shifted into an operative position with their lower arms projecting underneath the releasing arm 338. The releasing elbow lever 350 is turned in the direction for moving the supplemental releasing bar 348 into its retracted position by a spring 356 which is secured to the supporting elbow lever 351. The movement of the elbow lever 350 in this direction is limited by a stop 357 on the supporting elbow lever 351, as shown in Figures 26 and 27.

Release for numeral keys when taking totals.

When it is desired to record either the grand-total or the sub-total of the added numbers or when it is desired to return the grand-total or sub-total dials to zero, the number keys must all be released in order to permit the key levers to assume a position corresponding to the grand-total or sub-total dials preparatory to recording the totals registered by the same. This is effected by an intermediate elbow lever 358 which is pivoted on the pin 339 and which projects rearwardly over the lower arm of the releasing elbow lever 336 but does not project over the lower arm of the releasing elbow lever 350, as shown in Figures 26 and 27. 359 represents a longitudinal connecting bar connected at its rear end to the lower arm of the intermediate elbow lever 358 and provided with longitudinal slots 360 which receive pins or projections 361 on the lower arms of the elbow levers 118, 177, 80 and 85 and which are operated by the grand-total and sub-total printing keys 84, 181 and the grand-total and sub-total zero keys 87, 120, as represented in Figure 14. The pins 361 of the total and zero elbow levers engage normally with the front ends of their respective slots in the connecting bar 359 which causes the latter to be shifted forward by any one of the respective keys without disturbing the others. Upon moving the connecting bar 359 forwardly by the depression of any one of the total or zero keys, the intermediate elbow lever 358 is turned in the direction for depressing its upper arm into engagement with the lower arm of the releasing elbow lever 336, thereby releasing all of the number keys. The depressed word keys and the shifting keys remain depressed until the rocking frames 15 and 29 have completed their forward movement and the registering and recording of the totals have been effected. The locking mechanism of the shifting keys is so constructed that the grand-total zero key 87 cannot be held down by the adjacent locking plate, as shown in Figure 14, because the depression of the same is necessary only during the backward movement of the rocking frames.

*Repeat key for 230—176—354.*

For the purpose of locking the consecutive numbering key 230, non-printing key 176 or repeating key 354 in a depressed position when it is desired to continue the use of these keys and the mechanism controlled thereby indefinitely each of these keys is provided with a movable locking block 362. Each of these blocks is arranged below the top of the keyboard adjacent to its respective shifting key and is provided with a thumb piece 363 which is guided in a slot 364 in the top of the key-board and projects above the same. Upon retracting the locking block from above the stop shoulder of the shifting key, as shown in Figure 28, the key can rise to its uppermost position. Upon depressing this key and then shifting the locking block so that it is arranged between the stop shoulder 44 of the key and the top of the key-board, as shown in Figure 29 the key is held in a depressed position.

*Interlocks and numeral key single key mechanism.*

In order to produce a correct register and record of the numbers and words, each column of number and word keys is provided with a locking mechanism which prevents more than one key in each of these columns from being held in a depressed position at the same time. This locking mechanism is best shown in Figures 26, 28, 45, 46 and 51 and is constructed as follows:

365 represents a number of tumblers or blocks arranged in a longitudinal row on the bottom of the key-board adjacent to the right side of the stems of each row of number and word keys. These tumblers are capable of a longitudinal movement with reference to the column of keys and each set of tumblers is guided on a rod 366 which is supported on the key-board bottom. Each of the tumblers is provided with a convex upper side which preferably slopes or inclines from its highest central part toward the front and rear sides of the tumbler in the form of an inverted letter V. The longitudinal movement of the tumblers is limited by front and rear stops 367, 368 which are engaged by the front and rear tumblers and which also serve to support the guide rod 366 on the bottom 42, as shown in Figure 45. The stem of each number and word key is provided on the side opposite to its locking plate 327 with a follower or spreading head 369. The heads of the intermediate keys have a convex underside which preferably inclines from its lowest central part to the front and rear sides of the head in the form of the letter V. Each of the spreading heads, except the foremost and rearmost is arranged over the space between two tumblers. The heads of the foremost and rearmost keys are arranged in front and in rear of the foremost and rearmost tumblers and these heads are inclined only on the side facing the adjacent tumbler, as shown in Figure 45. Upon depressing a key in any one of the columns of number or word keys, the spreading head of this key engages with the tumblers on opposite sides thereof and crowds the tumblers in front of the head forwardly and those in rear of the head rearwardly. When the shifting head has been depressed to its fullest extent, the foremost tumbler bears against the front stop 367 and the rearmost tumbler bears against the rear stop 368 and the slack between the several tumblers is fully taken up. In Figure 45, key number 5 is shown depressed fully and the slack between the tumblers is taken up, in which position of the key its shoulder 329 is engaged by the catch of the adjacent locking plate and is prevented from rising. If key number 5 was depressed erroneously and the correct key, for instance number 3 is subsequently depressed, this correct key moves downwardly idly until it engages or nearly engages the adjacent tumbler and when the correct key reaches this position its releasing cam or convex face engages with the adjacent locking plate and shifts the same out of engagement from the locking shoulder 329 of the depressed key number 5, as shown in Figure 46, thereby releasing this key and permitting the same to rise. During the continued downward movement of the correct key number 3, the spreading head of the same moves downwardly between the adjacent tumblers and shifts the same so as to take up the slack between them. When the correct key reaches the end of its downward movement the same is locked in this position by the adjacent locking plate in the same manner in which key number 5 was previously locked. The slack between the several tumblers is only sufficient to permit of the full depression of one key at a time and the tumblers are so constructed that when two keys are depressed simultaneously these keys are arrested in their downward movement before their locking shoulders are engaged by the locking plate. By this means any one key in a column may be depressed and locked in its depressed position and if an incorrect key has been depressed, the same is released by the subsequent depression of the correct key and the correct key is in turn locked in a depressed position, but the locking of two keys at the same time in a depressed position is prevented.

It is sometimes desirable to depress several of the shifting keys simultaneously and lock the same in a depressed position. In the machine as organized no more than three shifting keys require to be depressed and locked at the same time. In order to prevent more than three shifting keys from being locked in a depressed position at the same time, the following mechanism is provided:—

*Plural key mechanism for shifting keys.*

370 represents a number of tumblers which are arranged in a longitudinal row below the stems of the shifting keys and each of which is secured to the lower end of a flat spring 371 depending from the underside of a supporting bar 372. Each of these tumblers has the form of an upwardly tapering wedge, as shown in Figure 47, and is capable of swinging lengthwise of the column of shifting keys but is held against transverse movement by arranging the depending springs so that their flat sides extend transversely. 373, 374 represent front and rear stops arranged in front and in rear of the foremost and rearmost tumblers 370. 375 represents a number of followers or spreading heads one of which is secured by a flat spring 376 to the lower end of the stem of each shifting key. Each of these heads is preferably cylindrical in form and is capable of swinging lengthwise of the column of shifting keys, but is held against lateral movement owing to the transverse arrangement of the flat supporting spring.

Upon depressing any one of the shifting keys its head moves downwardly between the adjacent tumblers and shifts the same forwardly and backwardly from opposite sides of the spreading head. The front and rear stops 373, 374 are so arranged that the slack between the several tumblers is sufficient to allow of full depression of three shifting keys. As shown in Figure 47, the sub-total printing, numbering and dating keys are depressed fully and their followers or spreading heads have been moved between the adjacent tumblers so that the several tumblers bear against each other and against the depressed followers or head and against the front and rear stops 373, 374, thereby taking up all of the slack between the tumblers. In order to lock these three keys in a depressed position the same must be depressed simultaneously. If an additional key, for instance the non-printing key 176, is depressed, as shown in Figures 47 and 48, this fourth key is free to move downwardly without disturbing the previously depressed keys until its follower or head engages or nearly engages with the adjacent tumblers and when this fourth key reaches this position its releasing cam engages with the adjacent locking plate 327 and deflects the same, as shown in Figure 48, thereby disengaging the plate from all of the previously depressed keys, and causing the same to rise simultaneously. It will thus be seen that by this means three keys can be locked in a depressed position and if an error has been made in the depression of one or more of the keys the subsequent depression of the correct key or group of three keys permits the release of the previously depressed incorrect keys and the locking of the correct keys in a depressed position. If it is desired to permit of locking more or less than three shifting keys in a depressed position, the slack space between the several tumblers must be adjusted accordingly. Instead of supporting the tumblers of the shifting keys from the top, as shown in Figures 47 and 48, the same may be supported by flat springs 377 from the bottom, as shown in Figure 47.

In order to permit the key levers to be readily removed from and inserted in the machine for adjusting the same while assembling the machine, the means for fastening the key levers in the machine are constructed as follows:—

*Construction of key levers.*

380 represents a number of spacing sleeves which are mounted on the supporting rod 35 and which separate the several key levers, grand trip arms, sub-total retarding arms, tension arms, feeling levers and pawl arms mounted on said rod from each other and from the main frame, as shown in Figures 18 and 41. The trip arms, retarding arms, tension arms, feeling levers and pawl arms are permanently mounted on the rod 35, and cannot be removed from the rod except by removing the screws 381 which secure the ends of the rod to the frame. Each of the key levers is provided with a pivot opening 382 which is larger in diameter than the diameter of the supporting rod 35, and a lateral passage or slot 383 which extends from the pivot opening to the outer side, of the lever and which is of less width than the diameter of the pivot opening, but greater than the diameter of the supporting rod 35, as shown in Figures 42 and 44. 384 represents a spacing sleeve mounted on the rod 35 on one side of the key lever and provided with a concentric bushing 384 which fits into the pivot opening of the key lever. When the parts are assembled the several sleeves, levers and arms bear against one another and the key levers are thereby held on the bushings and compelled to turn thereon concentrically with the supporting rod, but are prevented from becoming detached by reason of the slots in the key levers being narrower than the diameter of the pivot opening and bushing. One of the spacing sleeves, preferably the outermost spacing sleeve 386 arranged between one of the pawl arms 105 and the adjacent side of the frame is provided with a lateral slot 387 extending its full length, as represented in Figures 41 and 43, which permits this sleeve to be readily placed upon or removed from the supporting rod. When all of the arms and levers have been placed in position, the slotted spacing sleeve 386 is placed on the rod 35 between the pawl arm and frame. thereby taking up all the slack between the several levers, arms and sleeves on the supporting rod and holding them in place. When it is desired to remove any one of the key levers, the slotted spacing sleeve 386 is first removed and then the other spacing sleeves, arms and levers are shifted on the rod sufficiently to permit the bushing to be withdrawn from the pivot opening of the key lever which it is desired to remove. When the bushing is thus removed its key lever can be moved with its slot over the supporting rod and detached therefrom. After the desired fitting of the key lever has been effected the same is first passed with its slot over the supporting rod, the bushing is then inserted in the pivot opening of the key lever and then the sleeves, arms and levers are shoved together and the slotted sleeve 386 is placed on the rod. The sleeve 386 is preferably held in place by a screw 388 passing through the frame.

*Distinguishing means for keys and dials.*

In order to enable the operator to distinguish the figures or numbers readily on the key-board and thereby enable the same to be manipulated more rapidly the columns of main figure or number keys are arranged in groups and each group is distinguished by color or otherwise from the adjacent groups. As shown in Figure 1, the keys in the first three columns representing figures to the right of the decimal point or less than a whole number are indicated in black on a white background, the second three columns of figures from the left of the decimal point to the first pointing off place representing the whole numbers less than thousands are indicated in white on a black background, and the third three columns of figures from the first pointing off place to the second pointing off place representing the whole numbers between hundreds and millions are indicated in black on a white background. The word and shifting keys are also indicated in white on a black background and to distinguish them readily from the intermediate auxiliary number keys which are indicated in black on a white background.

Assuming that the item "Dec. 14, 1899, 28 Rebate 34061.97⅝" is to be registered and recorded on a bill the operation, briefly stated, is as follows:—

*Operation.*

The operator first adjusts the date printing segments into the proper position by means of the catches 250 and then depresses the dating key 257. All the other shifting keys are released and permitted to rise whereby all of the devices controlled by these keys are thrown out of gear excepting the recording mechanism which is thrown into gear by the rising of its shifting key 176.

The slide 233 is then shifted toward the left into its inoperative position so as to permit the auxiliary registering and recording mechanism to add numbers after which the keys 2 and 8 in the tens and units columns of the auxiliary keys are depressed. The word key representing "Rebate" in the column of word keys is next depressed and then the main keys representing the numbers 34061.97 and the fraction ⅝ are depressed in their proper columns. The depression of these keys causes the key levers to be shifted so as to move the proper differential stops into the path of the controlling arms and the detector dials 238 are turned so as to indicate the numbers or characters of the keys which have been depressed, thereby enabling the operator to correct any error if a wrong key has been depressed before registering and recording the item. If the item appears correctly on the detector dials the operator moves the handle 21 forwardly and backwardly once. During the first part of the forward movement of the handle, the main gear segments are moved forwardly into engagement with the dial pinions. During the next part of the forward movement of the handle the main gear segments which correspond with the depressed keys are moved downwardly a distance corresponding with the numbers or characters of the depressed keys at which point the key levers arrest the main gear segments through medium of the controlling arms. While the main gear segments are effecting their registering movement, the hammers of the recording mechanism are retracted as represented in Figure 7. After the gear segments have completed their downward or forwardly registering movement the hammers are released and produce an impression of the types at the printing line. During the last part of the forward movement of the handle 21 the main gear segments are retracted rearwardly out of engagement from the dial pinions and are elevated while so retracted to their initial position during the subsequent backward movement of the handle.

During the backward movement of the mechanism the depresed keys are released preparatory to being again depressed for registering and recording another item. The addition of further items to this bill is repeated in the same manner. If all the items have the same date, the dating key 257 may be released after recording the first item, whereby the date will be only printed once at the head of the items. If the items bear different dates the dating segments must be adjusted accordingly. After all the items of one bill have been registered and recorded the operator depresses the sub-total printing key 181 and the sub-total zero key 120 and then moves the handle 21 forwardly and backwardly, thereby recording the sub-total at the foot of the column of auxiliary numbers and the sub-total at the foot of the column of main numbers and sub-total dials are also turned to zero, but the grand-total dials which register the grand-total of the numbers which have been added are not disturbed.

The addition of the group of items in further bills proceeds in the same manner, the numbers of each bill being added and recorded and the sub-totals of the same printed at the foot of the column. After all the groups of items or numbers in the several bills have been added separately the operator depresses the grand-total printing key 84 and then moves the handle forwardly, whereby the grand-total of all the numbers of the several bills is recorded. While the handle is in its foremost position the operator depresses the grand-total zero key 87, thereby causing the gear segments to be moved forwardly into engagement with the dial pinions and turn the grand-total dials back to zero during the subsequent backward movement of the handle.

If it is desired to record the main numbers in duplicate the operator shifts the bar 191 so as to permit the hammers of the duplicate printing segments to produce a record of the duplicate types at the printing line.

The vertical ruling between the dollars and cents number is effected automatically and if a cross rule is desired at the foot of a column of numbers the operator depressed the cross ruling key 198. When it is desired to print the same item or numbers two or more times in succesion the depression of the repeating key 354 shifts the mechanism to produce this result. By depressing the non-printing key 176 the recording mechanism is thrown out of gear and no record is produced of the numbers. When it is desired to consecutively count the number of items in a bill which has been added on the main registering mechanism, the slide 223 is shifted toward the right so that its stops and finger intercepts the lugs and latches of the adjacent controlling arms and segments, whereby the auxiliary registering mechanism is caused to operate as a counting machine instead of an adding or registering machine. This is especially desirable in banks where the number of vouchers are returned to a customer require to be counted and the amounts of the faces of the vouchers require to be added.

If it is desired to throw the printing mechanism of the auxiliary register out of action and still permit the recording mechanism of the main register to operate, the thumb piece 234 is moved rearwardly.

It is obvious that the dials may be wholly omitted without affecting the operation of the registering and recording mechanism, in which case, the operator cannot determine the result of the work until the same has been printed, but it is preferable to employ the dials because they enable the operator to see at what numbers the machine has been set before adding and recording the same and the totals can also be seen without printing the same.

*Transferring totals from one totalizer to another.*

It is frequently desirable to transfer the total standing on the grand accumulator wheels to the sub-totalizer, and vice versa, either additively or subtractively. Many problems arising in business transactions are such that an operation of this type is highly desirable, as, for example, the handling of customer's accounts in banks, charge accounts in mercantile establishments, etc.

*Transferring an amount from the sub-totalizer to the grand totalizer additively.*

Referring to Fig. 14, it is seen that a depression of the S. P. key 181 rocks a bell crank lever 177, to the lower end of which is attached a link 187, which rocks bell crank 186 about shaft 35. The forward end of said bell crank 186 rocks bell crank 185 to shift a comb 182. Comb 182 is provided with teeth 183, which lie on either side of the flexible feeling fingers 610.

Depression of the S. P. key 181 will therefore shift comb 182 and feeling fingers 610, so that the feeling points 62 thereof will contact with the peripheries of the sub-totalizer cams 122. Also attached to the elbow lever 177 (Fig. 14) is a link 178, which is connected to the links 179 and 180, which in turn pull the lower ends of members 76 and 78 forwardly, thereby raising cams 14 out of the path of pin 18 (Fig. 2) so that the actuating sectors 500 will not engage the totalizer gears 400. The movement of lever 78 permits cam 57 to drop so that when the machine is operated the frame 66 will be pulled rearwardly, thereby straining springs 65, each one of which is connected to the lower end of a flexible feeling finger 610.

Each of the feeling fingers 610 is provided with a turned over lug 63, extending to the rear of the key lever 3701. Key levers 3701 are normally drawn rearwardly by spring 60. Each spring 65 when tensioned is sufficient to overcome the tension of a spring 60 and thereby move the key lever forwardly an extent determined by the forward movement of the feeling lever.

If the key 225 (Figs. 1, 9 and 54) is shifted to the right as viewed in Fig. 1, the members 222 will lie beneath the lugs 501 and 502 (see Figs. 9 and 54), so that the segments 500 will be held in normal position even though key 181 has been depressed and the handle pulled forwardly; the controlling arms 3001 will, however, travel downwardly under the tension imparted to springs 220 until lugs 34 thereon contact with the previously positioned steps 39 of the key levers 3701. When the elements 3001, 3701, and 610 are in the positions described, the springs 220 and 60 are proportionately elongated so that the stronger springs 220 will hold the adjusted key levers 3701 in their adjusted positions even though arms 610 may be subsequently moved rearwardly.

The end of the finger 227, as shown in Fig. 54, is some distance from the latch 502 so that said latch is not tripped until the segments 500 are almost fully engaged with gears 400. It is therefore evident, that, for example, key 87 may be partially depressed to partially engage the said segments 500 with wheels 400 then the key 225 may be fully shifted to the left, thereby moving finger 227 and supports 222 to ineffective positions and the key 87 may be thereafter fully depressed to effect the complete engagement of segments 500 with the gears 400 if so desired.

When key 225 has been fully shifted to the left the supports 222 of the partially engaged segments 500 is withdrawn and said segments drop under the tension of their springs 27, turning wheels 400 until the latches 502 and 501 (or 490 in case of a transfer) contact with the upper cam surface of the controlling arms 3001 which have been previously differentially adjusted and held in positions commensurate with the digits originally appearing on the sub-total dials 880. Since the gears 400 are turned through angular distances corresponding to the digits originally appearing on the sub-total dials, it is evident that an amount originally standing on the said sub-total dials is transferred additively to the grand total dials. Release of the depressed keys 87, and 181 by suitable means such as, for example by depressing key 354 and return of the handle 21 to normal completes the operation.

*Transferring an amount additively from the grand totalizer to the sub-totalizer.*

Referring to Fig. 14, it is seen that a depression of the GP key 84 will rock bell crank 80 and draw links 81, 82 and 83 forwardly, thereby moving the lower ends of levers 76 and 78 forwardly also, the corresponding movement imparted to the upper ends of said levers will cause the cams 67 and 14 to take positions which are the reverse of that shown in Fig. 14; that is, cam 67 will be lowered and cam 14 raised. When the cams 14 and 67 are in this position, the bail 66 will travel rearwardly and tension springs 65 when the handle 21 is drawn forwardly. The tensioning of springs 65 positions the feeling points 62 (Fig. 9) against the peripheries of cams 57 and will also move the key levers 3701 forwardly to position the stops 39 according to the amount indicated by the wheels 2000.

If the key 225 (Figs. 1, 9, and 54) is shifted to the right as viewed in Fig. 1 the members 222 will lie beneath the lugs 501 and 502 (see Figs. 9 and 54) so that the segments 500 will be held in normal position even though key 84 has been depressed and the handle 21 pulled forwardly; the controlling arms 3001 will, however, travel downwardly under the tension imparted to springs 220 until lugs 34 thereon contact with the previously positioned steps 39 of the key levers 3701. When the elements 3001, 3701 and 610 are in the positions described, the springs 220 and 60 are proportionately elongated so that the stronger springs 220 will hold the adjusted key levers 3701 in their adjusted positions even though arms 610 may be subsequently moved rearwardly.

The end of the finger 227, as shown in Fig. 54, is some distance from the latch 502 so that said latch is not tripped until the segments 500 are fully engaged with gears 400. It is therefore evident, that, for example, key 87 may be partially depressed to partially engage the said segments 500 with the wheels 400, then the key 225 may be fully shifted to the left, thereby moving finger 227 and supports 222 to ineffective positions and the key 87 may be thereafter fully depressed to effect the complete engagement of the segments 500 with the gears 400.

When key 225 has been fully shifted to the left the supports 222 of the partially engaged segments 500 are withdrawn and said segments drop under the tension of their springs 27, turning wheels 400 until the latches 502 and 501 (or 490 in case of a transfer) contact with the upper cam surface of the controlling arms 3001 which have been previously differentially adjusted and held in positions commensurate with the digits originally appearing on the grand total dials 2000. Since the gears 400 are turned through angular distances corresponding to the digits originally appearing thereon, the sub-total dials are correspondingly turned; and an amount originally standing on the grand total dials is transferred additively to the sub-total dials. Release of the depressed keys 84 and 87 by suitable means such as, for example, by depressing key 354 and return of the handle 21 to normal completes the operation.

*Deducting the amount on the grand-totalizer from the amount standing on the sub-totalizer.*

This operation is substantially the same as that just above described. If key 230 be depressed and the machine operated as usual, key levers 3701 will be positioned at varying angular distances commensurate with the amount standing on the grand totalizer wheels.

Downward movement of the sectors 500 rotates the grand totalizer wheels until the highest points of the cams 57 are reached. The springs 229 draw the feeling fingers quickly forwardly as the highest points of said cams are passed, positioning the key levers 3701 forwardly to immediately stop the sectors 500 by arresting lug 34 on one of the steps 39 of the key levers.

The key levers have now been moved to position commensurate with the eleven complement of the digits originally standing on the grand totalizer wheels and this amount has been added to said grand totalizer wheels and coincidentally to the sub-totalizer. The eleven complement will be taken if it be considered that the actuators move the totalizer wheels exactly the amount which a depressed key mechanically represents, that is to say, if, for example, a seven key were depressed and the machine actuated the actuators would be able to move the totalizer wheel corresponding to the depressed key through a distance corresponding to exactly seven teeth on the actuating rack. The result is as yet incorrect owing to the presence of fugitive digits in all denominational orders. Since the eleven complements have been automatically taken the grand totalizer wheels will now exhibit a series of twos in all denominational orders except the lowest which will exhibit unity. The insertion of the constant predetermined quantity comprising sevens in all denominational orders except the lowest where a nine is inserted will upon a second operation of the machine effect a clearing of the grand totalizer and coincidentally cause the difference of the amounts originally standing on the grand totalizer and sub-totalizer to appear on the said sub-totalizer.

In order to deduct the amount standing on the sub-totalizer from the amount standing on the grand totalizer keys 87 and 181 are depressed simultaneously. As hereinabove pointed out key 181 causes the shifting of the feeling fingers 610 so that the feeling points 62 will contact with the peripheries of the sub-totalizer cams 122 when handle 21 is moved forwardly. Key 87 meshes the sectors 500 with the grand totalizer wheels 400 even though key 181 disables cam 14. The feeling fingers 610 are shifted forwardly by tensioning spring 65 with only sufficient force to overcome spring 60 attached to the key levers 3701 so that the sub-totalizer cams 122 are not braked against forward rotation. Operation of the machine causes the sectors 500 to rotate gears 400 and both cams 57 and 122 will rotate therewith. As cam 122 rotates the feeling fingers 610 are shifted rearwardly gradually until the highest points of the cams 122 are reached. The key levers 3701 also travel rearwardly because of the tension in springs 60. Then feeling fingers 610 will be drawn forwardly very rapidly after passing the high points of the cams 122 due to the extra tension in springs 65 thereby positioning the key levers 3701 at points commensurate with the eleven complements of the digits originally on the sub-total accumulators. A second operation of the machine where a series of sevens are set up in all denominations except the lowest where a nine is inserted will cause the sub-totalizer to be cleared and the difference to appear on the grand totalizer.

The above operation for subtractively transferring amounts from either the grand totalizer to the sub or from the sub-totalizer to the grand is based on the assumption that a depressed key will permit the actuators to travel exactly the number of teeth represented by the indicia on the depressed numeral key. If, however, the machine described in the foregoing specification is built following the general principles involved in adding machine and cash register construction which have been known and universally used since these machines first appeared on the market, the method of subtractively transferring an amount from the sub-totalizer to the grand totalizer and vice versa may be readily accomplished in another manner. As is well known the depression of a key on the keyboard causes the actuating rack controlled by said depressed key to travel further than the exact number of teeth represented by the indicia on the depressed key. This added movement is in the nature of a safety factor to insure the complete operation of any transferring or tens carrying mechanism associated with the totalizer. Thus, if no added movement were given to the totalizer wheels it is conceivable that a slight imperfection in the manufacture of the tripping elements may cause the transfer to "hang up" when it should have operated. In order to overcome this it has been and still is the usual practice to give the wheels an added degree of movement to insure that necessary tens carrying will always take place. With this assumption the following mode of deducting is at once evident.

Downward movement of the sectors 500 rotates wheels 400 and thereby cams 57 shifting the feeling fingers 610 rearwardly until the highest points of the cams 57 are reached. The springs 229 draw the feeling fingers quickly forwardly as the highest points of said cams are passed, positioning the key levers 3701 forwardly to immediately stop the sectors 500 by arresting lug 34 on one of the steps 39 on the key levers.

The key levers have now been moved to positions commensurate with the ten complement of the digits originally standing on the grand totalizer wheels, and this amount has been added to said grand totalizer wheels, and transferred to the sub-totalizer. The result is, as yet, incorrect, owing to the presence of fugitive units in the tens, hundreds and succeeding denominational orders. A series of actuations of handle 21 will successively eliminate the fugitive units in each of the demoninational orders, so that when the handle is operated as many times as there are denominational orders represented by the grand totalizer wheels, the sub-totalizer will then exhibit the difference between the amounts formerly standing upon said grand totalizer and sub-totalizer wheels.

*Deducting the amount on the subtotalizer from the amount on the grand totalizer.*

In order to deduct the amount standing on the sub-totalizer from the amount standing on the grand totalizer, keys 87, 181 and repeat key 354 are depressed simultaneously. As hereinabove pointed out, key 181 causes the shifting of the feeling fingers 610 so that the feeling points 62 will contact with the peripheries of the sub-totalizer cams 122 when handle 21 is moved forwardly. Key 87 meshes the sectors 500 with the grand totalizer wheels 400 even though key 181 disables cam 14. The feeling fingers 610 are shifted forwardly by tensioning springs 65 with only sufficient force to overcome springs 60 attached to the key levers 3701, so that the sub-totalizer cams 122 are not braked against forward rotation. Operation of the machine causes the sectors 500 to rotate gears 400 and both cams 57 and 122 will rotate therewith. As cam 122 rotates, the feeling fingers 610 are shifted rearwardly gradually until the highest points of the cams 122 are reached; the key levers 3701 also travel rearwardly because of the tension in springs 60. Then feeling fingers 610 will be drawn forwardly very rapidly after passing the high points of the cams 122 due to the extra tension in springs 65, thereby positioning the key levers 3701 at points commensurate with the ten-complements of the digits originally on the sub-total accumulators.

When said key levers 3701 have been so positioned, the further downward movement of sectors 500 is arrested because a step 39 on the key levers 3701 is positioned in the path of lug 34, whereby the ten-complement of the digits originally standing on the sub-totalizer wheels is added to the amount standing on the grand totalizer wheels. The result is, as yet, incorrect, owing to the presence of fugitive units in the tens, hundreds and succeeding denominational orders. A series of actuations of handle 21 will successively eliminate the fugitive units in each of the denominational orders so that when the handle is operated as many times as there are denominational orders represented by the sub-totalizer wheels, the grand totalizer will then exhibit the difference between the amounts formerly standing upon said sub-totalizer and grand totalizer wheels.

*Indication of negative (algebraic) remainder.*

Above it has been pointed out that mechanism is provided for deducting the amount standing on either the grand or sub-totalizer from the amount standing on the other totalizer. The completion of the deducting operation will in either case restore the totalizer containing the subtrahend to zero. If the remainder is a positive remainder, the original minuend totalizer will exhibit the true remainder, and the highest denominational wheels of said totalizer will exhibit "zeros". If, however, the remainder should be a negative one, said higher denominational wheels, instead of indicating "zeros", will indicate a series of "nines" and the remainder indicated will be the true complement of the negative remainder. A reverse repetition (that is, by subtracting the complement of the negative remainder from the cleared totalizer) of the process will then give the correct negative remainder on the original subtrahend totalizer.

I claim:

1. In a machine of the class described, the combination of a plurality of totalizers and means for transferring the amount on one totalizer to another.

2. In a machine of the class described, the combination of a plurality of accounting devices, and means for transferring the amount on one accounting device to another and clearing the totalizer transferred from.

3. In a machine of the class described, the combination of a plurality of accounting devices, and manipulative means under the optional control of the operator for adding or subtracting the amount on one accounting device to the amount standing on another accounting device.

4. In a computing machine, the combination of number inserting devices, a plurality of totalizers, and means for combining the amount standing on one totalizer either additively or subtractively with the amount standing on another totalizer.

5. In a calculating machine, the combination with actuating devices, of key controlled stops therefor, two independently operable groups of totalizer wheels in operative relation thereto and normally disengaged therefrom, means for engaging both groups of totalizer wheels with said actuating devices, whereby a number registered in one group may be transferred into the other group, and means for disengaging the totalizer wheels originally containing said number from said actuating devices, whereby said totalizer wheels stand at zero when the number has been transferred to the other totalizer wheels; substantially as described.

6. In a calculating machine, the combination with actuating devices, of key controlled stops therefor, two independently operable groups of totalizer wheels in operative relation thereto and normally disengaged therefrom, means for engaging one group of totalizer wheels with said actuating devices for the purpose of positioning said actuating devices, and means for engaging the other group of totalizer wheels with the actuating devices; substantially as described.

7. In a calculating machine, the combination with toothed actuators, key means for controlling the amount of movement of said actuators, two independently operable groups of totalizer wheels in operative relation to said actuators, means for introducing items into one or both totalizers, said means being under control of the operator, and means for transferring numbers from either totalizer to the other; substantially as described.

8. In a calculating machine, the combination with the two groups of totalizer wheels, of key positioned stops for controlling the movements thereof, and means under control of the operator for transferring the number registered in either group to the other; substantially as described.

9. In a calculating machine, the combination with two groups of totalizer wheels, of key positioned means for introducing a series of numbers to be added together into one or both groups, and means for transferring the numbers so accumulated in either group to the other group of totalizer wheels; substantially as described.

10. In a calculating machine, the combination with two groups of totalizer wheels, of key operated means under the control of the operator for rendering either group primary in character, and means for transferring the number from the primary group of totalizer wheels to the other group of totalizer wheels; substantially as described.

11. In a calculating machine, the combination with two groups of totalizer wheels, of actuating devices therefor, key operated means for rendering either of said groups of totalizer wheels operative with respect to said actuating devices in additive operations, means for obtaining separate totals from said groups respectively, and means for transferring a total from one group to the other; substantially as described.

12. In a calculating machine, the combination with two groups of totalizer wheels, of actuating devices therefor, key operated means for rendering either of said groups of totalizer wheels operative with respect to said actuating devices in additive operations, means for obtaining separate totals from said groups respectively, and means for transferring a total from either group to the other and adding said total to the number already registered in the receiving totalizer; substantially as described.

13. In a calculating machine, the combination with two groups of totalizer wheels, actuating devices therefor, means for accumulating items in one group of totalizer wheels, and means for obtaining a total of said items, which operation clears the group of totalizer wheels in which said total was registered and introduces said total into the other group of totalizer wheels; substantially as described.

14. In a calculating machine, the combination with actuating devices, of two key controlled stops for determining the excursions thereof, independently operable groups of totalizer wheels in operative relation to said actuating devices, means whereby both groups may be engaged with and operated by said actuating devices, whereby a number registered in either group of totalizer wheels may be transferred to the other group of totalizer wheels, printing type which are positioned by said actuating devices, and means for causing said type to make a printing impression and make a record of the number which is transferred from one totalizer to the other; substantially as described.

15. In a calculating machine, a plurality of groups of total wheels, key controlled means for operating said groups of wheels simultaneously or separately as desired, and means for recording the total in one group and simultaneously introducing that total into another group of total wheels; substantially as described.

16. In a calculating machine, a plurality of groups of total wheels, key controlled means for operating them, and means for dissipating a number from one group of wheels and simultaneously introducing that number into another group of wheels; substantially as described.

17. A machine for listing items in several successive series and printing the total of each series at the end thereof and a grand total of all of the items at the end of all of the series, comprising printing devices for listing the individual items, a set of accumulator pinions and means for accumulating upon said pinions the individual items of each series listed, a second set of accumulator pinions, means for causing the return of the first mentioned set of pinions to zero position at the end of any series of items and setting up the type to print the total of such series of items and to transfer such total to the second set of pinions and means for causing the subsequent return of the said second set of pinions to zero position and setting up the type to print the grand total of all the series-totals accumulated upon said second set of pinions.

18. In a calculating machine, the combination with means for printing the items, separate totals of certain of said items and grand totals of items, separate totalizers for registering the items constituting the separate totals, and grand totalizers, and key controlled means whereby when the separate totalizers are yielding their totals and being reset to zero the number registered therein will be introduced into the grand totalizers.

19. In a calculating machine, the combination with a plurality of independently operable totalizers, means for totalizing numbers thereon, and key controlled means for transferring the total from either of said totalizers to the other totalizer; substantially as described.

20. In a calculating machine, the combination, with toothed actuators, means for controlling the amount of movement, of said actuators, two independently operable groups of totalizer wheels in operative relation to said actuators, means for introducing items into one or both totalizers, said means being under control of the operator, means for transferring numbers from one totalizer to the other, and means for printing the transferred number, the transferring means being set prior to movement of the toothed actuators.

21. In a calculating machine, the combination with two or more registering devices, of key controlled means for accumulating a series of items in one of said devices, and means for transferring a total of said items so accumulated into another of said registering devices.

22. The combination of a plurality of sets of adding devices upon each of which any desired amounts may be successively added, and key operated means adapted to be connected with two of said sets to add upon one of said sets the total standing upon the other, whereby the total or totals standing upon one or more of said sets may be added upon another of said sets.

23. The combination of a plurality of sets of adding devices exceeding two in number, means for taking the totals thereon, means for subtracting the total of one set from the total of another set, and key controlling means for controlling the total taking and the subtracting means, to cause the taking of totals, the subtracting and the taking of the total of the difference to be done in a prescribed order.

24. The combination of a plurality of sets of adding devices exceeding two in number, means for taking the totals thereon, means for adding the totals of different sets together, means for subtracting the total of one set from the total of another set, key controlling means for controlling the total taking means, the adding of totals, the subtracting of totals and the taking of the totals of the resultant sum and the difference, to cause such operations to be taken in a predetermined order.

25. The combination of a plurality of sets of adding devices exceeding two in number, means for taking the totals thereon, means for adding the totals of different sets together, means for subtracting the total of one set from the total of another set, key controlling means for controlling the total taking means, the adding of totals, the subtracting of totals, and the taking of the totals of the resultant sum and difference, to cause such operations to be taken in a predetermined order.

26. The combination of a plurality of sets of adding devices upon each of which any desired amounts may be successively added, a key controlled common operating means adapted to be connected with two of said sets to add upon either set the total standing upon the other set, whereby the total or totals standing upon one or more of said sets may be added upon any other of said sets.

27. The combination of two sets of adding devices, means for adding any desired amounts successively on said adding devices, means for transferring from one set to the other set, said means having a predetermined maximum range of movement, means for connecting the transferring means with one set of adding devices so that the extent of movement of the transferring means will be determined by the condition of said set of adding devices, and means for connecting the transferring means with the other set of adding devices so that the same extent of movement communicated to the transferring means, under control of the first set will be transferred to the second set, whereby the total standing upon one set of said adding devices, or the complement thereof, may be transferred to the other set.

28. In a calculating machine, the combination of two sets of primary totalizers, a single set of actuating devices, key controlled means for placing either set of totalizer wheels under control of said actuating devices, and means for placing one set of totalizer wheels under control of the other set of totalizer wheels, through the medium of said actuating devices, whereby numbers may be transferred from one set of totalizer wheels to the other set of totalizer wheels.

29. In a calculating machine, the combination of two sets of totalizer wheels, a single set of actuating devices cooperating therewith, key controlled means whereby either set may be placed under control of said actuating devices, and total-taking means for placing one set of totalizer wheels in control of said actuating devices and said other set of totalizer wheels, whereby, the totals yielded by the controlling set of totalizer wheels will be accumulated in the controlled set of totalizer wheels.

30. In a calculating machine, the combination of a main shaft, groups of totalizers, key controlled actuating devices, means for introducing items into each of said groups, means for obtaining the separate totals from each totalizer and means for obtaining the grand total of the totals of all of the totalizers.

31. In a calculating machine, the combination of a given number of totalizers, actuating devices, key controlled means for introducing items so that each of said totalizers will contain a total, means for obtaining the separate total from each totalizer, and means in control of one of the totalizers containing a separate total for accumulating the grand total of all the totals, including the one which it contains.

32. In a calculating machine, the combination of a main shaft, two independently operable primary totalizers, key controlled actuating devices, and means under control of the operator for placing both of said totalizers under control of said actuating devices for transferring and totalizing purposes.

33. In a calculating machine, the combination of a main shaft, independently operable groups of totalizers, key controlled actuators therefor, means for introducing items into each of said groups, means for recording the total in each group, and means for introducing the total in each group into another group as recorded.

34. The combination of two sets of adding devices, and operating means adapted to be connected with both of said sets to transfer to one set the total standing upon the other set.

35. The combination of a plurality of sets of adding devices, and operating means adapted to be connected simultaneously with two sets, whereby the total upon one set may be added to that upon another set.

36. The combination of two sets of adding devices, and means for transferring to one set the total standing upon the other set.

37. The combination of two sets of adding devices, operating means, and connections, adapted to be operated to connect the said operating means with both of said sets of adding devices to add upon one of said sets the total standing upon the other set.

38. The combination of sets of adding devices, and means for automatically connecting and operating them in such manner as automatically to obtain the difference between the totals standing upon different sets.

39. The combination of sets of adding devices, and means for connecting and operating them in such manner and order as to obtain the difference between the totals standing upon different sets.

40. The combination of a plurality of sets of adding devices, means for operating them so as to obtain the difference between the totals standing upon different sets, said means including shifting keys.

41. The combination of sets of adding devices, means for connecting and operating them, and controlling means for automatically controlling the connecting and operating means so arranged as to connect and operate such sets so as to automatically obtain the difference between the totals standing upon the different sets.

42. The combination of a plurality of sets of adding devices upon each of which any desired amounts may be successively added, a common operating means adapted to be connected with any two of said sets to add upon either set the total standing upon the other set, whereby the total or totals standing upon any one or more of said sets may be added upon any of said sets.

43. The combination of two sets of adding devices, means for adding any desired amounts successively on said adding devices, means for transferring from one set to the other set, said means having a predetermined maximum range of movement, means for connecting the transferring means with one set of adding devices so that the extent of movement of the transferring means will be determined by the condition of said set of adding devices, and means for connecting the transferring means with the other set of adding devices so that the same extent of movement communicated to the transferring means under control of the first set will be transferred to the second set, whereby the total standing upon one set of said adding devices, or the complement thereof, may be transferred to the other set.

44. In a calculating machine, the combination with toothed actuators, means for controlling the amount of movement of said actuators, two independently operable groups of totalizer wheels in operative relation to said actuators, means for introducing items into one or both totalizers, said means being under control of the operator, and means for transferring numbers from one totalizer to the other; substantially as described.

45. The combination of a plurality of sets of adding devices, upon which any desired amounts may be successively added, means for connecting any of the sets and means for operating such connecting means in such manner as to add together the totals of the sets thus connected.

46. The combination of a plurality of sets of adding devices, upon which any desired amounts may be successively added, means for connecting any of the sets, means for operating said connecting means so as to obtain the difference between the totals standing upon different sets.

47. In a calculating machine a plurality of groups of total wheels, means including number keys for operating them, and means independent of said number keys including depressible keys for controlling the character of operation for dissipating a number from one group of wheels and introducing a number into another group of wheels upon operating the machine.

48. In a machine of the class described the combination of a plurality of sets of accumulators, a plurality of cams adapted to control the character of operation of said sets of accumulators, manipulative means for determining the operation controlled by said cams whereby an operation of the machine will cause the amount standing on one set of accumulators to be transferred to another set of accumulators.

49. In a calculating machine the combination of a set of totalizer wheels of key operated means under control of the operator for consecutively registering items therein, a second set of totalizer wheels, means separate from said key operated means for subtracting items accumulated in one set from the other set and means for holding said second mentioned means in controlling position substantially as described.

In witness whereof I have signed my name hereto this 7th day of April 1922.

WILLIAM S. GUBELMANN.

Certificate of Correction.

It is hereby certified that in Letters Patent No. 1,429,202, granted September 12, 1922, upon the application of William S. Gubelmann, of Buffalo, New York, for an improvement in "Adding and Recording Machines," errors appear requiring correction as follows: In the drawings, heading, line 3, strike out "Application filed April 10, 1922." and insert *Original filed January 10, 1900.;* in the heading to the printed specification, line 4, strike out "Application filed April 10, 1922. Serial No. 551,298." and insert instead *Original application filed January 10, 1900. Serial No. 1,004. Divided and this application filed April 10, 1922, Serial No. 551,298;* page 43, after line 18 insert *In many of the claims of this particular patent, the word transferring or its equivalent is used; when this word is used applicant restricts himself to operations under control of the shifting keys.;* and that the said Letters Patent should be read with these corrections therein that the same may conform to the record of the case in the Patent Office.

Signed and sealed this 15th day of May, A. D., 1923.

[SEAL]

KARL FENNING,
*Acting Commissioner of Patents.*